(12) United States Patent
Reith

(10) Patent No.: US 10,250,754 B2
(45) Date of Patent: Apr. 2, 2019

(54) NETWORK RESOURCES BROKERING SYSTEM AND ENFORCEMENT FUNCTION NETWORK ENTITY

(71) Applicant: Deutsche Telekom AG, Bonn (DE)

(72) Inventor: Lothar Reith, Frankfurt am Main (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/878,614

(22) Filed: Jan. 24, 2018

(65) Prior Publication Data
US 2018/0220008 A1 Aug. 2, 2018

(30) Foreign Application Priority Data

Feb. 1, 2017 (EP) ..................................... 17154219

(51) Int. Cl.
| G06Q 30/08 | (2012.01) |
| H04M 15/00 | (2006.01) |
| H04L 12/911 | (2013.01) |

(52) U.S. Cl.
CPC ............ *H04M 15/46* (2013.01); *G06Q 30/08* (2013.01); *H04L 47/821* (2013.01); *H04M 15/60* (2013.01); *H04M 15/66* (2013.01); *H04M 15/805* (2013.01); *H04M 15/8011* (2013.01)

(58) Field of Classification Search
CPC .. H04M 15/60; H04M 15/66; H04M 15/8011; H04M 15/805
See application file for complete search history.

(56) References Cited

U.S. PATENT DOCUMENTS

| 9,947,029 B2 * | 4/2018 | Collette ............. G06Q 30/0275 |
| 2009/0082019 A1 * | 3/2009 | Marsico ................ H04W 48/18 |
| | | 455/435.2 |
| 2011/0238552 A1 | 9/2011 | Monogioudis |
| 2013/0084878 A1 | 4/2013 | Chen et al. |

(Continued)

FOREIGN PATENT DOCUMENTS

| EP | 1371220 B1 | 1/2007 |
| WO | 9927476 A2 | 6/1999 |

OTHER PUBLICATIONS

European Search Report from EP Application No. 17154219.4, dated Apr. 26, 2017.

*Primary Examiner* — Marisol Figueroa
(74) *Attorney, Agent, or Firm* — Workman Nydegger

(57) ABSTRACT

The disclosure relates to a network resources brokering system, comprising: a communication network with at least one enforcement function for preferential treatment and charging; and a brokering entity, configured to receive requests from a plurality of network entities for providing preferential treatment during usage of chargeable resources within a predefined charging period, each request comprising an electronic bid value competing with other network entities for preferential treatment during the usage of chargeable resources in the charging period, wherein the brokering entity is configured to rank each network entity from the plurality of network entities into one of a multiplicity of success classes based upon their electronic bid values offered and to interwork with the at least one enforcement function for preferential treatment and charging.

11 Claims, 42 Drawing Sheets

(56) References Cited

U.S. PATENT DOCUMENTS

2013/0295948 A1* 11/2013 Ye ................... H04W 72/0453
                                                    455/452.1
2014/0086052 A1   3/2014 Cai et al.
2014/0358759 A1* 12/2014 Smith .............. H04W 28/0226
                                                    705/37

* cited by examiner

NETWORK RESOURCES BROKERING SYSTEM AND ENFORCEMENT FUNCTION NETWORK ENTITY

TECHNICAL FIELD

The present disclosure relates to a network resources brokering system and a brokering entity for providing access to at least one network resource of a communication network within a charging period, which interworks with a minimum of one enforcement function for preferential treatment and charging. In particular, the disclosure relates to a system and method for granting preferential treatment during a charging period to a successful bidder of a bidding process and for enforcing said preferential treatment during network usage and for charging the amount bid for each chargeable consumption unit consumed during a charging period.

BACKGROUND

Charging, accounting and billing are crucial features of communication systems and services. It has to be differentiated between retail charging of subscribers and wholesale-charging of wholesale customers such as resellers, wholesale partners, MVNOs and 5G slice owners. The invention is primarily useful for wholesale charging, but may also be applicable to retail charging e.g. if a 5G slice instance is dedicated to a large customer from the automotive industry. Network providers must design tariffs for the whole range of services offered, retail and wholesale. Charging periods have been used in the field of telecommunications networks to provide differentiated pricing per charging period, such as so called time of day accounting. With the advent of next generation networks such as 5G, new network functions, layers, infrastructures and services can be realized, including the hosting of customer applications inside the network infrastructure, such as defined by ETSI MEC. The value of hosting customer applications close to the user for low latency access or for allowing the offloading of compute intensive operations to the cloud should be monetizable. Operators complain that OTT (over the top) players benefit from their large investments in network buildout without appropriately taking part in the financing. The current charging schemes do not meet the requirements of operators investing in network infrastructure that it must be possible to adequately monetize the value created by the large investments required to meet ever increasing network coverage and bandwidth demands, demands for lower latency and demands for applications hosted in mobile edge computing infrastructure of operators.

SUMMARY

It is the object of the invention to provide an intelligent charging concept in order to enable network operators to appropriately monetize the value of their network infrastructure and at the same time to achieve efficient utilization of network resources, in particular in next generation mobile and fixed networks where network resources are dynamically provided.

This object is achieved by the features of the independent claims. Further implementation forms are apparent from the dependent claims, the description and the figures.

A basic idea of the invention is to apply a capacity brokering architecture, where network resources are provided dynamically depending upon bids offered. The price for the consumption of chargeable consumption units consumed during a charging period can be determined in a bidding process with multiple bidders. The invention may also be used in a bidding process with a single bidder being the charging party (e.g. operator himself). While this does not provide any preferential treatment by the enforcement function for preferential treatment and charging, it still provides highly scalable and efficient way to implement Time of day accounting with multiple charging periods and a very efficient implementation charging period change events, which is superior over the current state of the art of implementing time of day accounting, including an efficient way for realtime charging. This new charging concept provides efficient utilization of network resources, in particular in 4G and 5G mobile networks, and is applicable also to network resources that bring the cloud closer to the user, such as so called edge cloud infrastructure in mobile and fixed networks as currently being specified by ETSI MEC The invention provides a system, a method as well as a business model. The invention is based on the idea to introduce dynamic pricing to the process of price definition for chargeable consumption units that get consumed during a charging period. It is important to understand the difference between a chargeable resource unit and a chargeable consumption unit. A Byte may be a chargeable resource unit, but is not a chargeable consumption unit in the sense of the invention. A "free" Byte comprised in the bandwidth of a link which becomes available for usage at a certain start time is a chargeable consumption unit that—if not used at that time for demand satisfaction of a demand—perishes and can not be used at a later time. The invention allows to determine the price of a chargeable consumption unit consumed during a charging period in a bidding process that occurs prior to the start of the charging period. In a preferred embodiment the length of a charging period shall be aligned with the length of the aggregation period for operational statistics as defined in IETF RFC 1857. In many telecommunications networks today, an aggregation period of 15 minutes is used—therefore a preferred embodiment assumes a uniform charging period length of 15 minutes which may be synchronized to start and stop at the same time as the aggregation period for operational statistics. This synchronization or at least alignment with a negligible time gap allows creating a feedback loop which utilizes the operational statistics and other statistics gathered also in 15 minute intervals, such as user experience statistics, drive tests in mobile networks doing automatic test calls and measuring the call quality, applications in mobile handsets doing regular ping tests to measure the availability of low latency access etc. Of course other charging period durations such as 5 minute intervals or even shorter are possible.

The concept of the invention is to introduce a bidding process where each bidder from a multiplicity of bidders with a minimum of one bidder can place a bid for an element of an offer stream issued by the charging party. That offer stream comprising offer stream elements being demand type specific and termination time specific offered charging period instances. It is to be understood that the termination time of charging period instance n is the start time of charging period instance n+1. Offered charging period instances may comprise a minimum price per chargeable consumption unit. A bidder may aggregate multiple bids and place them in a single request via a network entity to the brokering entity of the charging party. In one bidding event a bidder represented by a network entity may place 96 bids for the 96 offered charging period instances of one day (when a uniform charging period duration of 15 minutes is assumed and no demand type differentiation is offered). The definition of the bidding process not only includes the definition of the charging period duration(s), but also the definition of the minimum and maximum time difference between providing a bid for a charging period and the start time of when the offered charging period becomes an active charging period or instantiates as active charging period. In another preferred embodiment again without demand type differentiation offered, a bidder may place in one bidding event up to 672 bids (7 for charging period of each day of the coming week). In an embodiment with demand type differentiation offered the amount of bids may be multiplied if the bidding occurs separately for each demand type. For example, the demand type may be differentiated by the QoS demanded by the demand instance via an associated context of the demand instance. Demand types may be differentiated into 8 differentiated priority classes whereby increasing the number of bids by a factor 8 to 5376 bids which have to be considered per week and per bidder. It is therefore essential, that the bidding process is performed in an automated way where a bidding engine of the charging party keeps track of all bids and of the resulting association of bids to charging period specific success-classes (success class instances). For each demand type specific charging period this association may be performed by a so called bid ranking rule. In addition, it is assumed that the brokering entity interworks with the resource schedulers of respective resources in a direct or indirect way, and that the schedulers create charging information. We refer to the function as the enforcement function for preferential treatment and charging, or in short as enforcement function. The enforcement function is located in a network node such as a router, a switch, an eNodeB, a 5G NodeB or a hypervisor. Bidding is expected to be done initially manually, but evolve to be done in an automated way or semi-automated way based on policies set by the bidder. The business model is based on the business agreement between the charged party as bidder and the charging party as network resource owner or agent of the network resource owner that the charged party will be obliged to pay the amount it has bid for the consumption of each chargeable resource consumption unit that the users associated with the charged party consume during an active charging period, and that the minimum price predefined by the charging party applies instead of an electronic bid value received from a network entity if no bid was received, or the default price of 0 in case no minimum price had been defined. Based on the interpretation that what gets incremented for charging or accounting purposes in an accounting record, decremented or incremented in a PCEF (Policy and charging enforcement function) or decremented in a token bucket may be viewed as equivalent, the bid offered determines the price of a token in a token bucket algorithm employed for charging purposes.

All bids get associated to a success class. Additional fair arbitration methods may be used in case of multiple bids carrying the same electronic bid value, such as time of receipt of final bid, random numbers, round robin mechanisms across multiple bidding events etc. The lowest success class may be referred to as success-class 0. At least one of the bidders having offered the lowest price per chargeable consumption unit consumed during in the charging period will be assigned to the lowest success class. Multiple bidders may be assigned to the same success class, in which case there will be no preferential treatment between them—they will just share the same queue, a solution that is backwards compatible to the situation before introducing preferential treatment, and a solution that is fair if the multiple bidders all have not provided a bid. The charging party may demand a minimum price per chargeable consumption unit, and all bidding parties which do not provide a bid or only offer the minimum price in their bid will be placed into the lowest success-class and thus ranked lowest. All bidders that have offered the same price will be placed in the same success-class. When a first bidder offers a higher price per chargeable consumption unit than a second bidder, then the first bidder will be placed in a higher success-class then the second bidder. The success-class of a bidder during a charging period determines the bidder's priority rank that the scheduler applies when scheduling demand instances associated with the bidder during that charging period.

In case that the scheduler comprised in the enforcement function for preferential treatment and charging is scheduling a demand instance such as the arrival of data packets at an outgoing interface in a telecommunications network or the arrival of bits for transmission over a radio network or the arrival of a demand for placement of a virtual machine or an application in a mobile edge computing infrastructure and in case that a priority queue is normally used for that purpose, then the invention introduces a hierarchically structured recursive priority queue referred to as multidimensional priority queue, where the scheduler inspects first the higher order (higher dimension) priority queue in which demand instances comprising multiple chargeable resource consumption demand units are ordered according to the success-class of the associated bid.

It is important to understand exactly what is meant with the term "bid".

A bid is an integer number associated with the following additional information:
  a) A data type of the integer number e.g. int32, int64, int128, int256 or even higher
  b) The value of the integer number, also referred to as electronic bid value, or as bid.
  c) The identity of the originating network entity associated with the originating bidder
  d) An identification of the charging period instance to which the bid applies
  e) An identification of the charging party (network operator) (optional)
  f) An identification of the chargeable resource unit, to which the bid applies
  g) An identification of the contract between charging party (network owner) and the charged party (e.g. the bidder). For example it could define the rules for setting a minimum price.
  h) An identification of the consumption regional area for which the bid is valid (optional)
  i) Lifecycle status: received of the bid, from the perspective of the charging party (operator). Livecycle Status include the following
    a. Received at brokering entity from a network entity associated with bidder.
    b. Accepted (in a preferred embodiment, all bids get accepted)
    c. Accepted and Ranked into success class
    d. Success Class (priority rank) sent to Enforcement function
    e. Waiting at enforcement function to become active
    f. Active
    g. Post-active
    h. Deleted
  j) associated with a demand type specific offered and charging period instance, whereby said charging period instance having a lifecycle with the states "offered", is a single integer for one in the current charging period consumed chargeable resource consumption unit contained in said resource consumption demand. The result of the dequeueing operation applied to the higher order priority queue is the lower order priority queue. The lower order priority queue is as commonly used today in state of the art scheduling in packet switched telecommunications networks, such as in routers and switches, e.g. in weighted fair queuing or strict priority queuing In case that the scheduler is scheduling the assignment of resource blocks in a radio access network and in case that a priority queue is normally used for that purpose, then the invention introduces a hierarchically structured recursive priority queue referred to as multidimensional priority queue, where the scheduler dequeues first the higher order priority queue in which demands for resource consumption unit consumption are ordered according to the success-class of the bidder associated with said demand for resource consumption unit consumption. The result of the dequeue operation is the lower order priority queue as it is used today in state of the art scheduling of radio access network resources.

In case that the scheduler is scheduling the assignment of connected virtual compute resources and of connected virtual storage resources in such a way that preferential treatment means that a demand associated with a bidder associated with a higher success-class will receive preferential treatment over a demand associated with a bidder that is associated with a lower success-class during the current charging period. Preferential treatment may include faster placement of an application on a physical host that is located close to the user. Preferential treatment may include preferential placement of an application on a physical host that is located closer to the user and therefore is able to provide better user experience based on meeting a requirement of the application demanding low latency access of a certain low latency class such as maximum 25 milliseconds or even meeting a requirement for maximum 5 millisecond access which may be referred to as ultra low latency, applicable to both mobile and fixed networks access in telecommunications networks. If the scheduler for said application placement uses a normal queue or a priority queue, then the invention introduces a hierarchically structured recursive priority queue referred to as multidimensional priority queue, where the scheduler dequeues first the higher order priority queue in which demands for resource consumption unit consumption are ordered according to the success-class of the bidder associated with said demand for resource unit consumption. The result of the dequeue operation is the lower order priority queue as it is used today in state of the art scheduling of radio access network resources.

The enforcement of the preferential treatment of a resource consumption demand associated with a bidder according to the success-class in a particular charging period for a particular resource consumption class is based on introducing a priority queue containing as elements the instances of normal queues (which may itself be a priority queue or a normal queue). The concepts of queue and priority queue are well known concepts in scheduling. When a scheduler assigns resources to a particular first resource consumption demand, it identifies this first resource consumption demand by executing a dequeue operation on a queue, which may be a normal queue (first in first out) or a priority queue, where the insertion of an element into the queue requires sorting the element according to some priority.

In a preferred embodiment, the charged party is a 5G network slice instance owner, and the charged party's users are mobile subscribers that are permanently assigned to said 5G network slice instance, or alternatively mobile subscribers that get assigned to said 5G network slice based upon signaling an APN, or in another preferred embodiment based upon an application layer event that occurs during an access session (PDP context) that leads to certain IP flows getting offloaded to a 5G slice instance via traffic offload function as defined ETSI MEC, for example to satisfy ultra low latency requirements.

In order to describe the invention in detail, the following terms, abbreviations and notations will be used:
5G: fifth generation mobile network
LTE Long Term Evolution
PDP Packet Data Protocol
APN Access Point Name
QoS Quality of Service
MEC Mobile Edge Computing Systems, devices and methods according to the disclosure describe new charging concepts for communication networks, in particular multiservice and multilayer communication networks such as 5G mobile networks. Multiservice communication networks include facilities for charging, accounting and billing. In this context, charging designates the determination of a charge for a usage, e.g. during a charging period, in the sense that this determination is occurring in a charging event and that this charging event is defined as the event when a legal obligation is created between the charging party and the charged party, usually at the beginning or at the end of a usage, such as the arrival of one data packet from an access line of a subscriber in a fixed network.

According to a first aspect, the invention relates to a network resources brokering system, comprising: a communication network with at least one enforcement function for preferential treatment and charging ; and a brokering entity, configured to receive requests from a plurality of network entities for providing preferential treatment during usage of chargeable resources within a charging period, each request comprising an electronic bid value competing with other network entities for preferential treatment during the usage of chargeable resources in a predefined charging period, wherein the brokering entity is configured to rank each network entity from the plurality of network entities into one of a multiplicity of success classes based upon bids offered and to interwork with the enforcement function for preferential treatment and charging, which not only enforces the preferential treatment of demand instances associated with higher ranked network entities over demand instances associated with lower ranked network entities but also enforces the charging of the amount bid for each chargeable consumption unit consumed during the charging period to an account associated with the bidder, i.e. the network entity to which the preferentially treated chargeable usage is associated with, where chargeable usage is defined as the demand satisfaction of a chargeable resource consumption demand.

Such a network resources brokering system with enforcement function provides an intelligent charging which achieves efficient utilization of network resources, allows better monetization of network value and results in efficient use of network resources, even if no bid has been entered because a differentiated minimum price per charging period has the same effect as differentiated time of day accounting.

In an implementation form of the network resources brokering system, the brokering entity is configured to rank the network entities for each duration of a charging period according their success class. This ranking occurs prior to the start of the charging period.

In an implementation form of the network resources brokering system, the at least one chargeable resource unit is a wireless resource block, which constitutes a radio access network (RAN) resource and the brokering entity is configured to grant preferential treatment regarding the consumption of wireless resource blocks, which are known from 4G and are expected to be part of 5G in a similar way as well.

This provides the advantage that RAN resources can be better monetized by operators, and can be more efficiently used as some usages may be moved to other times of the day or of the week when demand for RAN resources is lower.

In an implementation form of the network resources brokering system, the brokering entity is configured to rank the plurality of network entities for the duration of one charging period according to their electronic bid values and to enforce the preferential treatment of any demand instances associated with a higher ranked network entity over any demand instances associated with a lower ranked network entity.

In an implementation form of the network resources brokering system, the brokering entity is configured to assign a maximum of one network entity to a success class, allowing a clear ranking of network entities. In case network entities provided the same electronic bid value, the network entity gets ranked higher where the bid has been received earlier, or a fair arbitration across the multiplicity of bids in one bid or even across multiple subsequent bidding events, such as assigning a preference joker round robin among the network entities.

In an implementation form of the network resources brokering system, the brokering entity is configured to assign multiple network entities to the same success class and instruct the enforcement function for preferential treatment and charging to apply a predefined fair arbitration scheme such as a round robin distribution among the priority queues of equally ranked bidders or employ one priority queue per success class instead of one priority queue per bidder.

In an implementation form of the network resources brokering system, the chargeable resource is a QoS differentiated compute unit provided by a virtual machine or by a container where the QoS is differentiated by multiple low latency classes.

This provides the advantage that by using a high electronic bid value for such a chargeable resource, a demand instance associated with the network entity where the demand instance comprises chargeable resource units being compute cycles on a low latency mobile edge compute platform associated with a predefined low latency class such as one with an SLA that guarantees a maximum latency class of 25 milliseconds can be provided faster and in case of resource scarceness with preferential access to the scarce resource. Such scarce resource are not limited to compute resources itself, rather may include demand instances that requests the execution of the compute cycles in way that they are collocated with other demand instances to run in the same CPU or even in the core of a multi-core processor—so called "pinning".

In an implementation form of the network resources brokering system, the charging period is predetermined having a predetermined start time and a predetermined duration.

This provides the advantage that the network entities know at what time and how long they can benefit from preferential treatment.

In an implementation form of the network resources brokering system, the communication network is a network according to a 3GPP defined fifth generation (5G), and wherein the 5G slice instance owner or the end customer exclusively using a 5G slice instance is the network entity that benefits from the preferential treatment.

In an implementation form of the network resources brokering system, the brokering entity is configured to interwork directly with at least one enforcement function for preferential treatment and charging in order to provide preferential treatment to demand instances associated with the selected network entity during a charging period.

In an implementation form of the network resources brokering system, the brokering entity is configured to interwork indirectly via a plurality with a minimum of one enforcement function management system with a plurality with a minimum of one enforcement function for preferential treatment and charging in order to provide preferential treatment to demand instances associated with the selected network entity during a charging period.

In an implementation form of the network resources brokering system, the brokering entity is configured to instruct a minimum of one online charging function to charge the amount bid for the consumption of each chargeable consumption unit consumed during a charging period.

In an implementation form of the network resources brokering system, the brokering entity is configured to instruct a minimum of one online charging function as defined by 3GPP to charge the amount bid for the consumption of each chargeable consumption unit consumed during a charging period.

In an implementation form of the network resources brokering system, the brokering entity is configured to instruct a minimum of one offline charging function as defined by 3GPP to charge the amount bid for the consumption of each chargeable consumption unit consumed during a charging period.

In an implementation form of the network resources brokering system, the brokering entity is configured to instruct a 3GPP defined PCRF to create a policy and charging rule set which automatically and simultaneously changes the charging rules and the policy at charging period change events whereby simultaneously enforcing the change of preferential treatment policies and the change of charging policies to reflect the bids offered for the charging periods prior to and after the charging period change.

In an implementation form of the network resources brokering system, the brokering entity is configured to instruct a wholesale PCRF to create a policy and charging rule set which automatically and simultaneously changes the charging rules and the policy at charging period change events whereby simultaneously enforcing the change of preferential treatment policies and the change of charging policies to reflect the bids offered for the charging periods prior to and after the charging period change.

In an implementation form of the network resources brokering system, the brokering entity is configured to instruct a network function responsible for the management of the enforcement of the preferential treatment & charging to interface with network elements implementing an enforcement function for preferential treatment & charging.

In an implementation form of the network resources brokering system, the brokering entity is configured to instruct a network function responsible for the management of the preferential treatment & charging, which in turn interfaces with enforcement functions for preferential treatment & charging implemented on network elements.

In an implementation form of the preferential treatment and charging enforcement function comprised in the network resources brokering system, the preferential treatment and charging enforcement function is configured to automatically detect a charging period change event that separates an old charging period n from a new charging period n+1 and upon that detection to simultaneously perform the following actions simultaneously for all bidders, whereby all the simultaneous changes are being effected by executing a single command that writes a new value to a memory location:

Change the preferential treatment in such a way that demand instances arriving in the new charging period which are associated with a first bidder having provided a higher electronic bid value for the consumption of a chargeable consumption unit during the new charging period than a second bidder will receive preferential treatment over demand instances that are associated with that second bidder.

Change the charging of chargeable consumption units in such a way, that upon demand satisfaction of demand instances that are associated with a bid of a first bidder and that are arriving in the new charging period that for each chargeable resource consumption demand unit comprised in such a demand instance the amount of charge that gets charged to an account of that first bidder is being determined by the electronic bid value of that bid of that first bidder, whereby that bid has been provided for the right to consume chargeable consumption units in exchange for a monetary value that is determined by that electronic bid value.

Determine the amount of chargeable consumption units that have been consumed during the old charging period for demand satisfactions of all the demand instances that have arrived during the old charging period and that are associated with the bid of a bidder for the old charging period.

In a variation of the above implementation form these simultaneous changes are being effected in hardware (ASIC) by the lapse of a single clock cycle.

In another variation of the above implementation form these simultaneous changes are being effected by the lapse of a single clock cycle in an FPGA (field programmable gate array).

In another variation of the above implementation form these simultaneous changes are being effected by the lapse of a single clock cycle in a hardware entity referred to as programmable silicon.

In a variation of the above implementation form which may be combined with any of the 4 previously described implementation forms whereby the simultaneous changes are being effected in a single command in software software, or are being effected in a single clock cycle in hardware based on ASIC, FPGA or other programmable hardware such as programmable silicon the single command or the single clock cycle effecting the change of a value of a memory which is being used as pointer to one first array of pointers referred to as active period pointer array, which itself is linked in a ring data structure with 2 other pointer arrays, including to a successor array of pointers being referred to as next period pointer array and indirectly via the successor of the successor or directly via a predecessor pointer to a third array of pointers being referred to as previous period pointer array, whereby each of these 3 pointer array comprises for each bidder a multiplicity of pointers with a minimum of 2 pointers, one of these pointers being a pointer to a token bucket (thus 3 buckets are associated with each bidder, an active period bucket, a next period bucket and a previous period bucket) and another of these minimum 2 pointers being a pointer to a multidimensional priority queue (thus 3 multidimensional priority queues are associated with the bidder, an active period multidimensional priority queue, a next period multidimensional priority queue and a previous period multidimensional priority queue, whereby a demand instance associated with a bidder gets enqueued with a priority that is equal to the success rank of the bid for the current charging period. This means that if the bidder has provided the highest bid in the current charging period, it will be put at the head of the priority queue—in front of other demands already waiting for the start of their demand satisfaction, whereby the pointer to the active multidimensional priority queue of bidders having provided the same electronic bid value being identical, i.e. are pointing to the same multidimensional priority queue demand instances get dequeued for demand satisfaction.

This provides the advantage that the network resources are chargeable which means that they may be partitioned into small chargeable resource consumption units, e.g. by a time-multiplex, frequency-multiplex or space-multiplex mechanism such as timeslots on a network link using time division multiplex, codes in a radio link based on CDMA, wireless resource blocks in a 4G LTE or 3-dimensional wireless resource blocks in 5G "new radio" network where radio resources may be viewed as being structured in the dimensions time, space and frequency, or electrical power units such as energy used for radio transmission, with energy units used for demand satisfaction not only measured in milliwatt or microwatt or nanowatt, but at the same time partitioned into chargeable resource units that are 1 milli-Watt, 1 Micro-Watt or 1 Nano-Watt or one femto-Watt or another such energy unit according to the metric system. A network operator or cloud service provider making the energy units chargeable, that are used to provide the service creates an incentive to save energy. This has the benefit that in the long run energy efficiency will increase and climate change will be slowed down if adopted on a large scale.

In an implementation form of the network resources brokering system, the enforcement function for preferential treatment and charging is configured to receive a stream of input data comprising for each bidder and for each charging period the bid offered by the bidder, and is also configured to rank demand instance arrivals according to the priority rank of the success class associated with this bid, and is further configured to determine the amount of tokens consumed during a charging period for the demand satisfaction of demands, and to create an output stream comprising for each bidder and for each past charging period the amount of tokens consumed during the charging period.

This provides the advantage that the selected network entity can be preferred when accessing the network resources, e.g. by being the first on a list or by having the highest priority or other strategies.

In an implementation form of the network resources brokering system, the preferential scheduling is a preferential scheduling with respect to time and/or space.

This provides the advantage that the selected network entity is first served when there is available capacity on the network resource or that the selected network entity gets access to a network resource in close proximity to the user associated with the network entity in order to save power and reduce latency for connecting to the network resource.

In an implementation form of the network resources brokering system, a length of the charging period is aligned with a length of an aggregation period for providing operational statistics of the communication network.

This provides the advantage that statistics of the communication network, e.g. key performance indicators or a quality measure can be exploited to create a feedback loop which can be used for mashine learning and artificial intelligence in support of the charging party and the charged parties.

According to a second aspect, the invention relates to a brokering entity for providing access to at least one network resource of a communication network, the brokering entity comprising: a receiver, configured to receive requests from a plurality of network entities for accessing the at least one network resource within a charging period, each request comprising an electronic bid value competing with other network entities for accessing the at least one network resource with preferential treatment; and a controller, configured to determine for each charging period a bid ranking according to the bids offered by assigning the bids to a success class, where the success classes are ranked according to the amount of the electronic bid value in such a way, that a bidder providing a higher bid gets ranked higher and gets preferential treatment over a bidder that has provided a lower bid value.

Such a brokering entity interworking with the enforcement function for preferential treatment and charging provides an intelligent charging mechanism which achieves efficient utilization of network resources, in particular in a next generation mobile network where network resources are dynamically provided.

In an implementation form of the brokering entity, the communication network is a network according to a fifth generation (5G) or according to a further generation, and wherein the preferential treatment and charging enforcement function is configured to provide preferential treatment and charging to demand instances requesting the scheduling of wireless resource units according to the 5G New Radio (i.e. resource units in the dimensions time, space and frequency) whereby the charging being based not on any of the dimensions time, space and frequency, but rather on the amount of energy consumed during demand instance satisfaction, whereby said energy consumption is being measured and recorded by the 5G radio access technology equipment in energy units that are a metrical subunit of Watt, i.e. a unit that can be expressed as 10 exp n Watt with n being a negative integer number. Examples of such units are Milli-Watt, Micro-Watt, Nano-Watt, Femto-Watt.

This provides the following benefit: as a large amount of energy is consumed in access (perhaps up to 30% of all energy consumed by a fixed or mobile operator), any incentive to reduce energy consumption can have a significant effect on energy efficiency.

According to a third aspect, the invention relates to a system for resource consumption scheduling in a telecommunications network based on bids offered, characterized by said resource consumption scheduling system being operated by a charging party granting preferential treatment during a charging period to a charged party that has been determined as successful bidder in a bidding process that occurred prior to the start of said charging period.

In an implementation form of the system, said resource consumption scheduling is the scheduling of the consumption of chargeable resource consumption units.

In an implementation of the system, said usage is the demand satisfaction of a chargeable resource consumption demand.

In an implementation of the system, said chargeable resource consumption demand satisfaction is the consumption of one chargeable resource unit for each chargeable resource consumption demand unit contained in the chargeable resource consumption demand.

In an implementation form of the system, said preferential treatment is the preferential scheduling of said consumption of said chargeable resource consumption units.

In an implementation form of the system, said preferential scheduling of said consumption of said chargeable resource consumption demand units is the preferential scheduling in the time dimension, characterized by said demand of said successful bidder getting satisfied prior to a lower ranked bidder in case both demand side parties compete for access to a chargeable resource consumption unit.

In an implementation form of the system, said preferential scheduling of said consumption of said chargeable resource consumption demand units is the preferential scheduling in the space dimension, and said successful bidder is serviced by a preferential placement of a network service function.

In an implementation form of the system, preferential placement of a network service function is the placement of a network service function in a cloudlet infrastructure that is located close to the user in order to minimize access latency.

In an implementation form of the system, said preferential scheduling of said consumption of said chargeable resource consumption units is the preferential scheduling in the space and time dimensions, and said successful bidder is serviced by preferential access to radio resources.

In an implementation form of the system, said preferential access to radio resources is achieved by assigning better QCI values during the charging period.

In an implementation form of the system, said telecommunications network is a public land mobile network.

In an implementation form of the system, said telecommunications network is a public land fixed network.

In an implementation form of the system, said telecommunications network is a 5G mobile network.

In an implementation form of the system, said charging party is the supply side party in said bidding process.

In an implementation form of the system, said charged party is a minimum of one demand side party that is part of a set of demand side parties that belong to a multiplicity with a minimum of one demand side parties which participate in said bidding process.

In an implementation form of the system, said charging period is the time between two charging period change events.

In an implementation form of the system, the first one of said charging period change events is the start of the first charging period.

In an implementation form of the system, each said charging period change event except said first one is marking the end of a charging period and the start of the next charging period.

In an implementation form of the system, said charging period is a predetermined charging period with a predetermined charging period start time and a predetermined charging period duration.

In an implementation form of the system, said predetermined charging period duration is 15 minutes.

In an implementation form of the system, said predetermined charging period duration is 10 minutes.

In an implementation form of the system, said predetermined charging period duration is 5 minutes.

In an implementation form of the system, said predetermined charging period duration is 1 minute.

In an implementation form of the system, said predetermined charging period duration is 1 second.

In an implementation form of the system, said successful bidder is determined in a bidding process that involves said charging party offering a multiplicity with a minimum of one charging periods with preferential treatment for the successful bidder.

In an implementation form of the system, said successful bidder is determined in said bidding process and said bidding process comprises a multiplicity of bidding rounds with a minimum of one bidding round.

In an implementation form of the system, the bidding process determines a single successful bidder.

In an implementation form of the system, the bidding process determines a multiplicity of successful bidders that are ranked according to their offered bids, where only the bidders with the lowest bid do not get a preferential treatment, and where all bidders that have offered the same bid for a charging period get treated equally according to a fair arbitration method, and where higher ranked successful bidders get preferential treatment over lower ranked successful bidders and over unsuccessful bidders who offered the lowest bid.

In an implementation form of the system, said fair arbitration method is round robin scheduling starting with a random successful bidder from the set of successful bidders having offered the same bid.

In an implementation form of the system, said fair arbitration method is round robin scheduling starting with the bidder who provided the first of the successful bids (time of bidding).

In an implementation form of the system, said fair arbitration method is a scheduling method that is based on selecting a random successful bidder from the set of successful bidders having offered the same bid.

In an implementation form of the system, each demand side party belonging to a multiplicity of demand side parties is determined as successful bidders for a resource consumption unit during a charging period based on the fact that each of said demand side party belonging to a multiplicity of demand side parties is determined as successful bidders having offered the same bid price in the final round of said bidding process for each said resource consumption unit consumed during said charging period.

In an implementation form of the system, a single demand side party is determined as successful bidder for a charging period based on the fact that said single demand side party has offered the highest bid for said resource consumption unit during said charging period.

The system according to the third aspect can also be implemented as a method or as a business model.

BRIEF DESCRIPTION OF THE DRAWINGS

Further embodiments of the invention will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
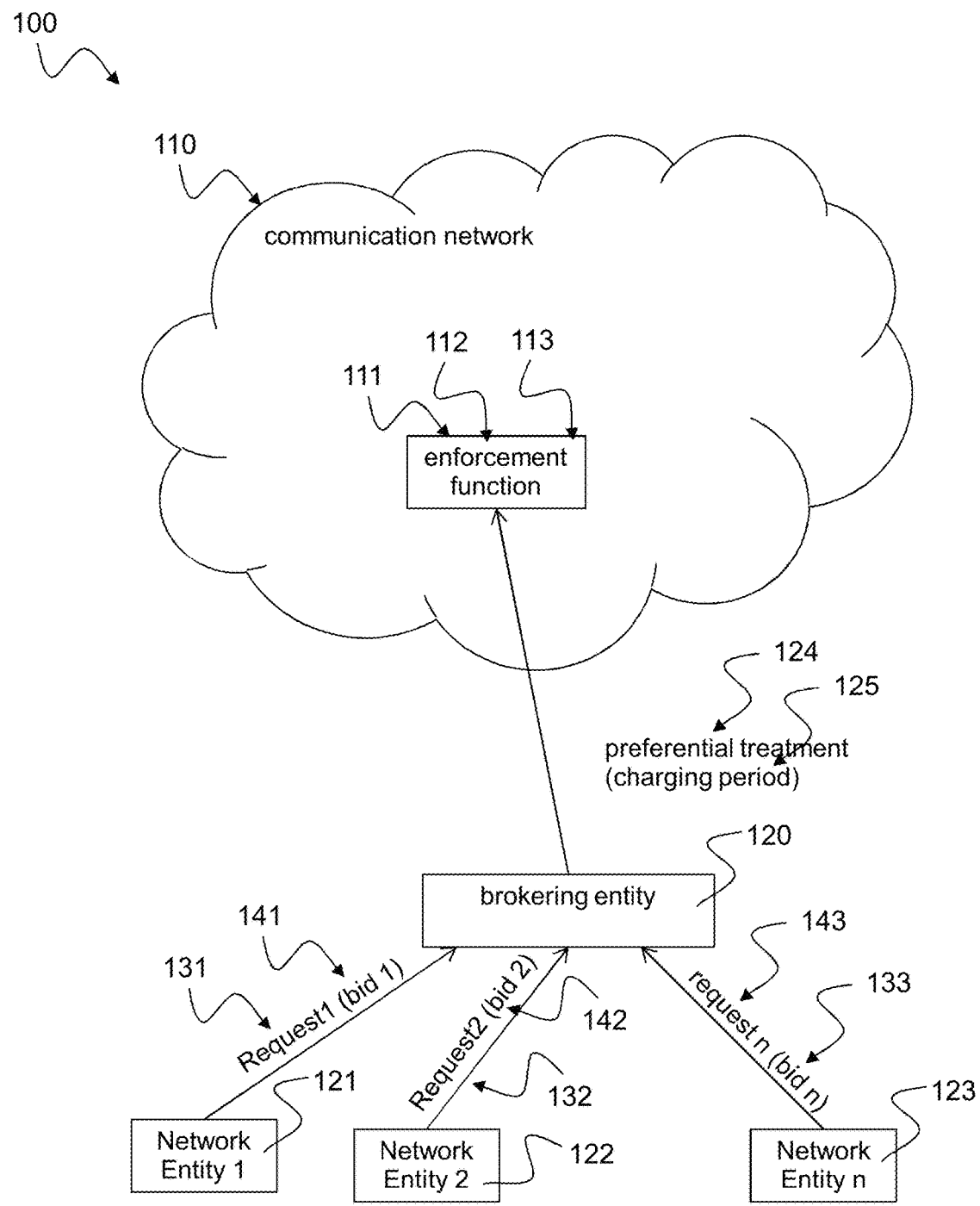
FIG. 1 shows a schematic diagram illustrating a network resources brokering system 100 according to the disclosure.

FIG. 1 shows a schematic diagram illustrating a network resources brokering system 100 according to the disclosure. The network resources brokering system 100 includes a communication network 110 with at least one enforcement function for preferential treatment and charging and a brokering entity 120.

The brokering entity 120 receives requests 131, 132, 133 from a plurality of network entities 121, 122, 123 for providing preferential treatment 124 during usage of chargeable resources 111, 112, 113 within a predefined charging period 125, each request comprising an electronic bid value 141, 142, 143 competing with other network entities 121, 122, 123 for preferential treatment during the usage of chargeable resources in the charging period 125. The brokering entity 120 ranks each network entity 121 from the plurality of network entities 121, 122, 123 into one of a multiplicity of success classes based upon their electronic bid values offered and to interwork with the at least one enforcement function for preferential treatment and charging.

The brokering entity 120 may rank the network entities 121 according to their success class prior to a start of the charging period 125.

The at least one chargeable resource 111, 112, 113 may be a wireless resource block, which constitutes a radio access network (RAN) resource and the brokering entity 120 may grant preferential treatment regarding the consumption of wireless resource blocks. The brokering entity 120 may rank the plurality of network entities 121, 122, 123 according to their electronic bid values 141, 142, 143 and may enforce the preferential treatment of any higher ranked network entity over any lower ranked network entity.

The brokering entity 120 may assign a maximum of one network entity to a success class, allowing a clear ranking of network entities. The brokering entity may assign multiple network entities to the same success class and may apply fair arbitration schemes such as a round robin distribution among the priority queues of equally ranked bidders.

The chargeable resource may be a QoS differentiated compute unit provided by a virtual machine or by a container where the QoS differentiation is differentiated by a low latency class. The charging period 125 may be predetermined having a predetermined start time and a predetermined duration.

The communication network 110 may be a network according to a 3GPP defined fifth generation (5G), and wherein a 5G slice instance owner benefits from the preferential treatment.

The brokering entity 120 may interwork directly or indirectly via a enforcement function management system with at least one enforcement function for preferential treatment and charging in order to provide preferential treatment to demands associated with the selected network entity during a charging period.

The brokering entity 120 may instruct a minimum of one online charging function to charge the amount bid for the consumption of each chargeable consumption unit consumed during a charging period. The brokering entity may instruct a minimum of one online charging function as defined by 3GPP to charge the amount bid for the consumption of each chargeable consumption unit consumed during a charging period. The brokering entity may instruct a minimum of one offline charging function as defined by 3GPP to charge the amount bid for the consumption of each chargeable consumption unit consumed during a charging period.

The brokering entity may instruct a 3GPP defined PCRF to create a policy and charging rule set which automatically and simultaneously changes the charging rules and the policy at charging period change events whereby simultaneously enforcing the change of preferential treatment policies and the change of charging policies to reflect the bids offered for the charging periods prior to and after the charging period change.

Figure 2:
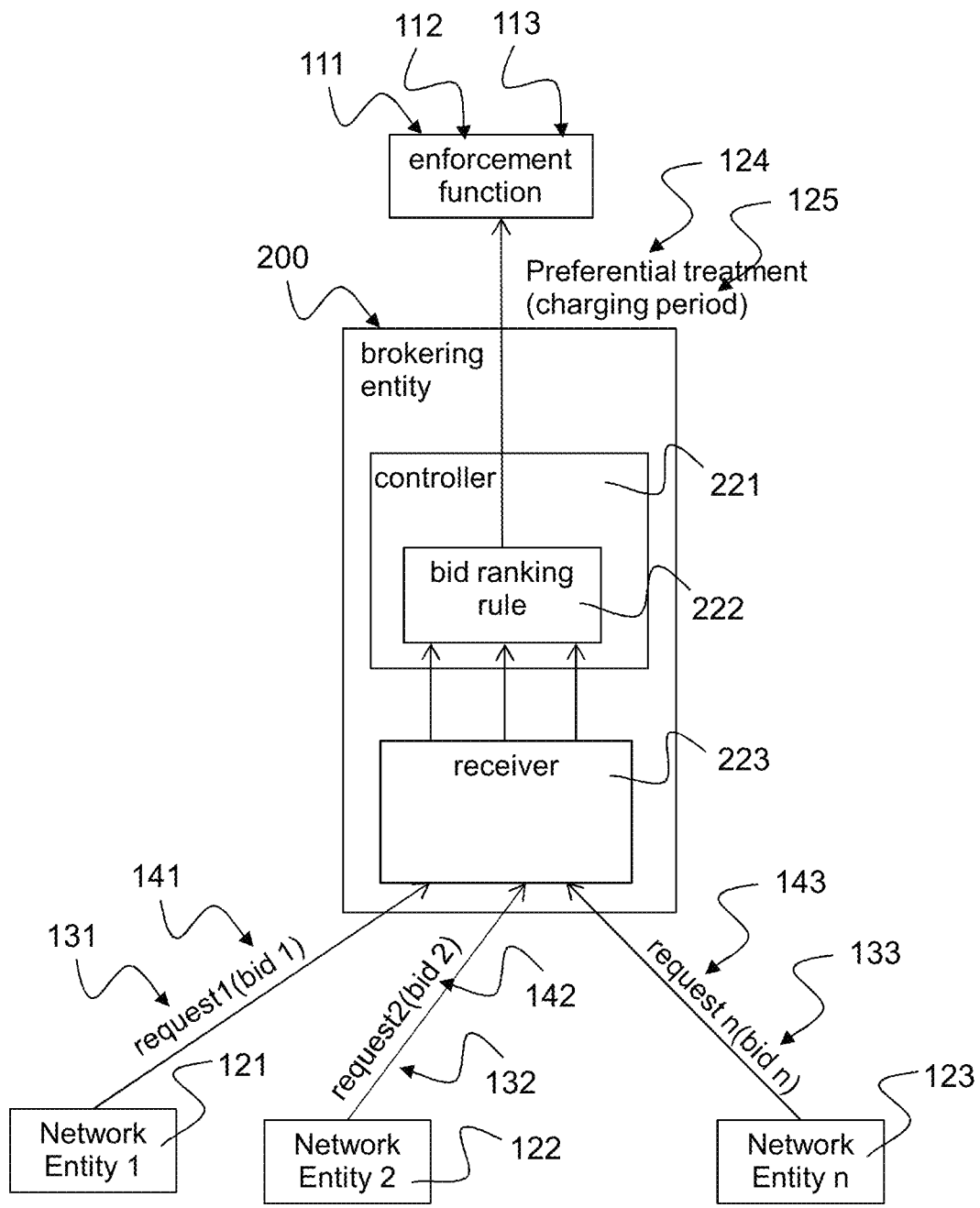
FIG. 2 shows a block diagram of a brokering entity 200 according to the disclosure.

FIG. 2 shows a block diagram of a brokering entity 200. The brokering entity 200 includes a receiver 223 and a controller 221.

The receiver 223 receives requests 131, 132, 133 from a plurality of network entities 121, 122, 123 for accessing 124 at least one network resource 111, 112, 113 within a charging period 125. Each request 131, 132, 133 includes an electronic bid value 141, 142, 143 competing with other network entities 121, 122, 123 for accessing the at least one network resource 111, 112, 113 with preferential treatment.

The controller 221 determines for each charging period a bid ranking according to the electronic bid values offered by assigning the electronic bid values to a success class. The success classes are ranked according to the amount of the electronic bid value in such a way, that a bidder providing a higher bid gets ranked higher and gets preferential treatment over a bidder that has provided a lower bid value.

The communication network 110 may be a network according to a fifth generation (5G) according to a further generation. The controller 221 may grant the selected network entity 121 access 124 with preferential treatment to at least one network resource of a network slice of the communication network.

Figure 3:
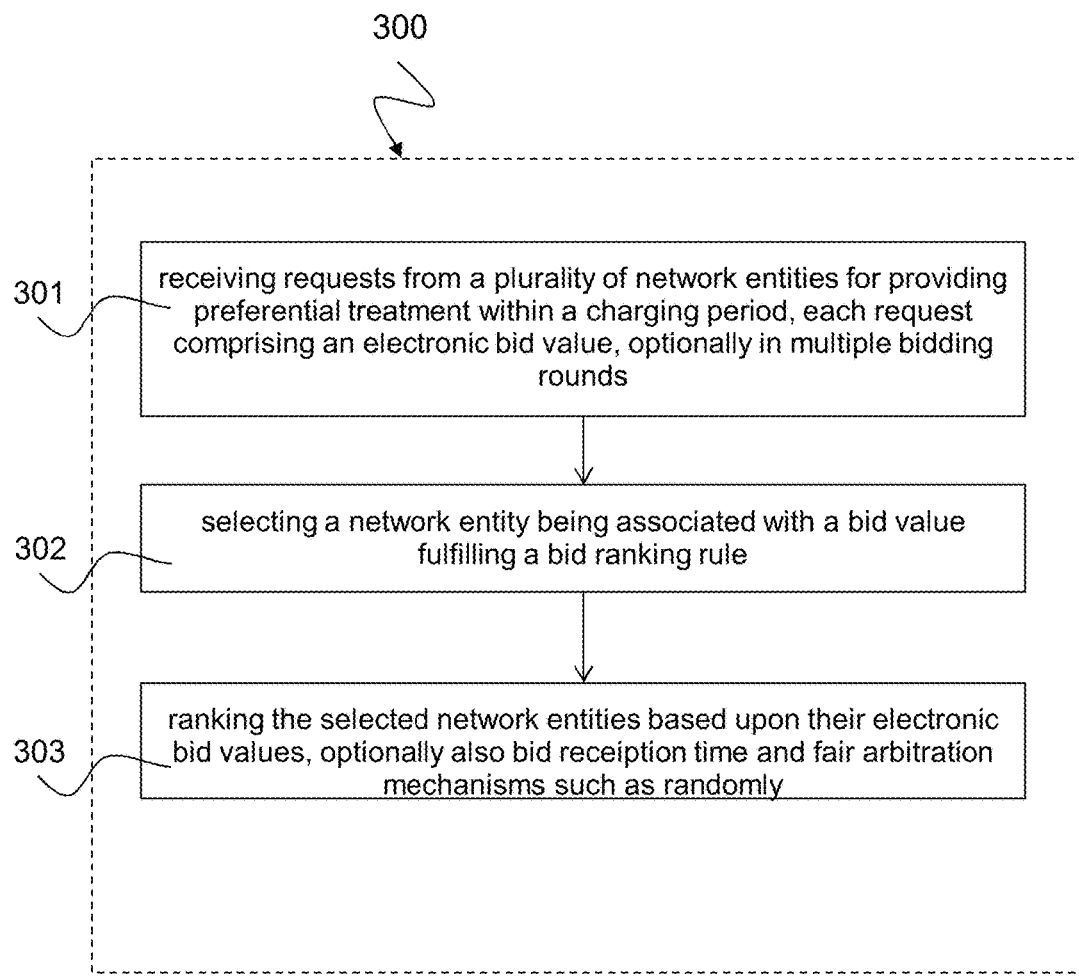
FIG. 3 shows a schematic diagram illustrating a brokering method 300 according to the disclosure.

FIG. 3 shows a schematic diagram illustrating a method 300 for providing access to at least one network resource of a communication network according to the disclosure.

The method 300 includes receiving 301 requests from a plurality of network entities for providing preferential treatment within a charging period, each request comprising an electronic bid value, e.g. as described above with respect to FIGS. 1 and 2. The method 300 further includes selecting 302 a network entity being associated with a bid value fulfilling a bid ranking rule, e.g. as described above with respect to FIGS. 1 and 2. The method 300 further includes ranking 303 the network entities based upon their electronic bid values, e.g. as described above with respect to FIGS. 1 and 2. The method 300 may be run on a brokering entity 120, 200 as described above with respect to FIGS. 1 and 2.

In a preferred embodiment, the network entity (i.e. the charged party) is a 5G network slice owner, and the charged party' s users are mobile subscribers that are permanently assigned to said 5G network slice, or alternatively mobile subscribers that get assigned to said 5G network slice based upon signaling an APN (access point name, i.e. a gateway between a GSM, GPRS, 3G, 4G or 5G mobile network and another communication network, e.g. the Internet), or in another preferred embodiment based upon an application layer event that occurs during an access session (packet data protocol PDP context, i.e. a data structure present on both the serving support node and the gateway support node which contains the subscriber's session information when the subscriber has an active session) that leads to certain IP flows getting offloaded or redirected to another 5G slice, for example to satisfy ultra low latency requirements.

A preferred embodiment is based on 15 minute charging periods. A preferred embodiment is based on demand side parties using machine learning that builds a model based on a learning period with random bids or human expert provided bids, which evaluates the resulting user experience for an MVNO or 5G slice owner and applies the learned model for future automatic bidding once the model has learned enough in a initial training phase. Key for learning is the feedback loop enabled by operational measurement data or application ping data and other statistic data and network event data.

Another preferred embodiment is based on an innovative scheduling method which allows implementing the hierarchical preferential treatment of successful bidders using an innovative scheduling algorithm.

Another preferred embodiment is the enforcement of the preferential treatment according to the success-class determined in the bidding process.

Another preferred embodiment is describing the details of an innovative 5G New Radio Scheduler, how to implement the procedures occurring at a charging period change in realtime in an efficient and scalable way.

Another preferred embodiment is based on realtime charging based on European Patent EP 1371 220 B1.

Figure 4:
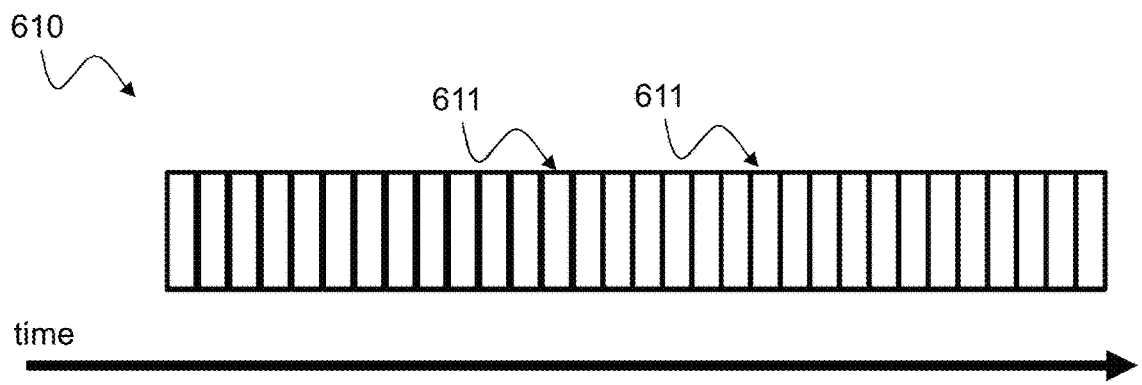
FIG. 4 shows a schematic diagram illustrating a chargeable resource 610 according to a first implementation.

FIG. 4 shows a schematic diagram illustrating a chargeable resource 610 according to a first implementation.

A chargeable resource is a resource owned by a resource owner who has decided to charge a minimum of one charged party for the consumption of the resource. An example of a chargeable resource 610 comprising multiple chargeable resource consumption units 611 is shown in FIG. 4. An example of a chargeable resource is the resource required to consume one byte (comprising 8 bit) of data contained in an IP packet, where consume may mean store, or forward, or store and forward, or receive, or transmit.

Figure 5A:
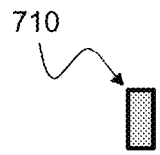
FIG. 5(a) shows a schematic diagram illustrating a chargeable resource consumption demand unit 710 according to an embodiment.

FIG. 5(a) shows a schematic diagram illustrating a chargeable resource consumption demand unit 710 according to an embodiment.

A chargeable resource consumption demand unit 710 represents a unit of a demand for the consumption of one unit of a chargeable resource, for example a demand for the consumption of one byte of data or for the consumption of one wireless resource block.

Figure 5B:
FIG. 5(b) shows a schematic diagram illustrating a demand 720 according to an embodiment.

FIG. 5(b) shows a schematic diagram illustrating a demand 720 according to an embodiment.

A demand 720 is an object that comprises multiple chargeable resource consumption demand units. An abstract demand has a yet undefined arrival start time and a yet undefined arrival completion time, and a yet undefined number of resource consumption demand units—the number of resource consumption demand units shown here is just for illustration. Examples of demands are packets arriving at the scheduler of a network switch, where each byte of the packet represents a chargeable resource consumption demand unit. Another example for a demand is a byte arriving at a radio network controller, requiring a number of wireless resource blocks for transmission over a radio link, where said number of wireless resource blocks is equal to the number of resource consumption demand units contained in the demand.

Figure 5C:
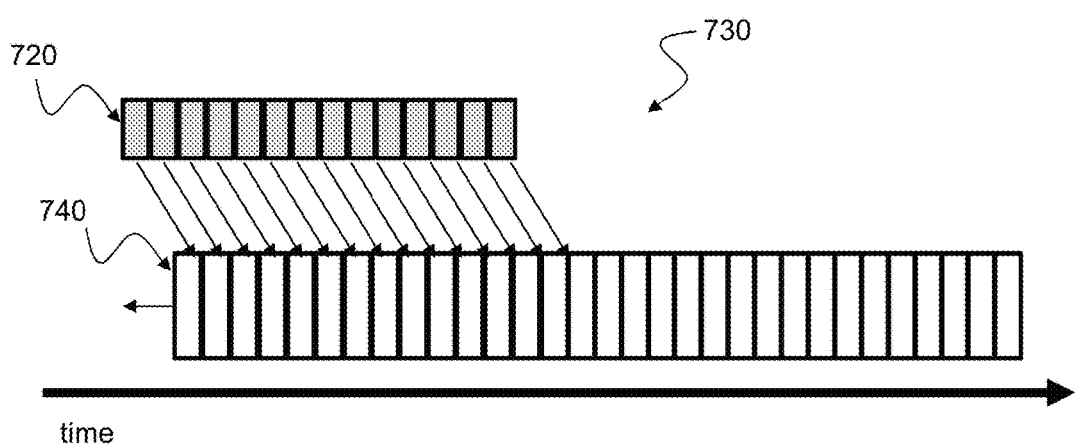
FIG. 5(c) shows a schematic diagram illustrating a demand satisfaction 730 according to an embodiment.

FIG. 5(c) shows a schematic diagram illustrating a demand satisfaction 730 according to an embodiment.

A demand satisfaction 730 is the mapping of a demand 720 to a sufficient number of unused resource consumption units 740 such that each resource consumption demand unit gets mapped to a free resource consumption unit which becomes available in time, and the usage of said mapped resource consumption units by that resource consumption demand units such that after the usage these resource consumption units are no longer unused. FIG. 5(c) above shows the usage.

Figure 6A:
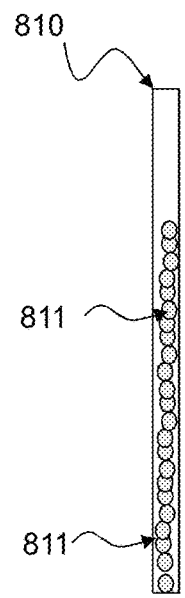
FIG. 6(a) shows a schematic diagram illustrating a charging event, account and token 810 according to an embodiment.

FIG. 6(a) shows a schematic diagram illustrating a charging event, account and token 810 according to an embodiment.

The charging event is the moment when a legal obligation is created according to a contract, for example at a usage time. During the charging event, an account 810 gets incremented or decremented by a number of tokens for each chargeable consumption unit that gets consumed. Incrementing an accounting record (accounting account or postpaid account) by 8 can be interpreted as adding 8 tokens, decrementing a prepaid account (realtime charging account, online charging account, token bucket) by 5 can be interpreted as removing 5 tokens.

Figure 6B:
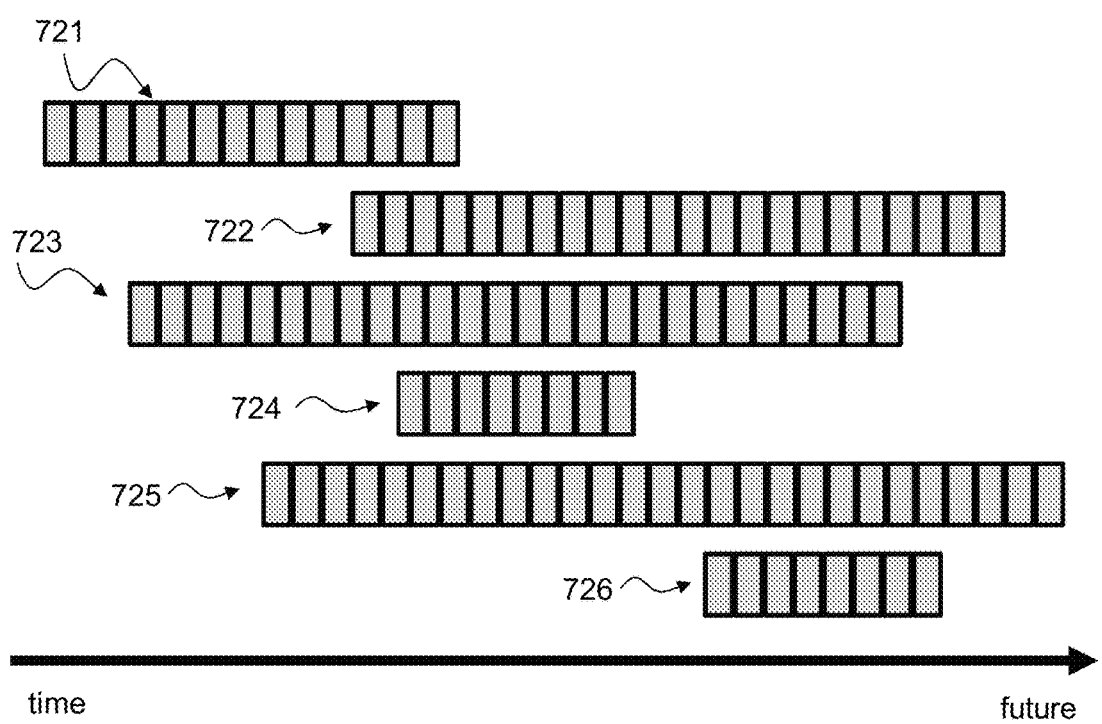
FIG. 6(b) shows a schematic diagram illustrating demand instances 721, 722, 723, 724, 725, 726 according to an embodiment.

FIG. 6(b) shows a schematic diagram illustrating demand instances 721, 722, 723, 724, 725, 726 according to an embodiment.

A demand instance is a demand with a defined arrival start time, a defined arrival stop time and a defined number of chargeable resource consumption demand units in a defined number of resource dimensions (e.g. resource dimension byte, or e.g. resource dimension wireless resource block, etc). A multidimensional demand contains resource consumption demand units of multiple dimensions.

Figure 7A:
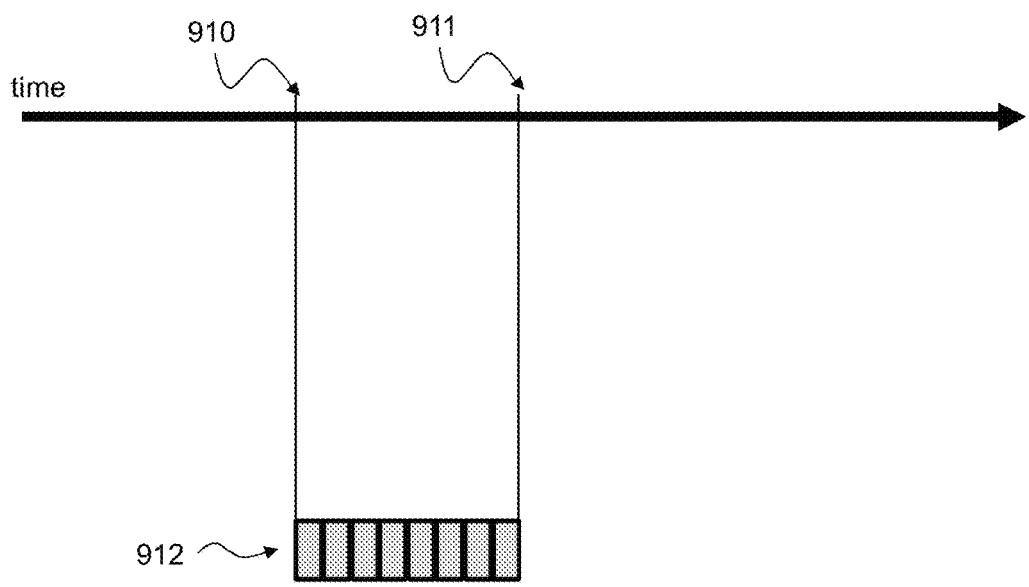
FIG. 7(a) shows a schematic diagram illustrating an exemplary time sequence of a demand according to an embodiment.

FIG. 7(a) shows a schematic diagram illustrating an exemplary time sequence of a demand according to an embodiment. The time sequence includes the demand instance arrival start time 910 and the demand instance arrival completion time 911.

Figure 7B:
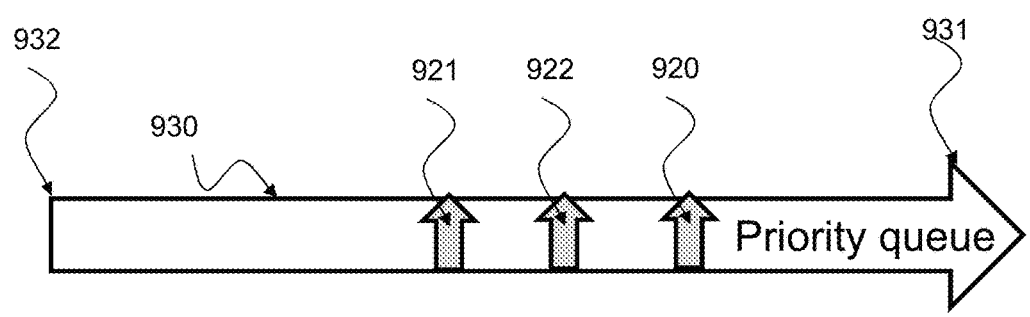
FIG. 7(b) shows a schematic diagram illustrating an exemplary priority queue 930 according to an embodiment.

FIG. 7(b) shows a schematic diagram illustrating an exemplary priority queue 930 according to an embodiment.

This figure shows a priority queue 930 comprising a queue-head 931 and a queue-tail 932, said priority queue currently containing 3 elements 920, 921, and 922. The elements in this example are shown in the form of an arrow, to indicate that depending on implementation the elements may be pointers, such as pointers to demand instances. In case the elements are inserted into the queue strictly depending on arrival time (either start time or completion time), then the insertion may be achieved by a simple enqueue operation at the respective arrival time to the tail of the queue. In that case the priority queue is the special case of a normal queue. In case that at arrival time the insertion requires sorting of the existing elements to find the right insertion position, the priority queue is truly a priority queue, because it supports insertion of a new element into any position according to the priority of element that gets inserted, and the priorities of the elements already in the queue.

Figure 8:
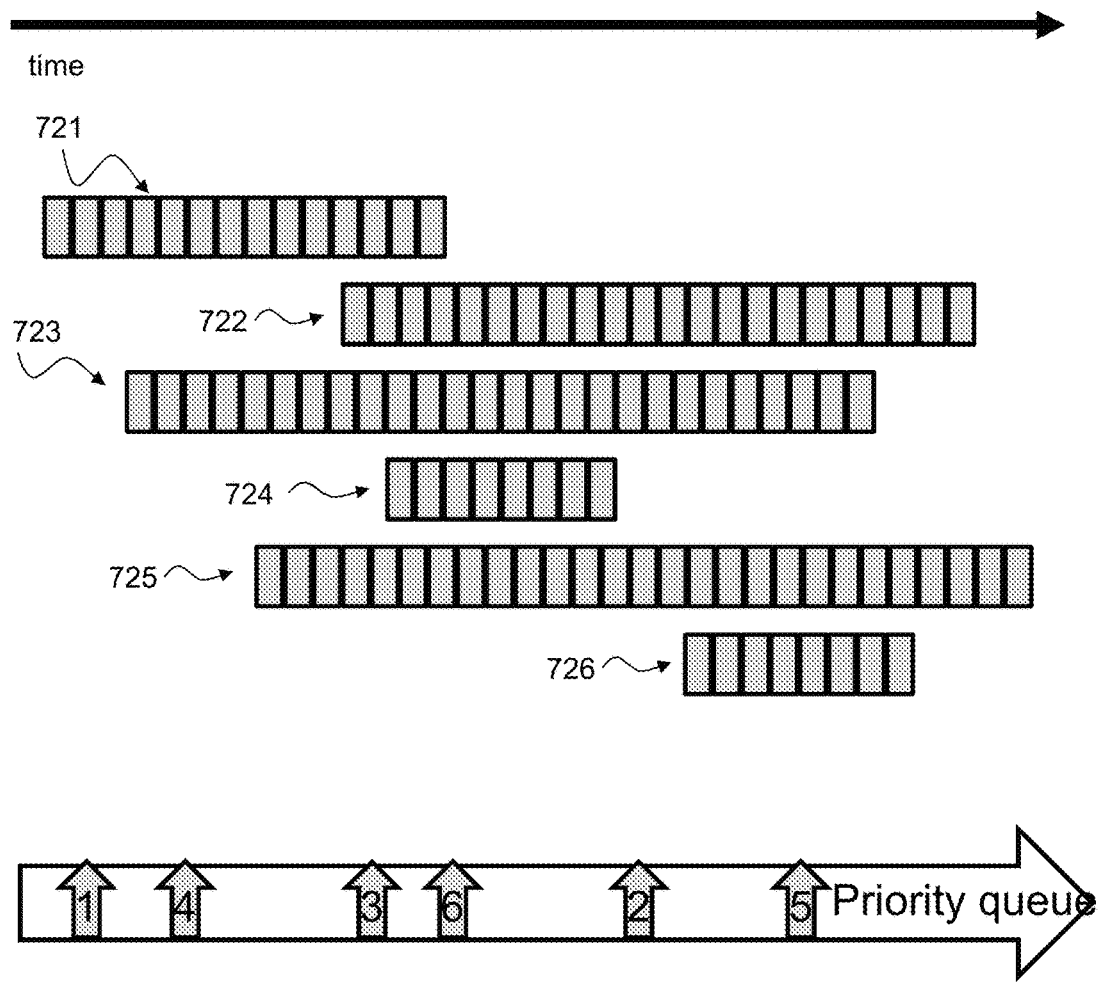
FIG. 8 shows a schematic diagram illustrating an exemplary priority queue with pointers to demand instances sorted by demand arrival start time according to a second implementation.

FIG. 8 shows a schematic diagram illustrating an exemplary priority queue with pointers to demand instances sorted by demand arrival start time according to a second implementation.

In the shown priority queue the demands are sorted according to their arrival start time: The pointer to demand instance mapping is as follows:
1->201, 2->202, 3->203, 4->204, 5->205, 6->206.

Figure 9:
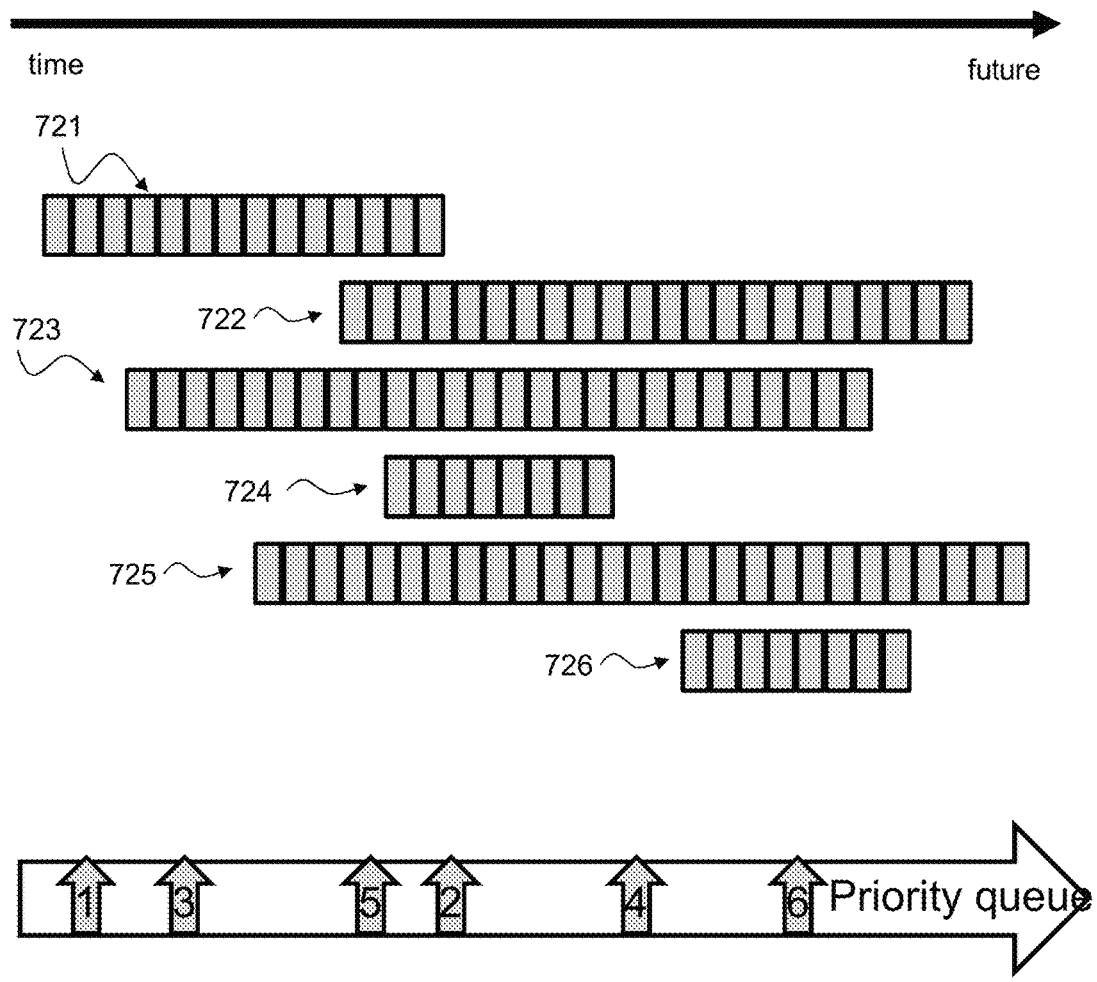
FIG. 9 shows a schematic diagram illustrating an exemplary priority queue with pointers to demand instances sorted by demand arrival completion time according to an embodiment.

FIG. 9 shows a schematic diagram illustrating an exemplary priority queue with pointers to demand instances sorted by demand arrival completion time according to an embodiment.

In the shown priority queue the demands are sorted according to their demand arrival completion time. The pointer to demand instance mapping is as follows:
1->201, 2->202, 3->203, 4->204, 5->205, 6->206.

Figure 10A:
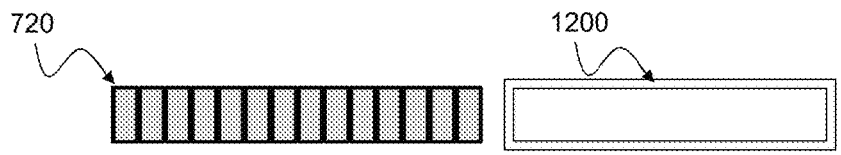
FIG. 10(a) shows a schematic diagram illustrating a demand context according to an embodiment.

FIG. 10(a) shows a schematic diagram illustrating an abstract demand context 1200 according to an embodiment.

A demand context 1200 is an information associated with the demand 720. The context may be derived directly from the demand (e.g. if the demand is created by a packet arrival and the context can be derived directly from the packet, e.g. a priority code field in the packet header). The context may also be derived indirectly, e.g. via the detection that the packet belongs to a session or to a flow, such that the demand inherits the context associated with the session or with the flow to which the packet belongs. Also, a combination of both is possible and often used.

Figure 10B:
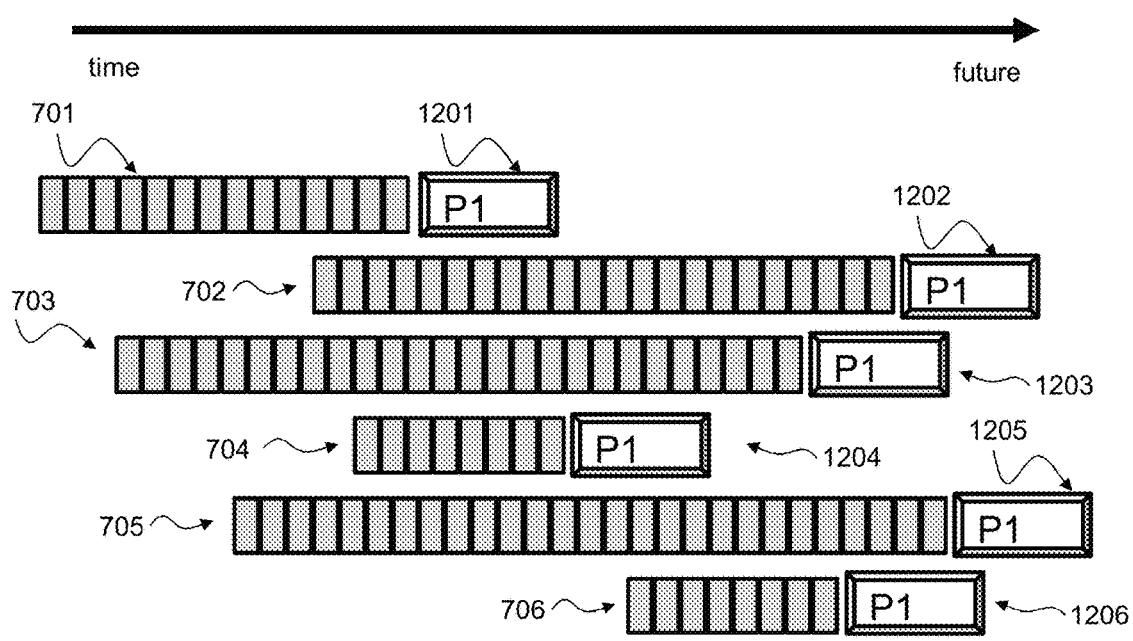
FIG. 10(b) shows a schematic diagram illustrating an exemplary demand context instance according to an embodiment.

FIG. 10(b) shows a schematic diagram illustrating an exemplary demand context instance according to an embodiment.

A demand context instance 1201 is an instance of a demand context 1200 that has an association with a demand instance 701. In FIG. 10(b) the following associations are implicitly shown by arrangement on the same line: Demand instance 1201 with demand context 701, 1202 with 702, 1203 with 703, 1204 with 704, 1205 with 705 and 1206 with 706. In the example of FIG. 10(b), all packets have a demand context instance containing as value the information "P1", which is indicative of a high priority demand instance.

Figure 11:
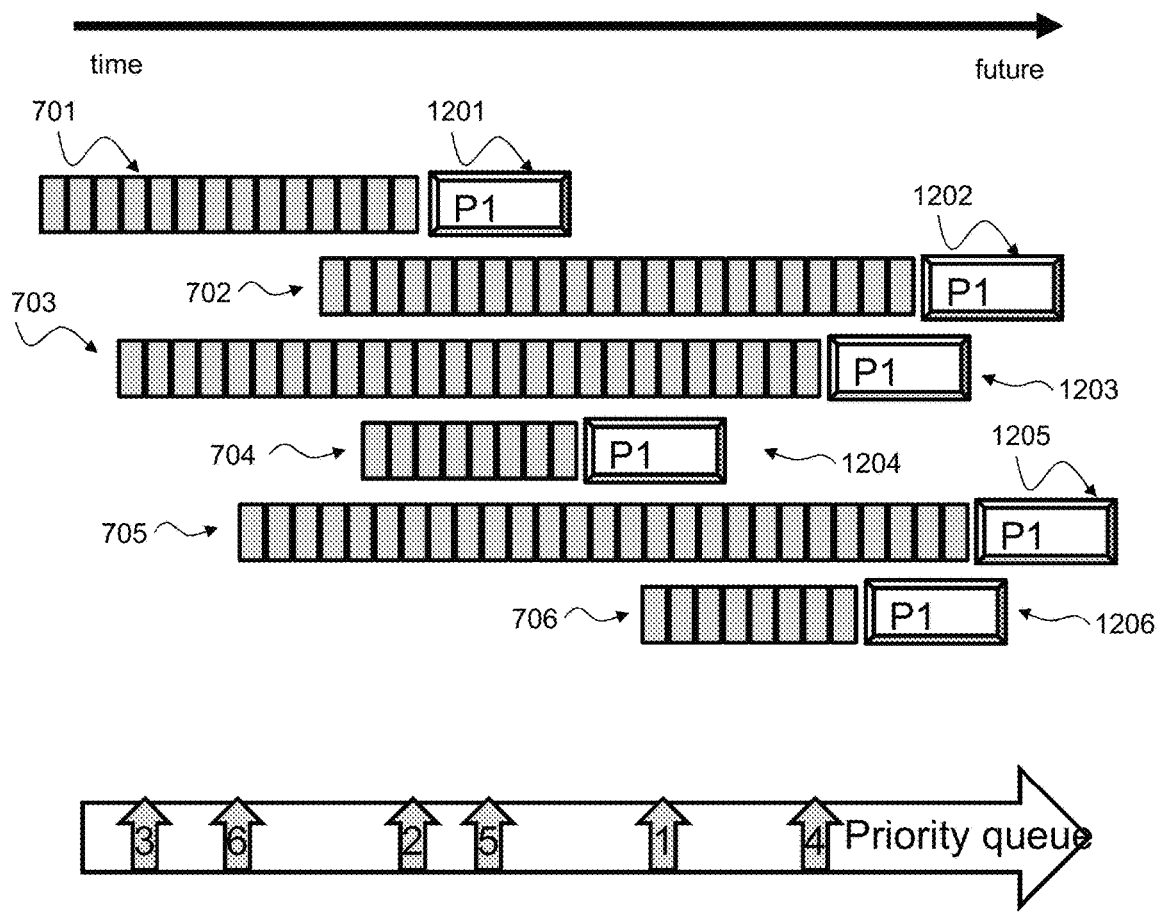
FIG. 11 shows a schematic diagram illustrating a priority queue sorted first by priority contained in context, and second by demand arrival start time according to an embodiment.

FIG. 11 shows a schematic diagram illustrating a priority queue sorted first by priority contained in context, and second by demand arrival start time according to an embodiment.

Because demand 704 and 701 are high priority (demand context contains demand priority value P1), the pointers to them get sorted to the head of the queue. All pointers to elements with equal priority value get sorted according to the demand arrival start time of their associated demands.

Figure 12:
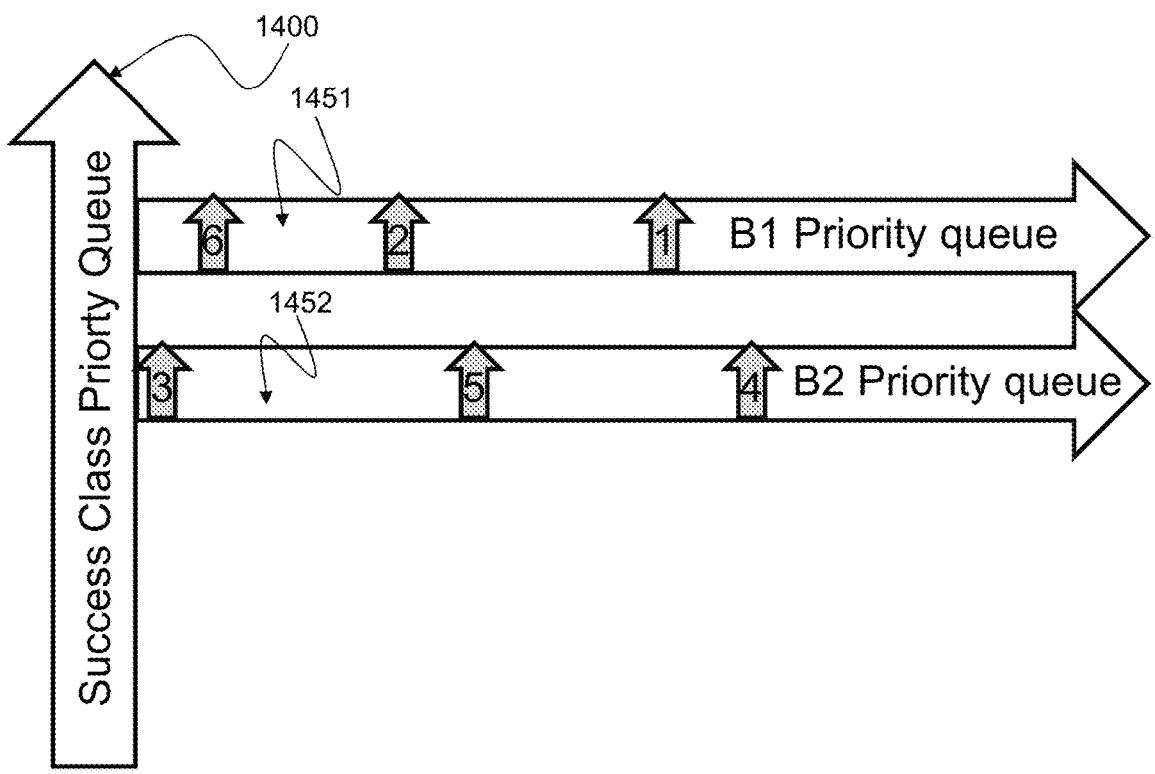
FIG. 12 shows a schematic diagram illustrating an exemplary multi-dimensional priority queue according to an embodiment.

FIG. 12 shows a schematic diagram illustrating an exemplary multi-dimensional priority queue according to an embodiment.

Shown here is a simple example of a 2-dimensional priority queue, comprising a dimension-2 priority queue 1400 (also referred to as Success Class priority queue), which contains as element 2 dimension-1 priority queues, namely the dimension-1 priority queue 1451 associated with bidder 1 and the dimension-1 priority queue 1452 associated with bidder 2. As a preferred embodiment the elements of the priority-2 priority queue may not be the priority-1 queues, but rather pointers to the priority-1 queues. In a preferred embodiment of strict success class rank dependant priority scheduling, when free chargeable resource consumption units become available, the scheduler output side upon demand satisfaction will perform a dequeue operation to the priority-2 queue, obtaining as result the dimension-1 priority queue 1451, and will recursively further dequeue from that queue until it obtains a priority-0 Queue being a single element of a queue being a demand. The Scheduler continues to dequeue (recursively) as long as free chargeable resource consumption units are available, before dequeuing a first element from the priority-1 priority queue 1452.

Figure 13:
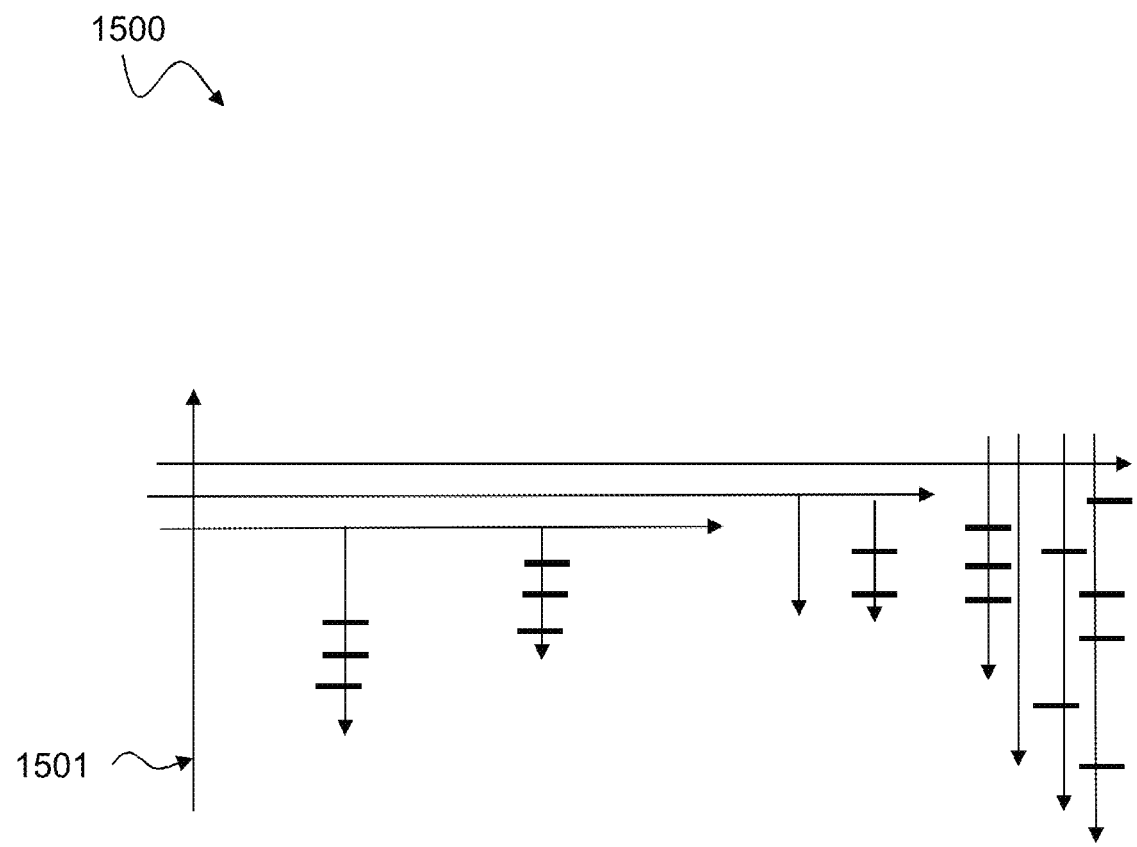
FIG. 13 shows a schematic diagram illustrating an exemplary multi-dimensional priority scheduling queue according to an embodiment.

FIG. 13 shows a schematic diagram illustrating an exemplary multi-dimensional priority scheduling queue according to an embodiment.

A multidimensional priority scheduling queue of dimension n may be defined in a recursive way (starting with dimension 0) as follows: A multidimensional priority scheduling queue of dimension 0 is an element of a queue that a scheduler recognizes as demand that shall be scheduled immediately when resources become available to satisfy the demand. When a scheduler uses a multidimensional scheduling priority queue, upon detection of free resources that can be used to satisfy a minimum of one demand, he starts with step 1 and dequeues an element from the multidimensional priority scheduling queue. If the dequeued element is not a multidimensional scheduling priority queue of dimension zero, then the scheduler considers the dequeued element as a multidimensional priority scheduling queue of dimension n−1 and continues in a loop with step 1, until the dequeued element is of dimension 0. The example shows a multidimensional scheduling priority queue 1501, which is of dimension 3. Arrows are queues, lines are queue elements of dimension 0.

Figure 14:
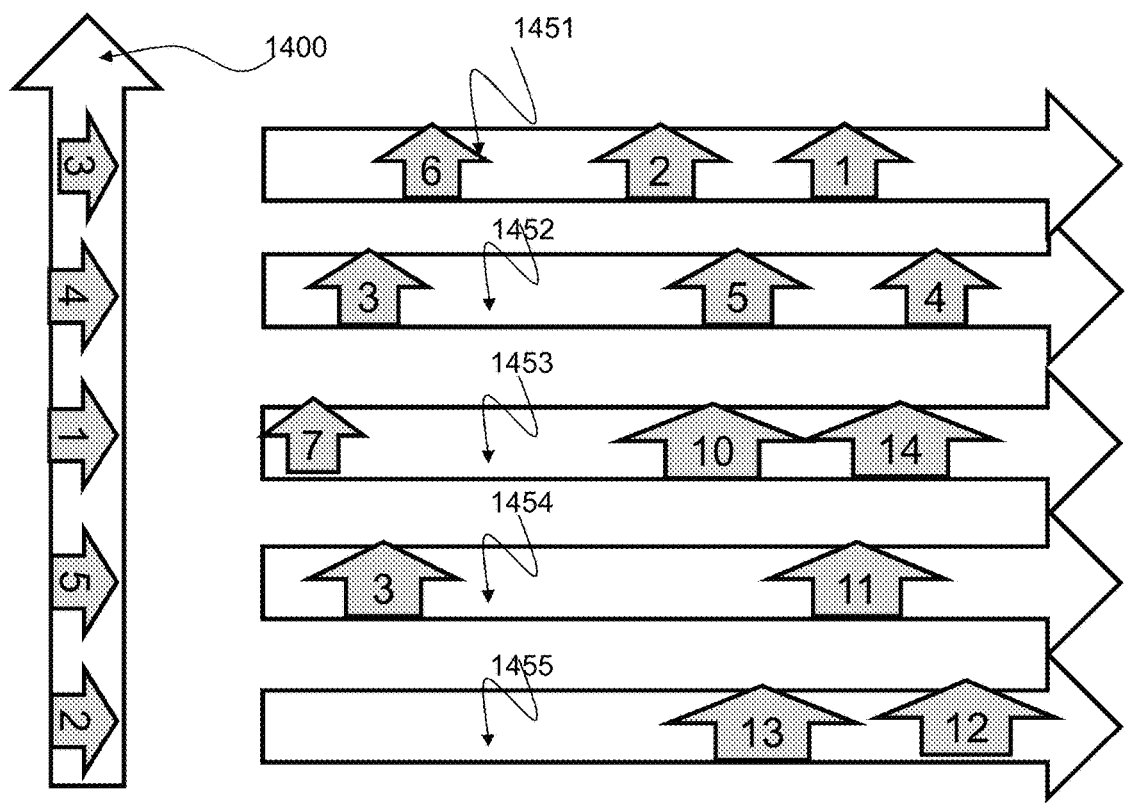
FIG. 14 shows a schematic diagram illustrating a multi-dimensional scheduling priority queue according to an embodiment.

FIG. 14 shows a schematic diagram illustrating a multi-dimensional scheduling priority queue according to an embodiment.

Shown here is a preferred embodiment for a 2 dimensional scheduling priority queue using pointers in the multidimensional scheduling priority queue of dimension 2 to point to the associated multidimensional scheduling priority queue of dimension 1, where each of the multidimensional scheduling priority queues of dimension 1 contain pointers to demands associated with one bidder. The diagram shows a situation where bidder 3 is ranked highest because he has provided the highest bid and therefore has associated the highest success class, in case other bidders had bid the same amount, bidder 3 is still ranked first in the multidimensional scheduling priority queue of dimension 2 because his bid was received by the bidding platform prior to other bids bidding the same amount.

Figure 15A:
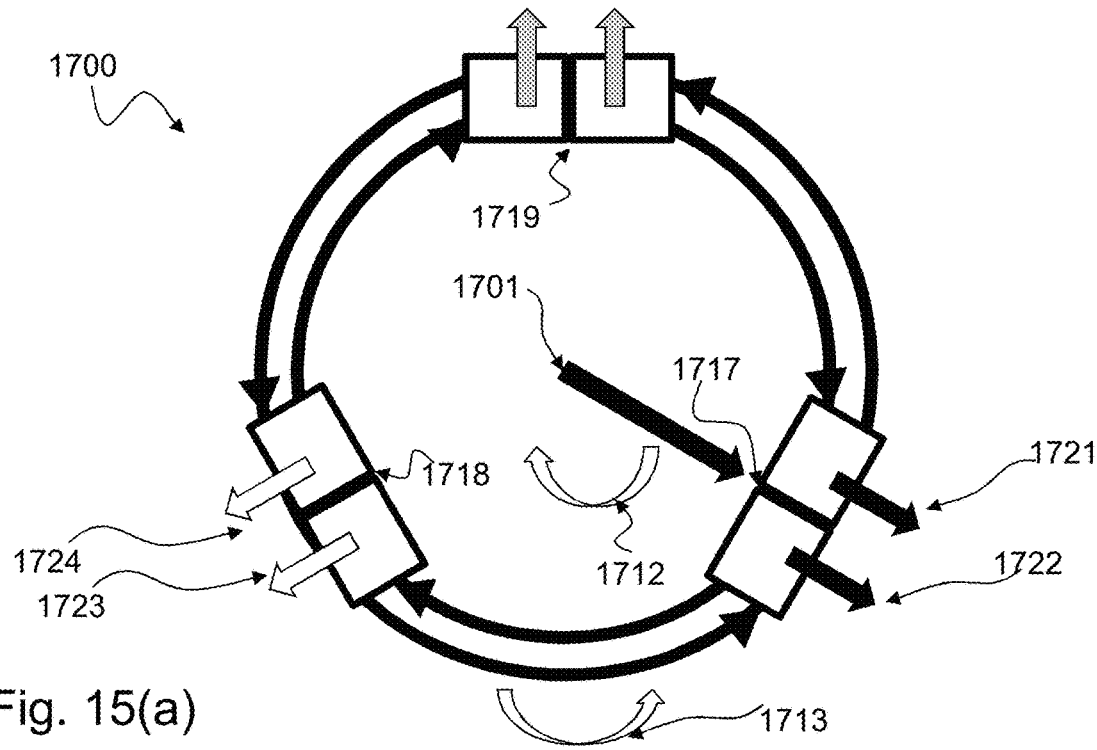
FIGS. 15(a) and 15(b) show a schematic diagram illustrating a charging period change event according to an embodiment.
Figure 15B:
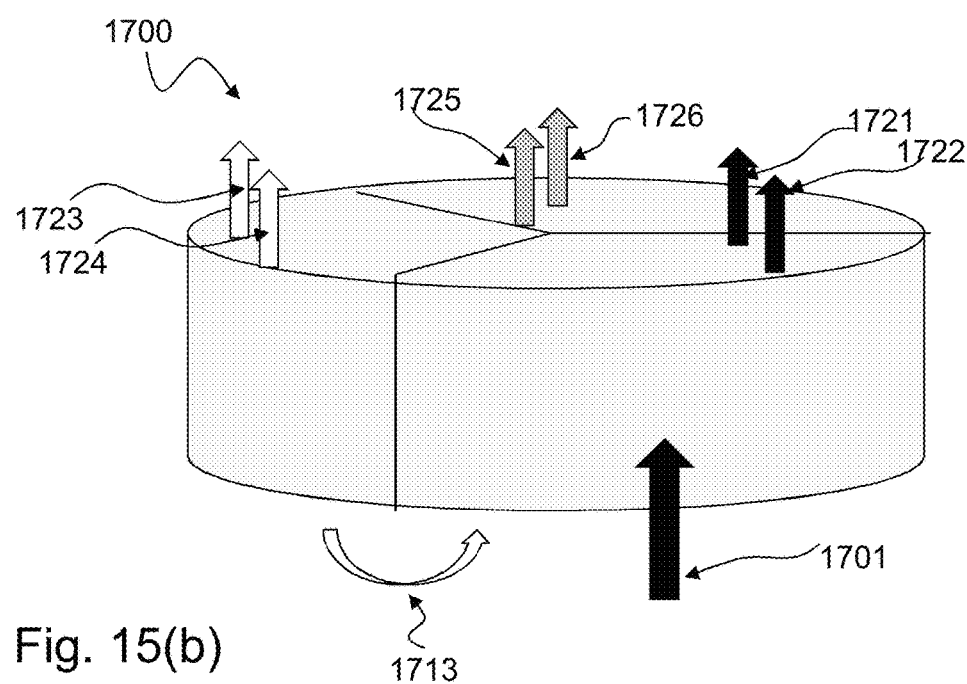

FIGS. 15(*a*) and 15(*b*) show a schematic diagram illustrating a charging period change event according to an embodiment, whereby FIG. 15(*a*) is the main figure and FIG. 15(*b*) is just a different perspective view onto the same pointer array ring 1700, in order to facilitate the better visualization in later dependant diagrams. It single change of the value of the master pointer 1701 can be visualized as either as a clockwise turn 1712 of 120 degree of the master pointer 1701 in FIG. 15(*a*) or as an anti-clockwise turn 1712 of the ring in FIG. 15(*a*) or FIG. 15(*b*) by 120 degree with the single pointer remaining in its position.

The shown pointer array ring 1700 comprises a ring-structured set of 3 pointer arrays comprising single master pointer 1701, the active period pointer array 1717 comprising the active period multidimensional priority queue pointer 1721 pointing to the active period multidimensional priority queue and the active period token bucket pointer 1722 pointing to the active period token bucket, and the next period pointer array 1718 comprising the next period multidimensional priority queue pointer 1723 pointing to the next period multidimensional priority queue and the next period token bucket pointer 1724 pointing to the next period token bucket, and the previous period pointer array 1719 with the previous period multidimensional priority queue pointer 1725 pointing to the previous period multidimensional priority queue and the previous period token bucket pointer 1726 pointing to the previous period token bucket, which will become the next period token bucket after the next charging period change event. At a charging period change event 1711, the ring 1700 gets turned anti-clockwise by 120 degree as shown with clock-direction 1712. Pointers 1721,1723 and 1725 point to a data structure referred to as multidimensional priority queue (with highest dimension number 2), which contains a sorted list of 1 multidimensional priority queue with dimension 1 being a normal state of the art priority queue per bidder, whereby the dimension 2 of the multidimensional priority queue contains pointers to the dimension 1 priority queues, whereby these pointers are sorted according to rank of the success class that the bidders bid has achieved in the respective charging period. Pointers 1722, 1724, 1726 each point to one data structure containing one token bucket per bidder. Depending on implementation of the ring structured data structure 1700, it is possible to implement it in such a way in software, that a single change of the pointer 1701 effected with a single command at the time of the charging period change event 1711 simultaneously changes the values of all 6 pointers 1721,1722,1723, 1724,1725,1726. Similarly it is possible to achieve the same effect when using FPGA (Field programmable gate array) hardware, also known as programmable hardware, to implement the above described mechanism in a way that the simultaneous change of the pointers is performed in one clock cycle at the time of the charging period change event 1711. Similarly, same effect when using ASIC (application specific integrated circuit) hardware to implement the above mechanism in a way that the simultaneous change of the pointers is performed in one clock cycle at the time of the charging period change event 1711.

Figure 16:
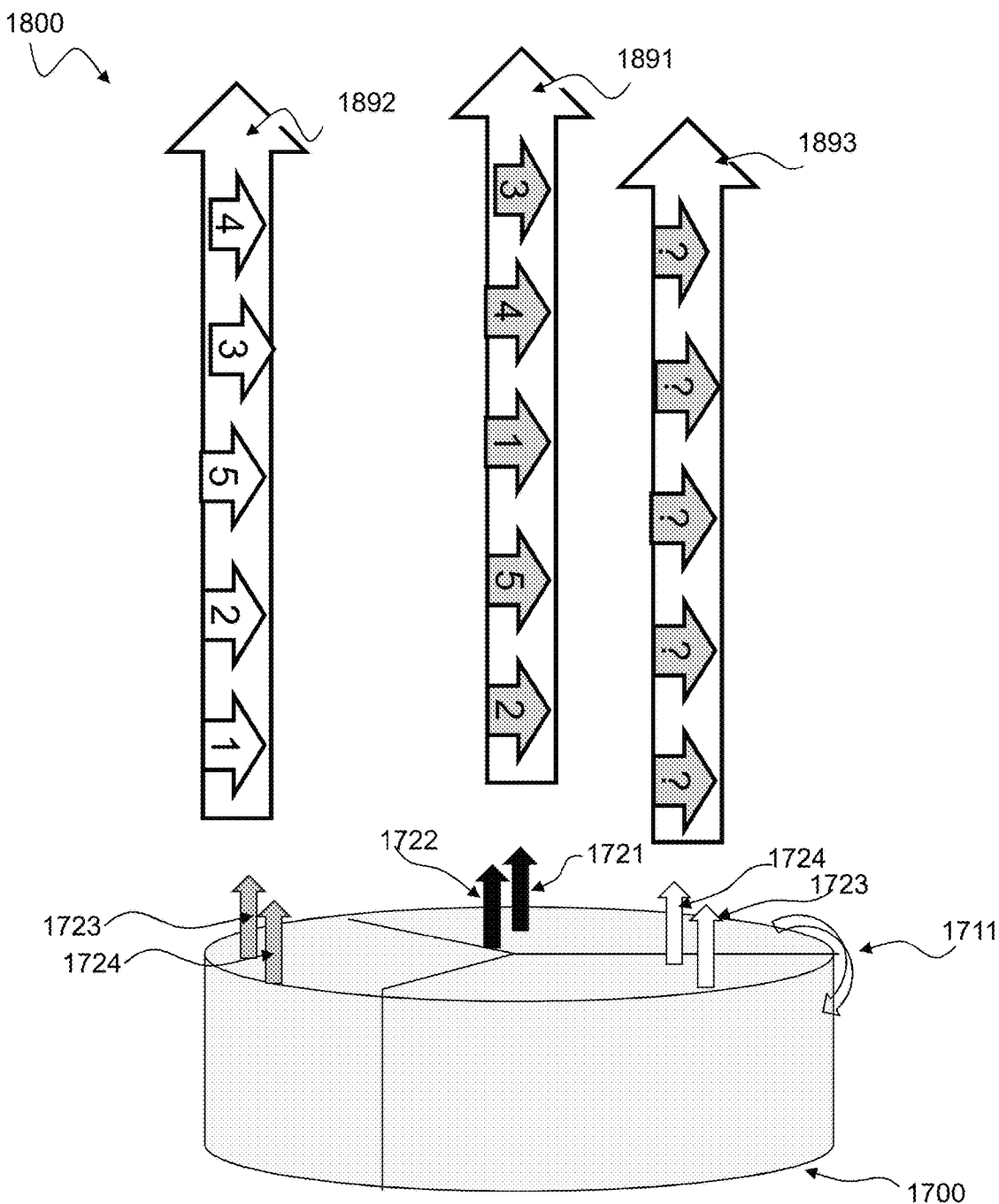
FIG. 16 shows a schematic diagram illustrating a charging period change event mechanism related to the enforcement of preferential treatment according to the success classes of the bidder during the curring tan next charging periods according to an embodiment.

FIG. 16 shows a schematic diagram illustrating a charging period change event mechanism related to the enforcement of preferential treatment according to the success classes of the bidder during the curring tan next charging periods according to an embodiment.

Pointer 1721 points to the success class priority queue 1891 which active during the current charging period n, pointer 1723 to the success class priority queue 1892 which will be active in the next chargin period n+1, and pointer 1723 points to the success class priority queue 1893 which has been active in the previous charging period n−1.

Figure 17:
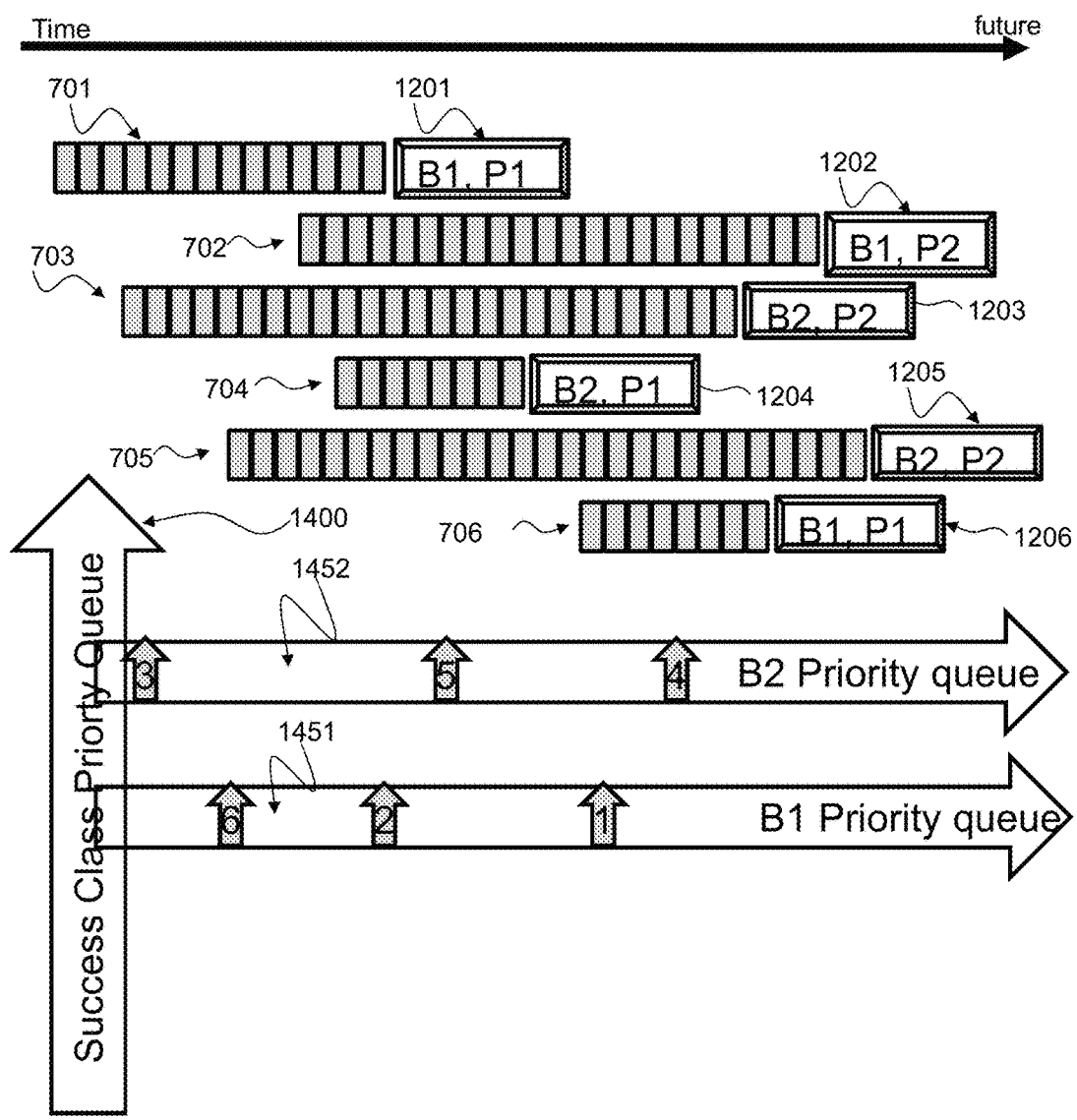
FIG. 17 shows a schematic diagram illustrating a multi-dimensional priority queue of 2 dimensions according to an embodiment.

FIG. 17 shows a schematic diagram illustrating a multi-dimensional priority queue of 2 dimensions according to an embodiment.

In the shown multidimensional priority queue of 2 dimensions the priority queue in dimension 2 is sorted by success class of bidder. The priority queue of dimension 2 contains pointers to the priority queues of dimension 1 which are priority queues. During a charging period with preferential treatment for bidder 2 (single per charging period, i.e. not differentiated bids per traffic class considering priority or traffic). The context also contains the bidder to which the demand is associated (B1=Bidder 1, B2=Bidder2). The diagram shows preferential treatment for bidder 2. Bidder 2 demands will be served first, even if they are lower priority than competing bidder 1 demands.

Figure 18:
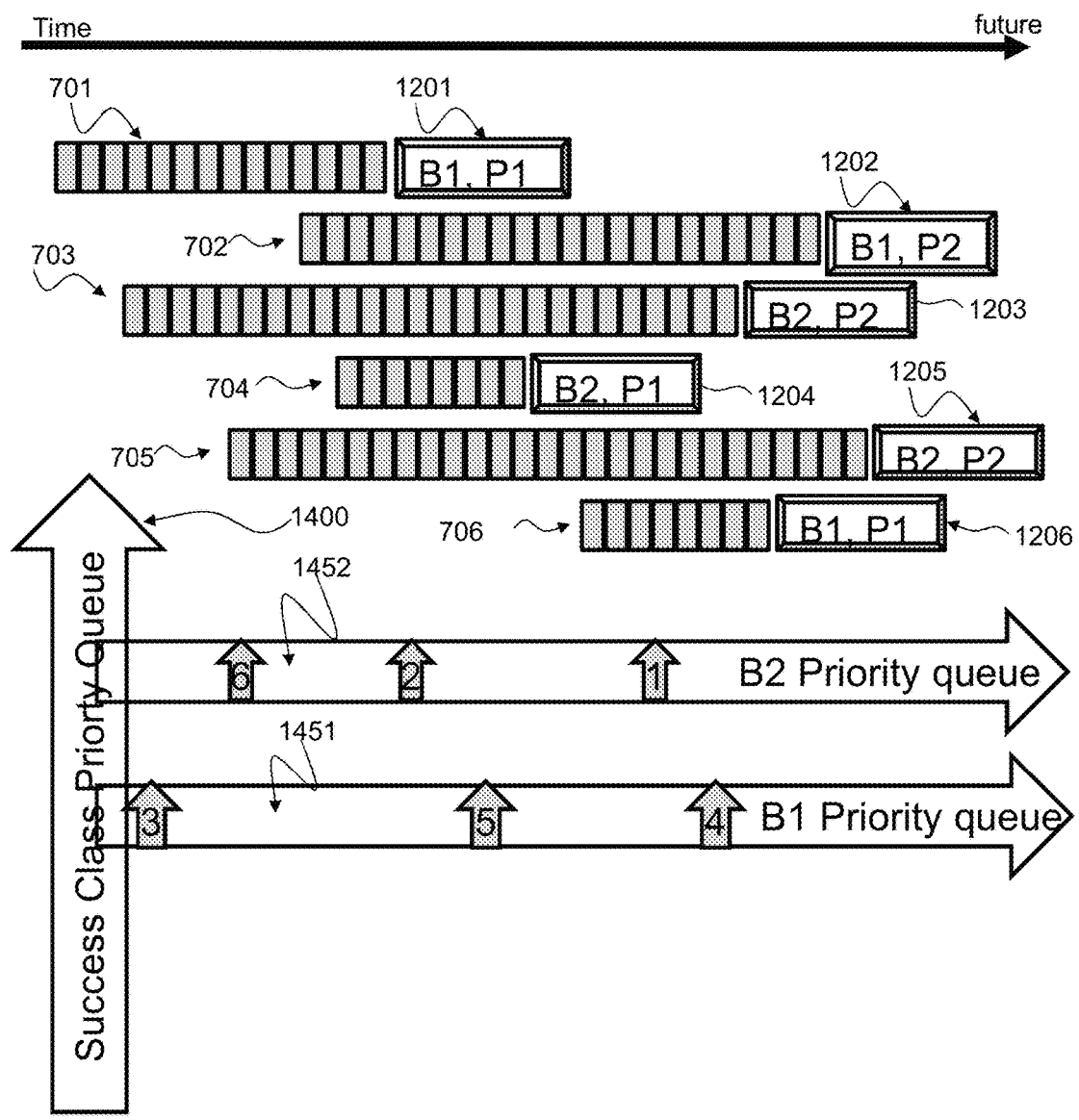
FIG. 18 shows a schematic diagram illustrating a multi-dimensional priority queue of 2 dimensions according to a further embodiment.

FIG. 18 shows a schematic diagram illustrating a multi-dimensional priority queue of 2 dimensions according to a further embodiment.

The situation is as in FIG. 17, but in the subsequent charging period bidder 1 gets preferential treatment over bidder 2.

The diagram shows re-sorting of the pointers in the success class priority queue, leading to Bidder B1 now getting preferential treatment over bidder 1. This means that at a charging period switchover event, the entries in the success class priority queue have to be re-sorted according to the success classes of the bidders in the next charging period.

Figure 19:
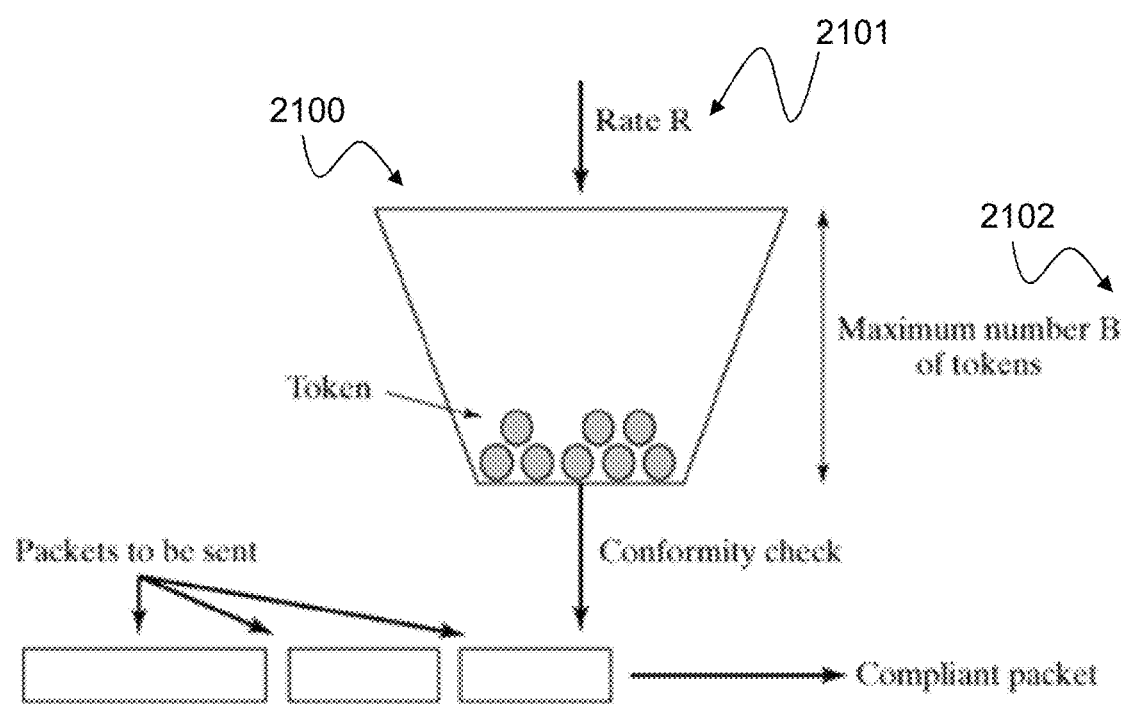
FIG. 19 shows a schematic diagram illustrating a token bucket according to an embodiment.

FIG. 19 shows a schematic diagram illustrating a token bucket according to an embodiment.

The Token Bucket algorithm is based on a token bucket 2100 which is well known and widely deployed in telecoms equipment, and heavily used by schedulers already. The disclosure presents a modification of the token bucket algorithm. A token bucket is completely defined by the integer values R 2101 and B 2102, where R defines the Refill Rate and B defines the maximum number of tokens that the bucket can hold—basically the bucket size. The shown packets to be sent are demands, and for each byte (resource consumption demand unit) of a compliant packet that gets consumed (forwarded) one token gets devaluated (taken out of the bucket). The conformity check operation at packet arrival time determines the current amount of tokens in the bucket by multiplying elapsed time with Rate R since the previous packet arrival time, and compares with number of bytes of packet.

Figure 20:
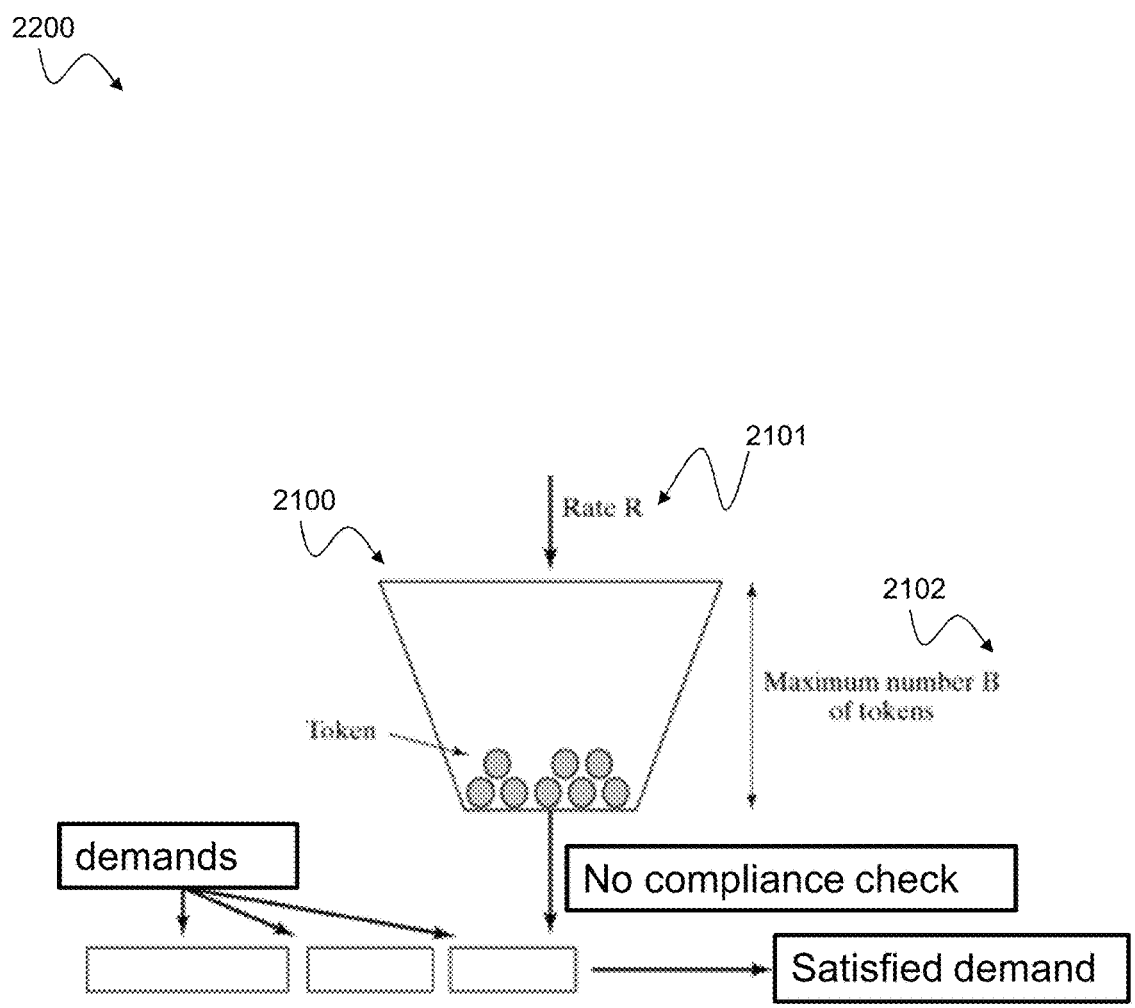
FIG. 20 shows a schematic diagram illustrating a token bucket operation according to an embodiment.

FIG. 20 shows a schematic diagram illustrating a token bucket operation according to an embodiment. The token bucket operation is for wholesale charging. The key part of the disclosure that allows to deploy it in a scalable way into the existing telecoms infrastructure is a preferred embodiment without compliance check.

For wholesale charging for demand satisfaction of demands such as "packets to be sent", it is assumed that large buckets with a size B that is higher than theoretically can be consumed within one charging period. Further we set the Rate R to the value of 0. This allows to even simplify the token bucket operation applied at each packet arrival, as it is not necessary to perform a Conformity Check at each time of packet arrival. As is done today in all token bucket algorithms, the algorithm reduces the amount of tokens in the bucket by the amount of resource consumption demand units contained in the demand that gets satisfied. For wholesale charging purposes of the charged parties being the bidders, it is only necessary to refill the buckets to the maximum size at each charging period change event and record how many tokens had to be refilled. Essentially the bidding process can be seen as a process to determine the price of a token during a charging period.

Figure 21:
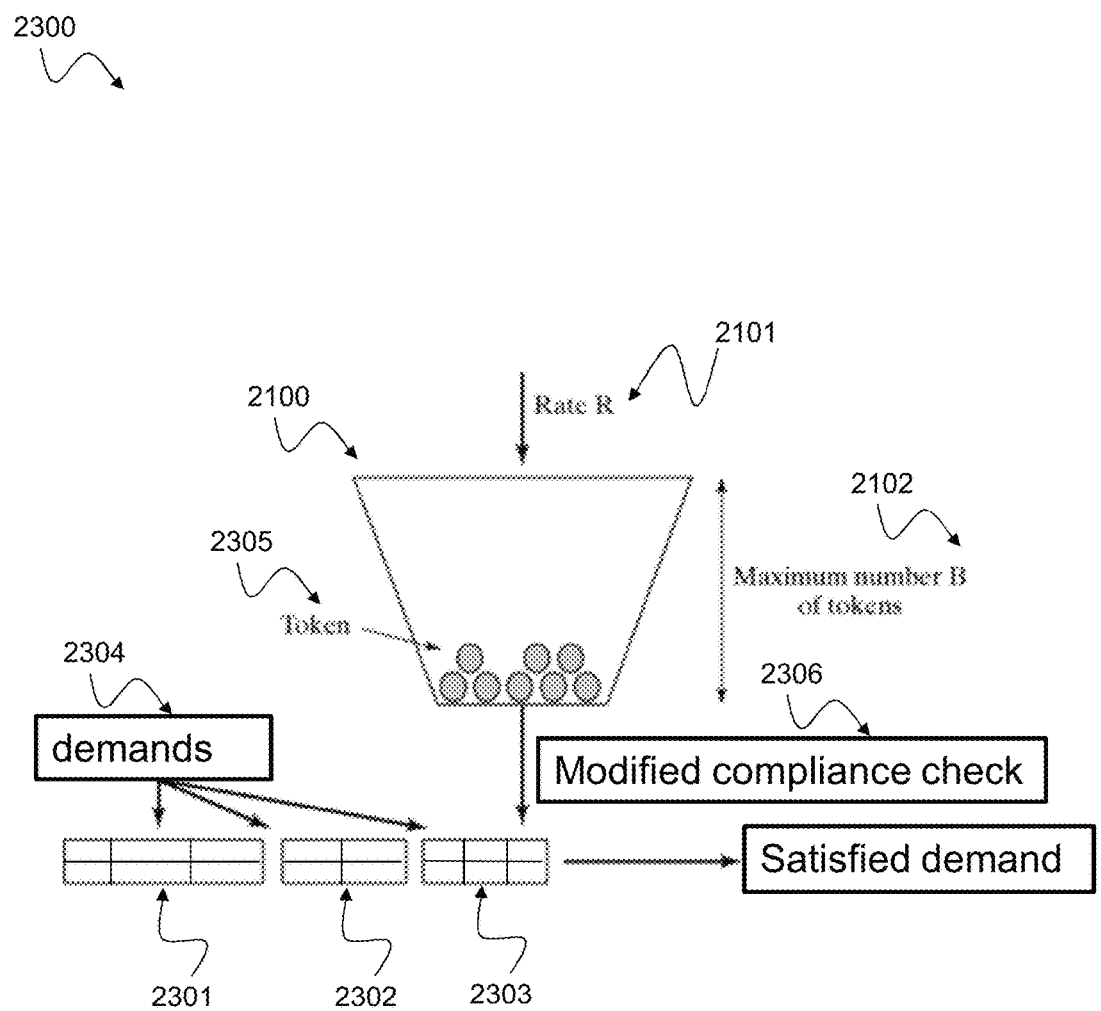
FIG. 21 shows a schematic diagram illustrating a token bucket operation using a modified compliance check according to an embodiment.

FIG. 21 shows a schematic diagram illustrating a token bucket operation using a modified compliance check according to an embodiment.

The preferred embodiment shown in FIG. 21 uses a Rate R=0 and uses the standard bucket size and assumes that the bucket is fully filled at the beginning with B tokens and uses a modified compliance check, that checks if the current amount of tokens is still higher than the maximum amount a single demand can consume. In case of non-compliance, the bucket gets nearly refilled by a fixed amount of tokens that is selected in such a way that the remaining tokens plus the added fixed amount of tokens cannot exceed the maximum size B, and the modified compliance check also increments a counter that counts how many times the token bucket has been "nearly refilled", during a charging period. After the next charging period change event, the amount of consumed tokens during the charging period gets determined by multiplying the amount of "token refills" by the fixed refill number and added to the remainder in the bucket.

Figure 22:
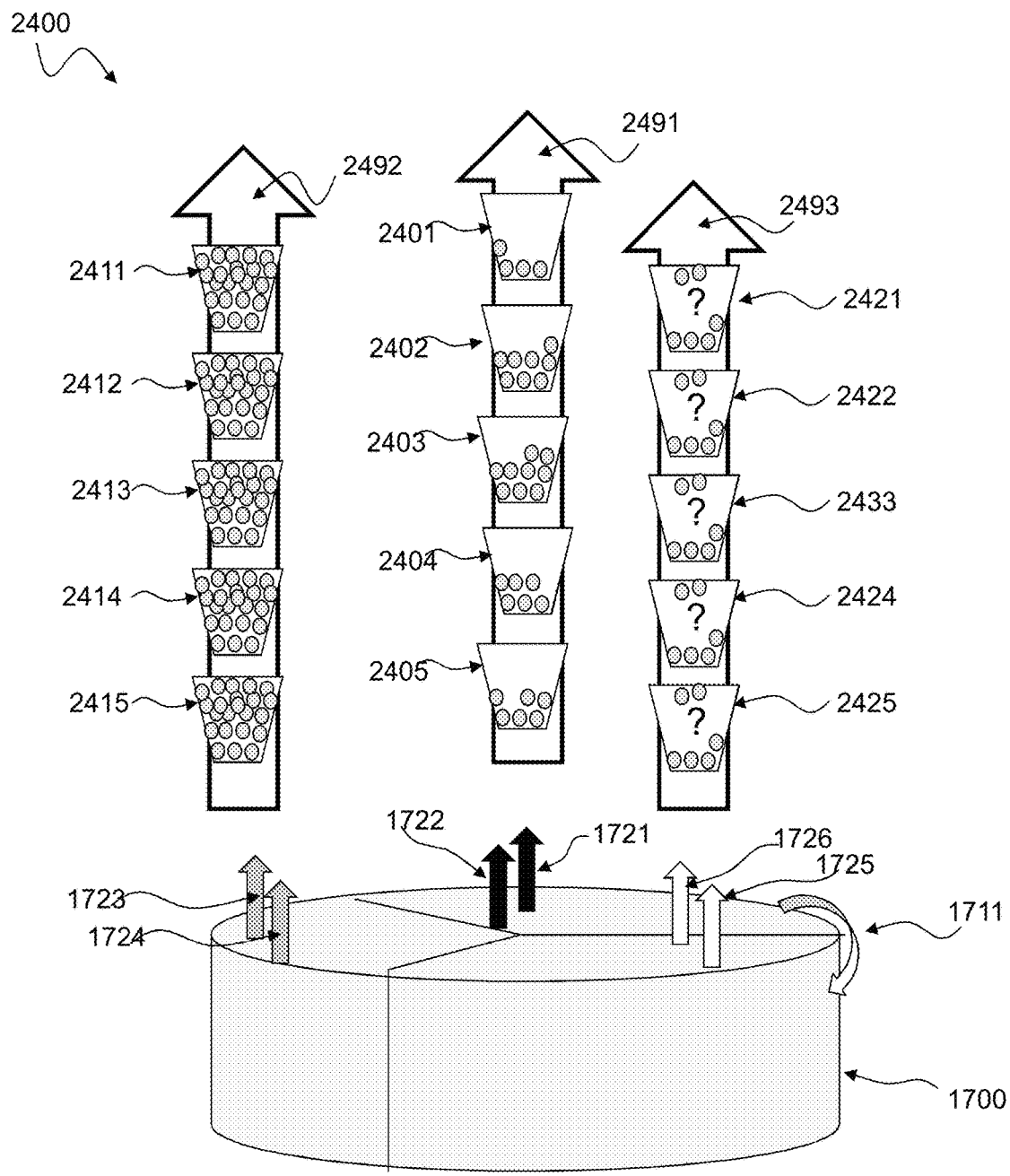
FIG. 22 shows a schematic diagram illustrating a charging period change event mechanism according to an embodiment.

FIG. 22 shows a schematic diagram illustrating a charging period change event mechanism according to an embodiment.

A preferred embodiment for charging period change event mechanism related to the wholesale charging of bidders according to bids offered is described below:

Pointer 1722 points to the data structure 2491 containing one active token bucket 2401-2406 for the current charging period for each of the 6 bidders in the example. Pointer 1724 points to the token buckets for the next charging period n+1. Pointer 1726 points to the token buckets of the previous charging period n−1 which get refilled and become the "overnext" token buckets.

A preferred embodiment for wholesale charging: selection of a high value for B, i.e. a large token bucket size e.g. highest long integer or even higher is described below:

The pointer 1724 points to bidder specific token buckets 2411-2415, which at the beginning of a charging period are filled with a value of B, that is selected as such a high value, that it is impossible to empty a bucket during a charging period.

A preferred embodiment for wholesale charging: determining per bidder and per charging period the amount of tokens consumed for the demand satisfaction of chargeable resource demand units is described below:

The pointer 1726 points to bidder specific token buckets 2421-2425, which at the beginning of a charging period n+1 contain the remaining token buckets of charging period n. In order to refill to maximum size B, a value of C tokens has to be added. This is the amount of tokens consumed by usages during the charging period n, which are associated with the bidder.

A preferred embodiment for wholesale charging and monetization: determining per bidder and per charging period the monetary amount to be paid by the bidder to the operator depending upon bid offered is described below:

The amount Cn of tokens consumed by the bidder during the charging period n has to be multiplied with the monetary amount that the bidder had offered in the bidding process for demand satisfaction of each resource consumption demand unit that gets satisfied during charging period n. This may occur offline in a BSS or it may occur online in case of realtime charging.

Figure 23:
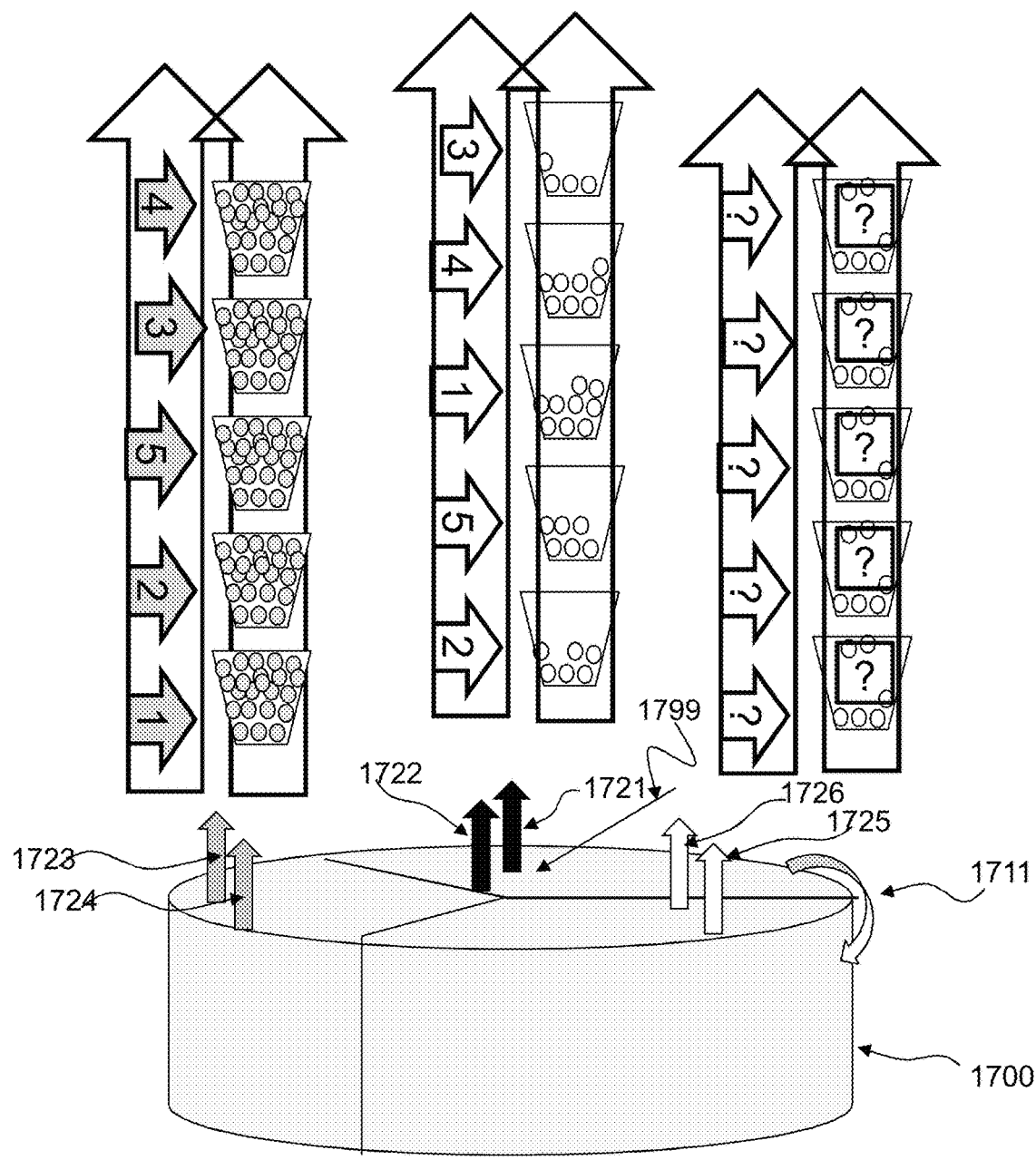
FIG. 23 shows a schematic diagram illustrating a charging period change event mechanism according to an embodiment.

FIG. 23 shows a schematic diagram illustrating a charging period change event mechanism according to an embodiment.

A key feature is that instantaneous and simultaneous switching of preferential treatment policy and of the associated token price is enabled, effected via the change of the value of a single pointer 1799, pointing to the both active pointers in the ring structure pointer array. In case of implementation with FPGA (Field programmable gate array) the change can even be effected in a single clock cycle.

FIG. 24(*a*) shows a schematic diagram illustrating the enforcement of preferential treatment and charging 1000 according to an embodiment. The preferential treatment and charging enforcement function 1001 comprises a bid input stream handling entity 1002, an output stream handling entity 1003, an (optional) control interface handling entity 1004 and an (optional) event notification handling entity

1005, a chargeable resource demand unit to chargeable resource unit assignment and re-assignment action handling entity 1006, a multidimensional priority queue demand instance insertion action handling entity 1007, a multidimensional priority queue dequeue action and demand satisfaction action handling entity 1008, a chargeable resource unit scheduler 1009, and a scheduler control function 1011 that comprises a charging period change event handling function 1012.

Figure 24A:
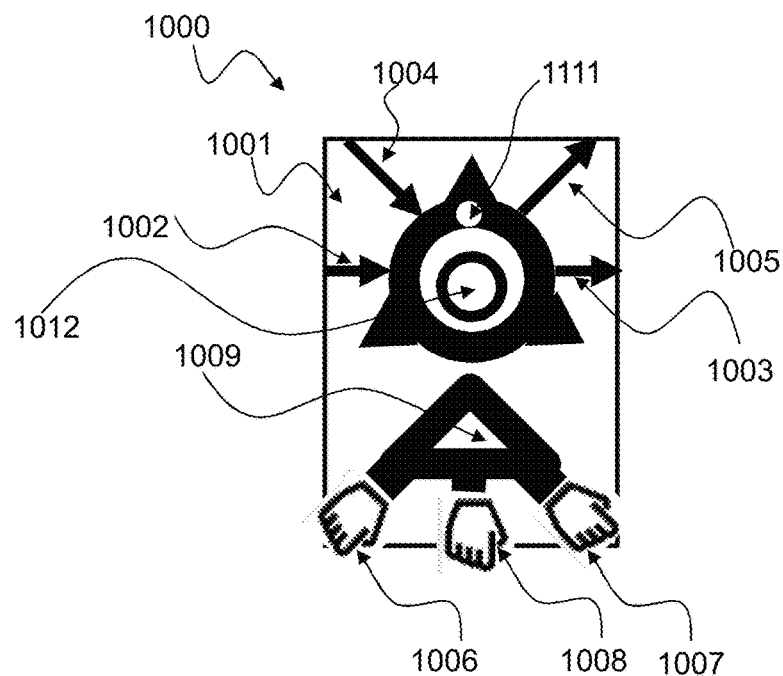
FIG. 24(a) shows a schematic diagram illustrating the enforcement of preferential treatment and charging 1000 according to an embodiment.
Figure 24B:
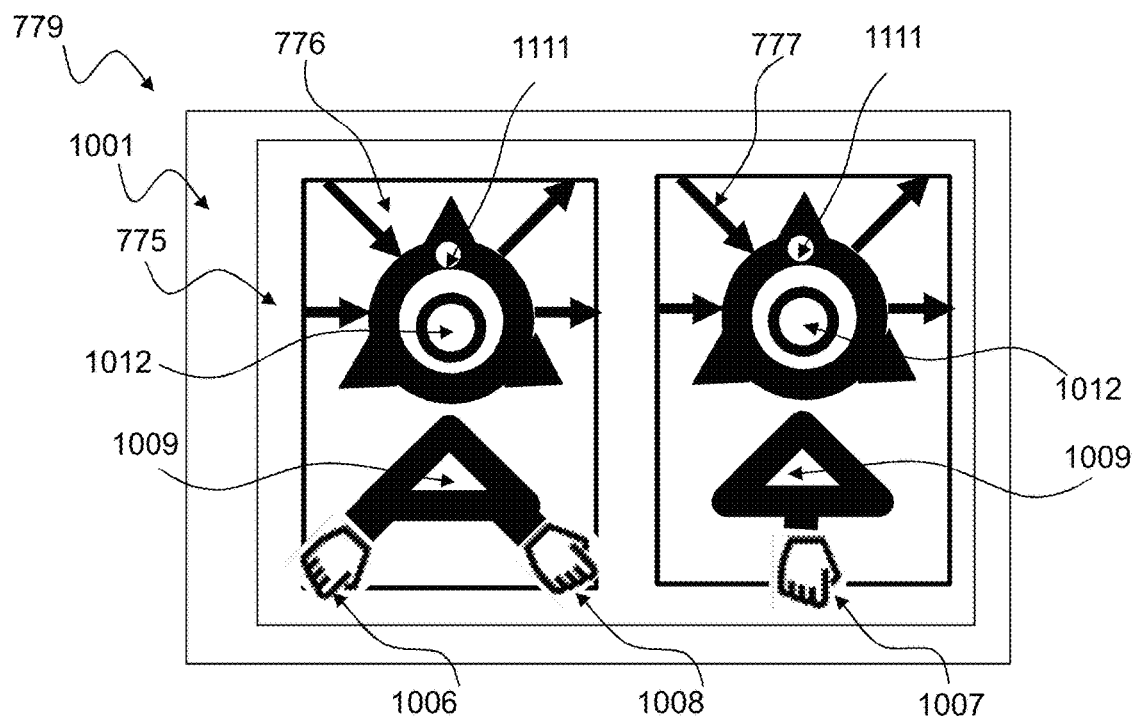
FIG. 24(b) shows a schematic diagram illustrating a decomposition 779 of the preferential treatment and charging enforcement function 1001 according to an embodiment.

FIG. 24(b) shows a schematic diagram illustrating a decomposition 779 of the preferential treatment and charging enforcement function 1001 according to an embodiment. The preferential treatment and charging enforcement function 1001 comprises a scheduler 775 whereby that scheduler 775 comprises a demand instance arrival time scheduler 776 and a demand instance satisfaction time scheduler 777. The demand instance arrival time scheduler 776 comprises the same chargeable resource demand unit to chargeable resource unit assignment and re-assignment action handling entity 1006 as shown in FIG. 24(a), the same multidimensional priority queue demand instance insertion action handling entity 1007 as shown in FIG. 24(a), the same multidimensional priority queue dequeue action and demand satisfaction action handling entity 1008 as already shown in FIG. 24(a), and the same charging period change event handling function 1009 as already shown in FIG. 24(a).

Figure 25A:
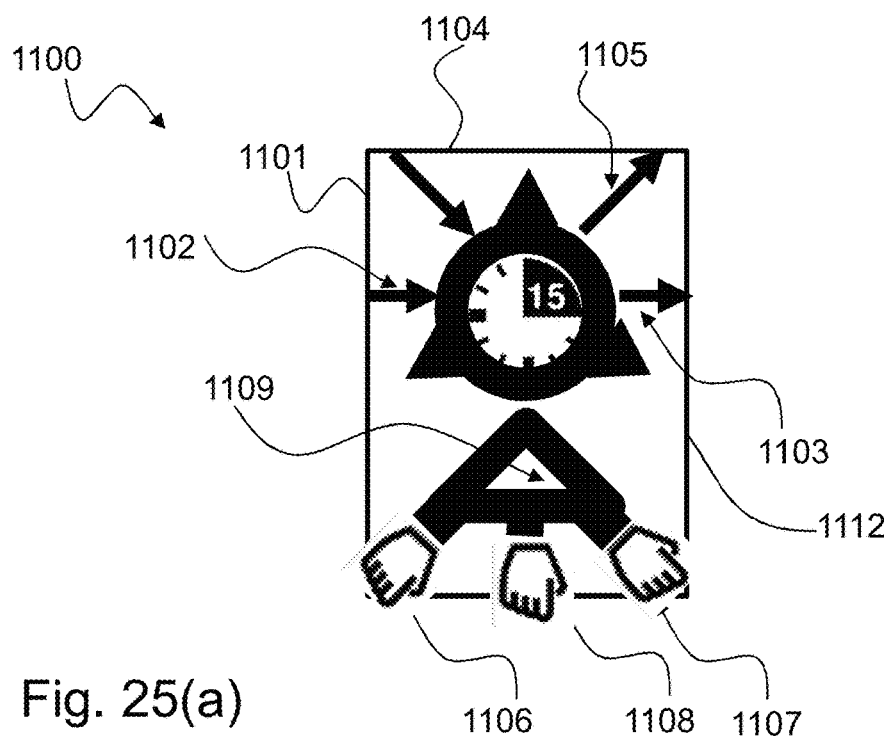
FIG. 25(a) shows a schematic diagram illustrating the enforcement of preferential treatment and charging 1100 according to an embodiment using a fixed charging period duration of 15 minutes.

FIG. 25(a) shows a schematic diagram illustrating the enforcement of preferential treatment and charging 1100 according to an embodiment using a fixed charging period duration of 15 minutes. The preferential treatment and charging enforcement function 1101 comprises a bid input stream handling entity 1102, a devaluated ticket output stream handling entity 1103, an (optional) control interface handling entity 1104 and an (optional) event notification handling entity 1105, a chargeable resource demand unit to chargeable resource unit assignment and re-assignment action handling entity 1106, a multidimensional priority queue demand instance insertion action handling entity 1107, a multidimensional priority queue dequeue action and demand satisfaction action handling entity 1108, and a policy change enforcement function 1009 which every lapse of 15 minutes periodically detects a charging period change and enforces the charging period change dependent policy changes. A mechanism for charging period change event detection 1109 may be provided that periodically detects the end of a charging period with a fixed duration of 15 minutes including an alignment function with the hour change events of universal time, and in response to the detection of a charging period change event changes a single pointer effecting a ring position change in a pointer array triple organized as ring data structure.

Figure 25B:
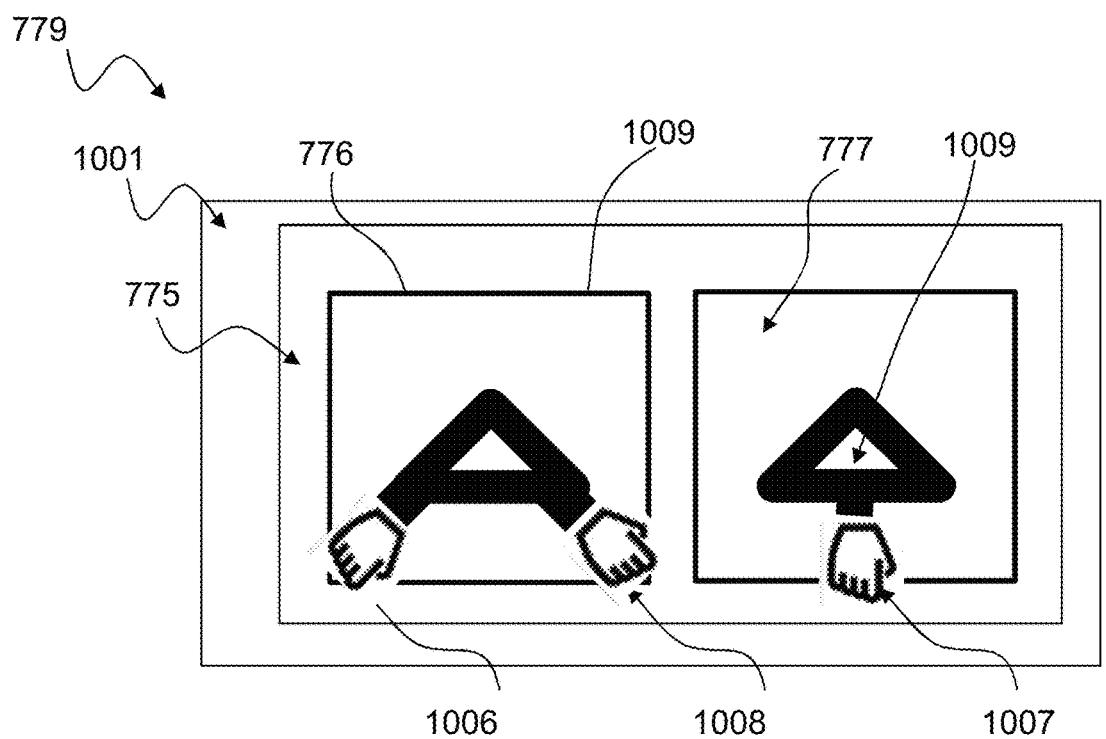
FIG. 25(b) shows a schematic diagram illustrating a decomposition 1779 of the preferential treatment and charging enforcement function 1101 according to an embodiment.

FIG. 25(b) shows a schematic diagram illustrating a decomposition 1779 of the preferential treatment and charging enforcement function 1101 according to an embodiment. The preferential treatment and charging enforcement function 1001 comprises a scheduler 1775 whereby that scheduler 1775 comprises a demand instance arrival time scheduler 1776 and a demand instance satisfaction time scheduler 1777. The demand instance arrival time scheduler 1776 comprises the same chargeable resource demand unit to chargeable resource unit assignment and re-assignment action handling entity 1106 as shown in FIG. 25(a), the same multidimensional priority queue demand instance insertion action handling entity 1107 as shown in FIG. 25(a), the same multidimensional priority queue dequeue action and demand satisfaction action handling entity 1108 as already shown in FIG. 25(a), and the same mechanism for charging period change event detection 1109 as already shown in FIG. 25(a), that periodically detects the end of a charging period with a fixed duration of 15 minutes, and an alignment function with the hour change events of universal time.

Figure 26:
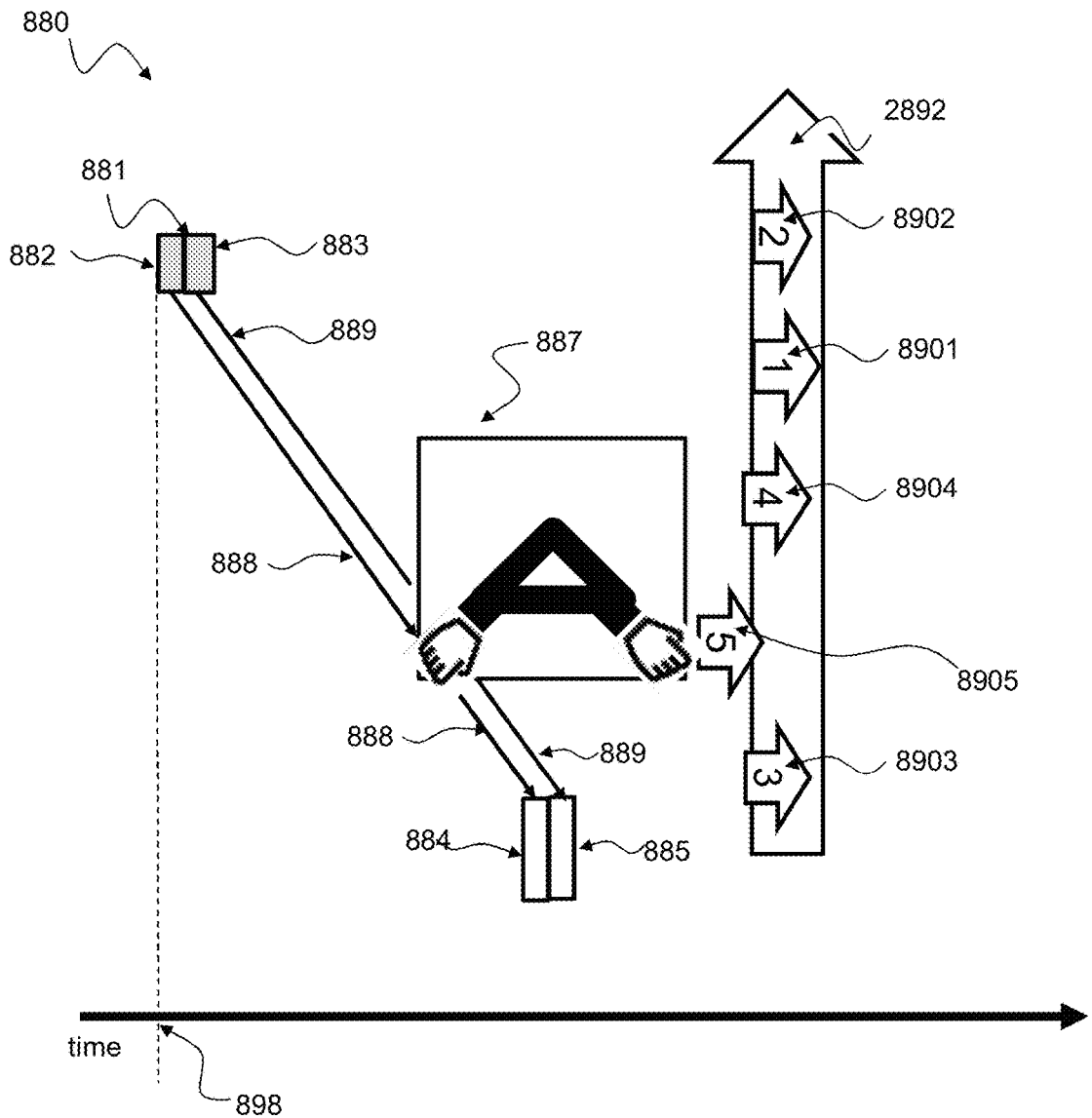
FIG. 26 shows a schematic diagram illustrating the function of demand instance arrival time scheduling 880 according to an embodiment.

FIG. 26 shows a schematic diagram illustrating the function of demand instance arrival time scheduling 880 according to an embodiment. The priority queue 2892 contains 4 demand instances 8901, 8902, 8903 and 8904 (or pointers to these demand instances), as these demand instances have not yet been satisfied. On arrival of a fifth demand instance 881 with arrival time 898 of a fifth demand instance 881, 8901, 8902, 8903, 8904 and sorted in the priority queue according to their priority. The demand instance arrival scheduler 886 has the function of performing a first assignment 888 of a first chargeable resource consumption demand unit 882 comprised in demand instance 881 to a first chargeable resource consumption unit 895 and it has also the function of performing a second assignment 889 of a second chargeable resource consumption unit 883 also comprised in the chargeable resource demand instance 881 to a second chargeable resource consumption unit 895, whereby this first assignment 888 occurring at the demand instance arrival start time.

Figure 27:
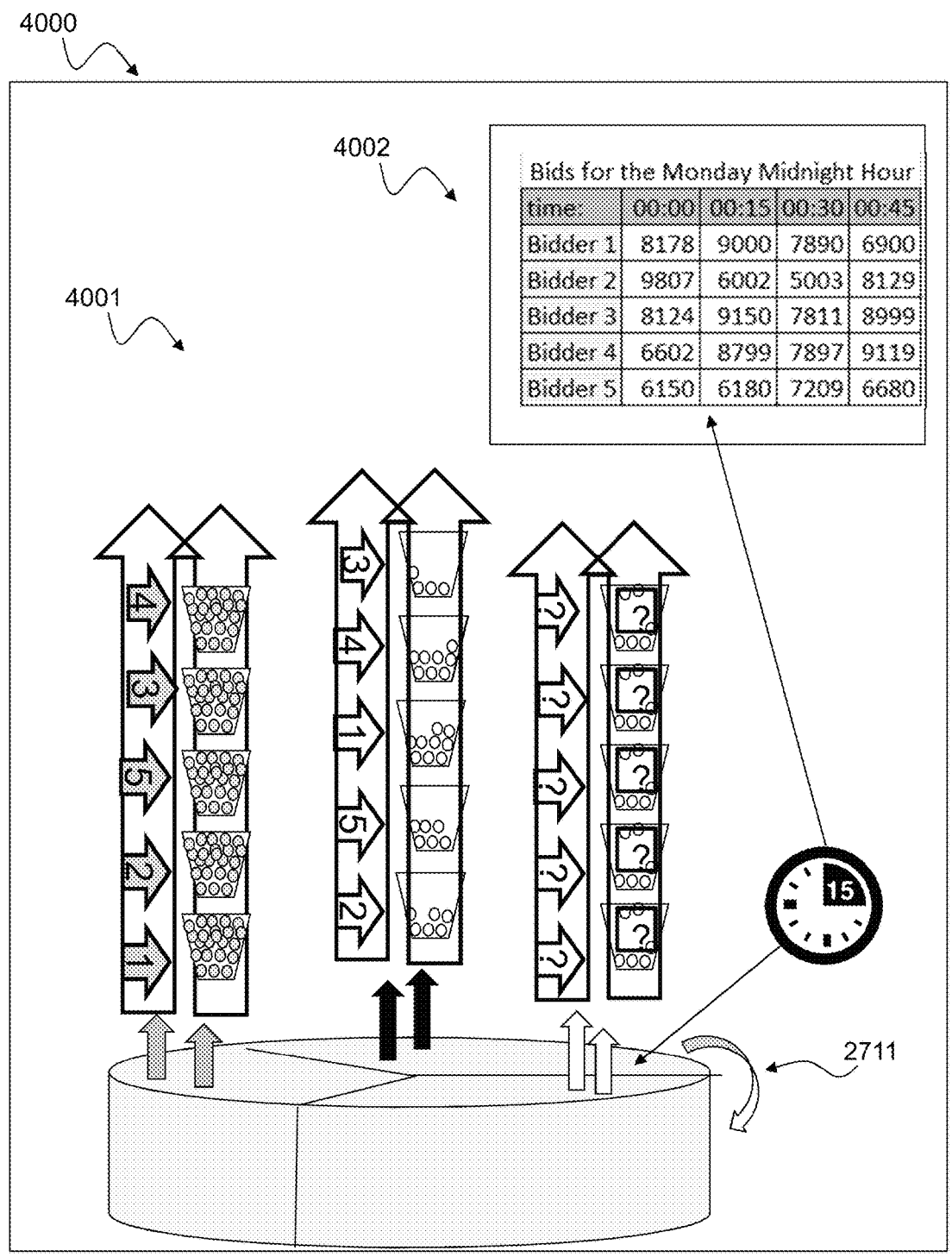
FIG. 27 shows a schematic diagram illustrating a bidding process 4000 according to an embodiment.

FIG. 27 shows a schematic diagram illustrating a bidding process 4000 according to an embodiment.

Figure 28:
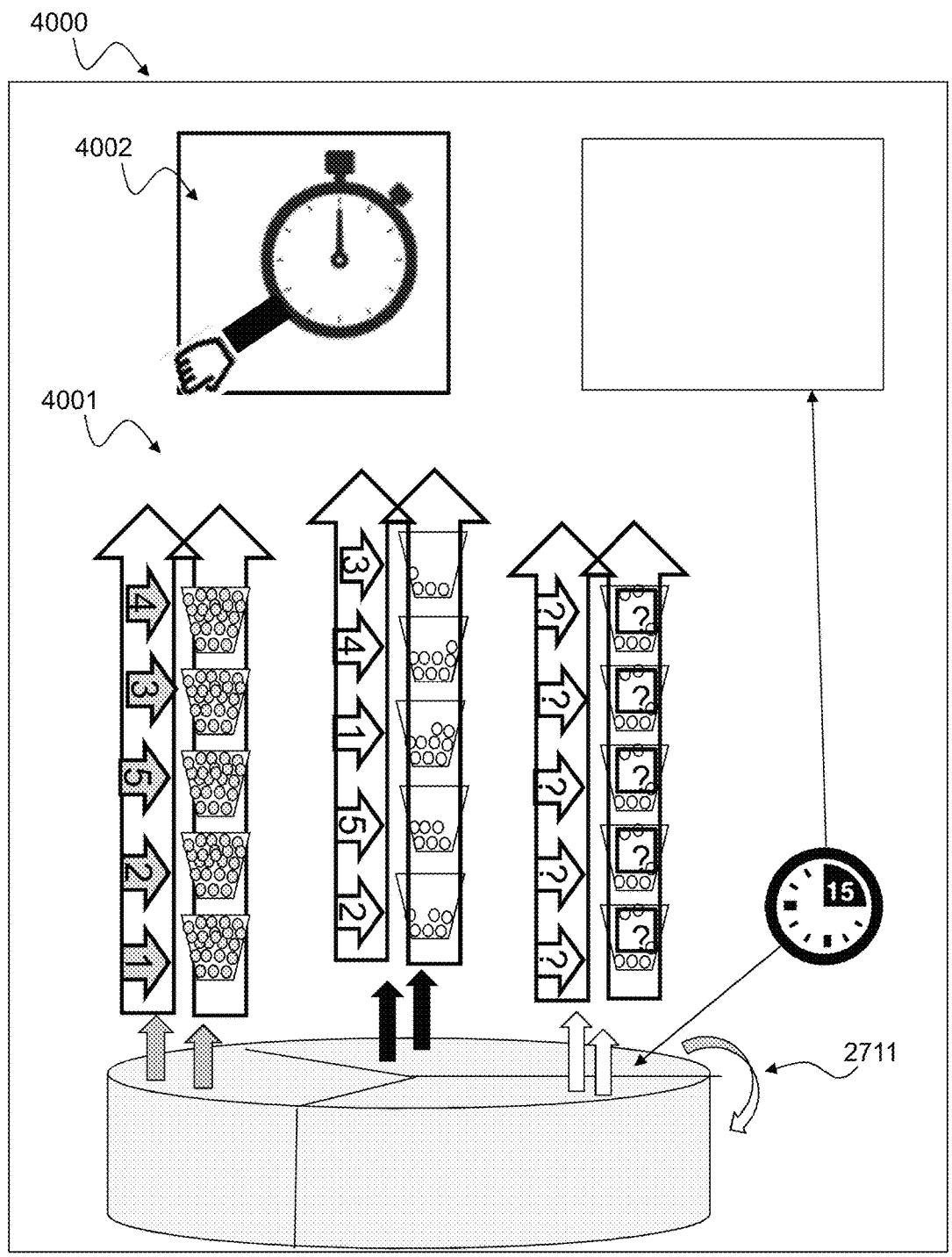
FIG. 28 shows a schematic diagram illustrating an implementation of the bidding process 4000 depicted in FIG. 27.

FIG. 28 shows a schematic diagram illustrating an implementation of the bidding process 4000 depicted in FIG. 27.

Figure 29A:
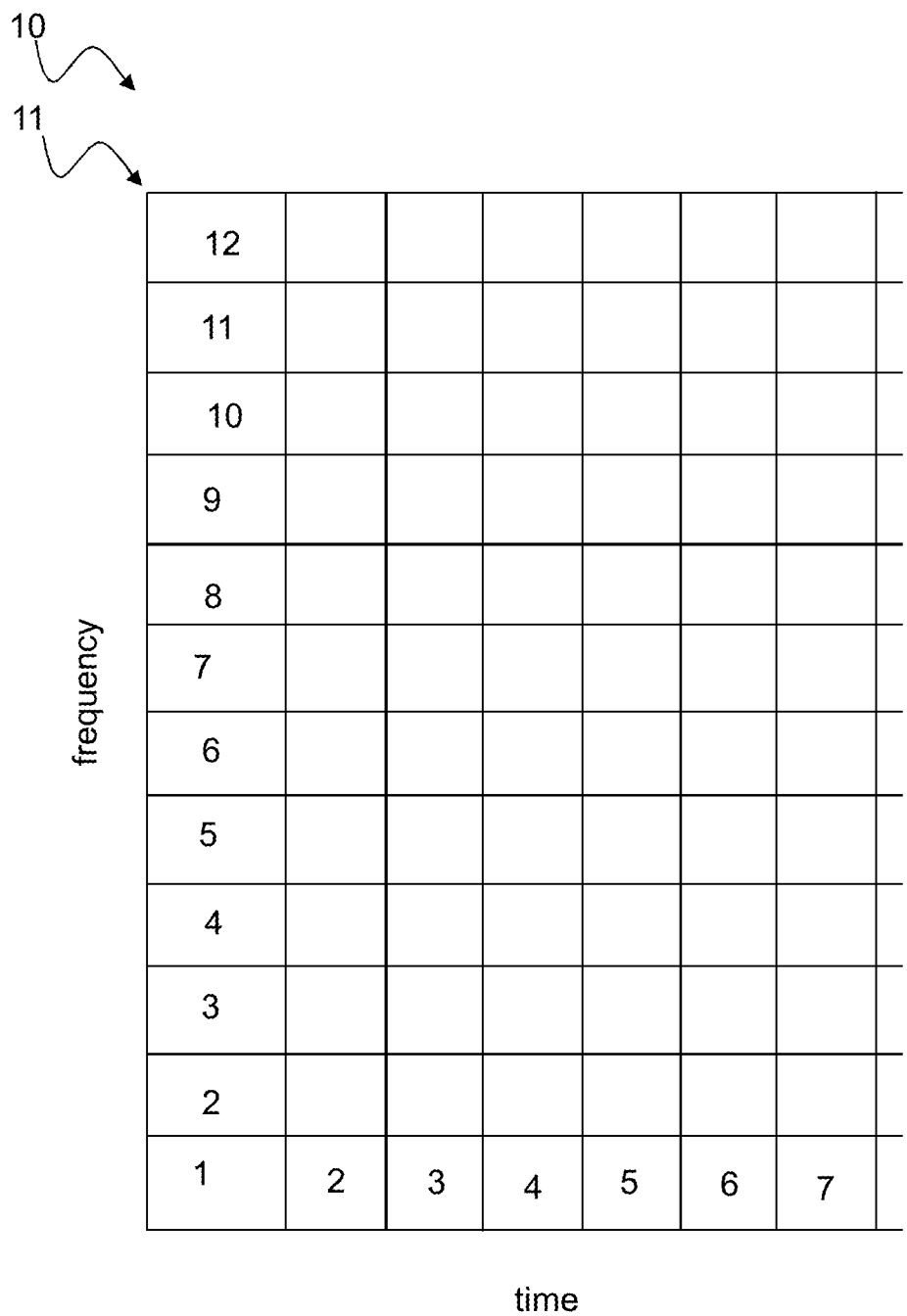
FIG. 29(a) shows a schematic diagram illustrating a chargeable resource 10 according to an embodiment.

FIG. 29(a) shows a schematic diagram illustrating a chargeable resource 10 according to an embodiment. The chargeable resource includes a resource block 12 including time-frequency resources, e.g. as defined by 3GPP. The resource block 12 may include an exemplary number of 12 sub-carriers 11 in frequency and 7 time units.

Figure 29B:
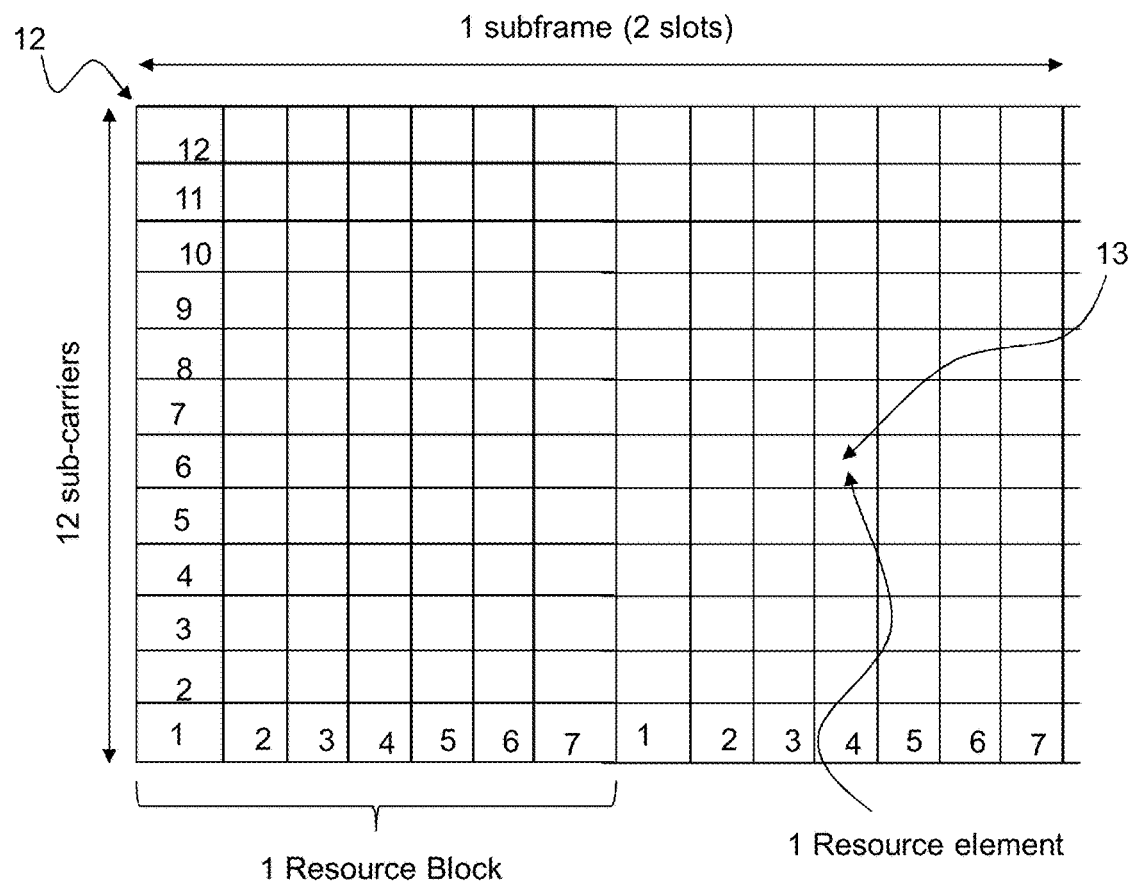
FIG. 29(b) shows a schematic diagram illustrating a chargeable resource 12 according to an embodiment.

FIG. 29(b) shows a schematic diagram illustrating a chargeable resource according to an embodiment. The chargable resource may include a subframe, e.g. as defined by 3GPP. The subframe includes 2 slots in time and 12 sub-carriers in frequency. The chargeable resource depicted in FIG. 29(b) includes 2 resource blocks 12 as depicted in FIG. 29(a), each resource block including a number of 7 times 12 resource elements 13.

Figure 29C:
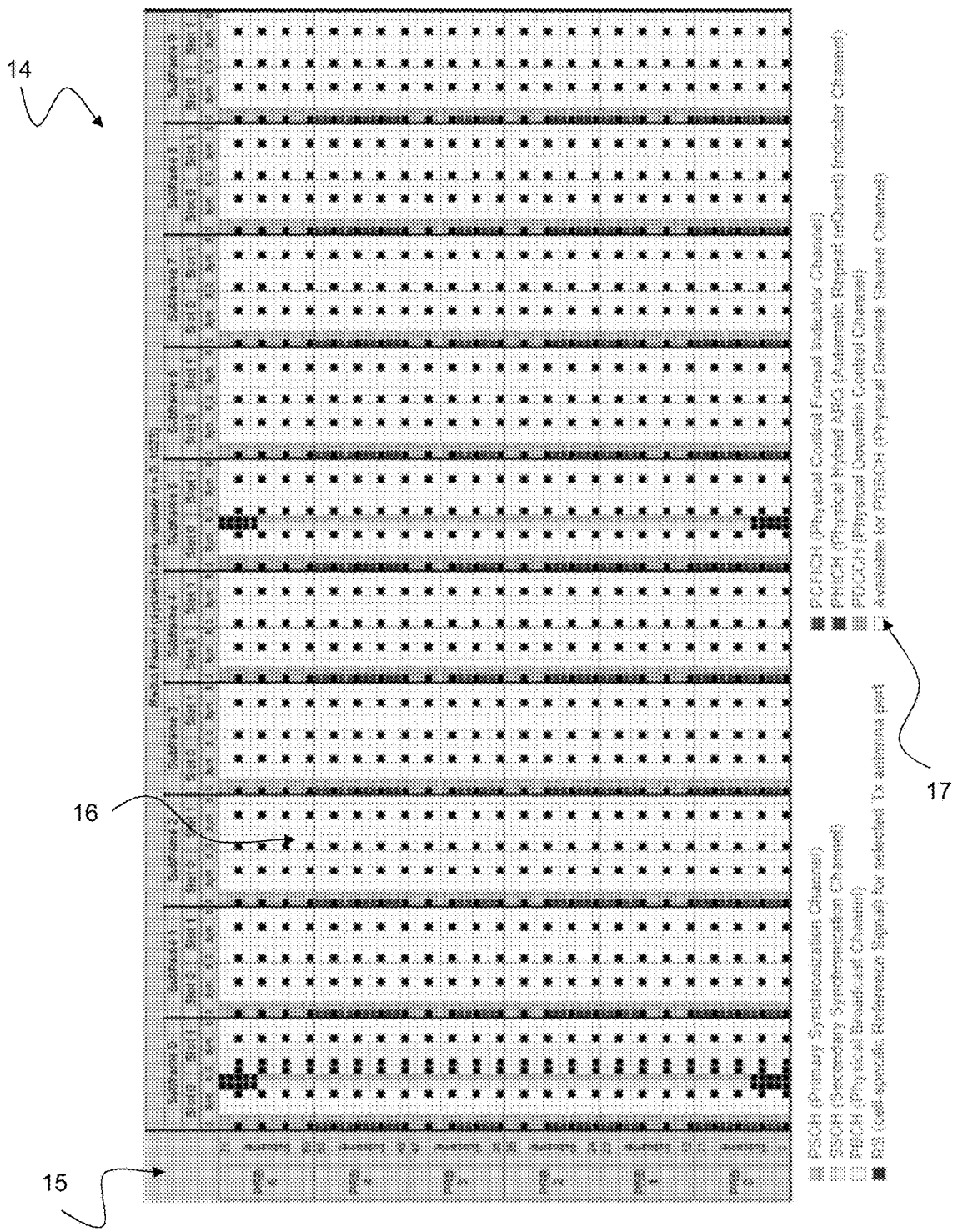
FIG. 29(c) shows a schematic diagram illustrating a chargeable resource 14 according to an embodiment.

FIG. 29(c) shows a schematic diagram illustrating a chargeable resource 14 according to an embodiment. The chargeable resource 14 includes an exemplary number of 10 subframes as depicted in FIG. 29(b) and an exemplary number of 6 physical resource blocks (PRBs) 12 as depicted in FIG. 29(b). Some resource elements 17 in the chargeable resource 14 depicted in FIG. 29(c) are available for PDSCH (Physical Downlink Shared Channel), i.e. for charging.

Figure 30:
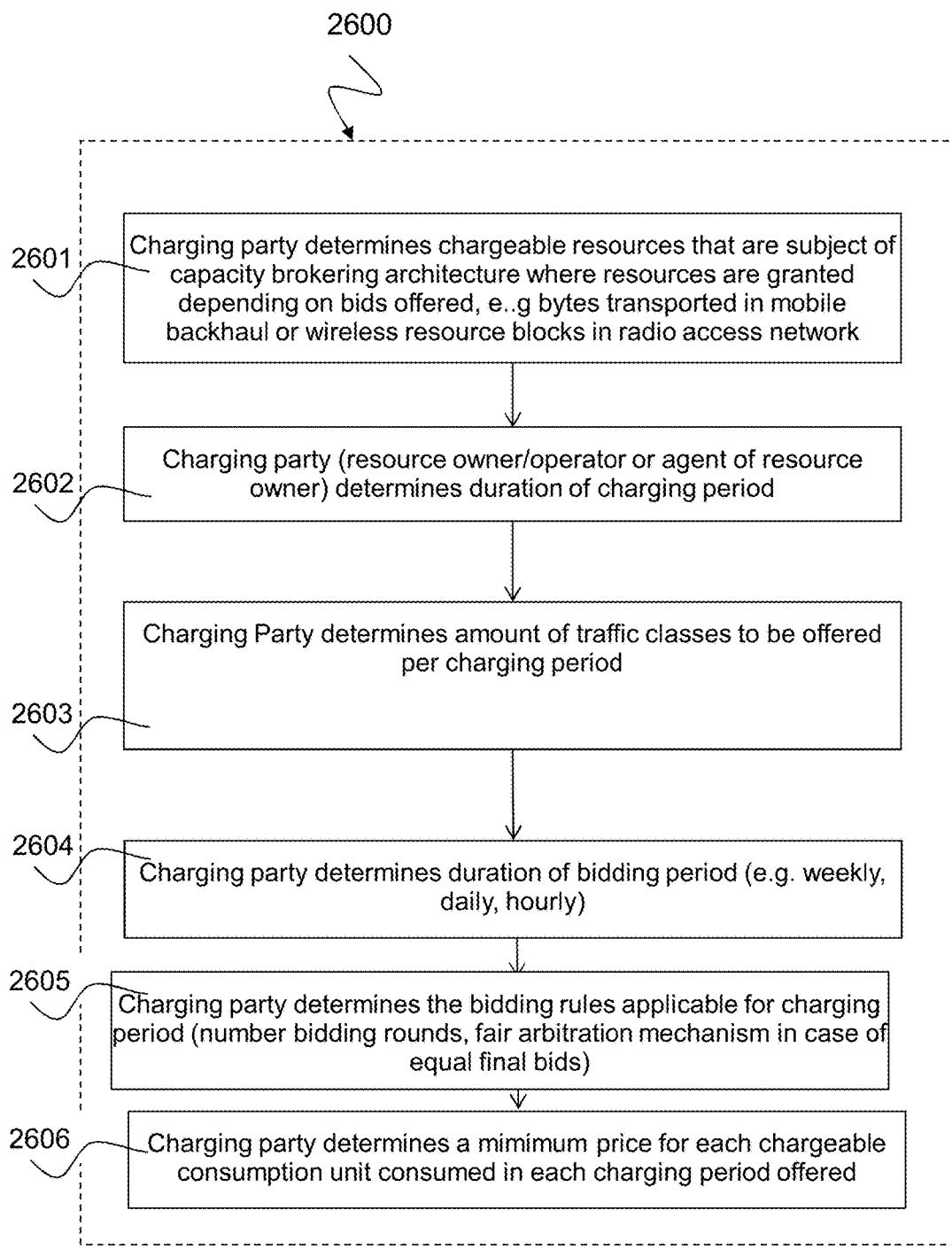
FIG. 30 shows a schematic diagram illustrating a bidding process with preparation steps by charing party according to an embodiment.

FIG. 30 shows a schematic diagram illustrating a bidding process 2600 with preparation steps by charging party according to an embodiment.

The bidding process 2600 includes a first step 2601: Charging party determines chargeable resources that are subject of capacity brokering architecture where resources are granted depending on bids offered, e.g. bytes transported in mobile backhaul or wireless resource blocks in radio access network.

The bidding process 2600 includes a second step 2602: Charging party (resource owner/operator or agent of resource owner) determines duration of charging period.

The bidding process 2600 includes a third step 2603: Charging Party determines amount of traffic classes to be offered per charging period.

The bidding process 2600 includes a fourth step 2604: Charging party determines duration of bidding period (e.g. weekly, daily, hourly).

The bidding process 2600 includes a fifth step 2605: Charging party determines a minimum price for each charging period offered.

The bidding process 2600 includes a sixth step 2606: Charging party determines a minimum price for each charging period offered.

Figure 31:
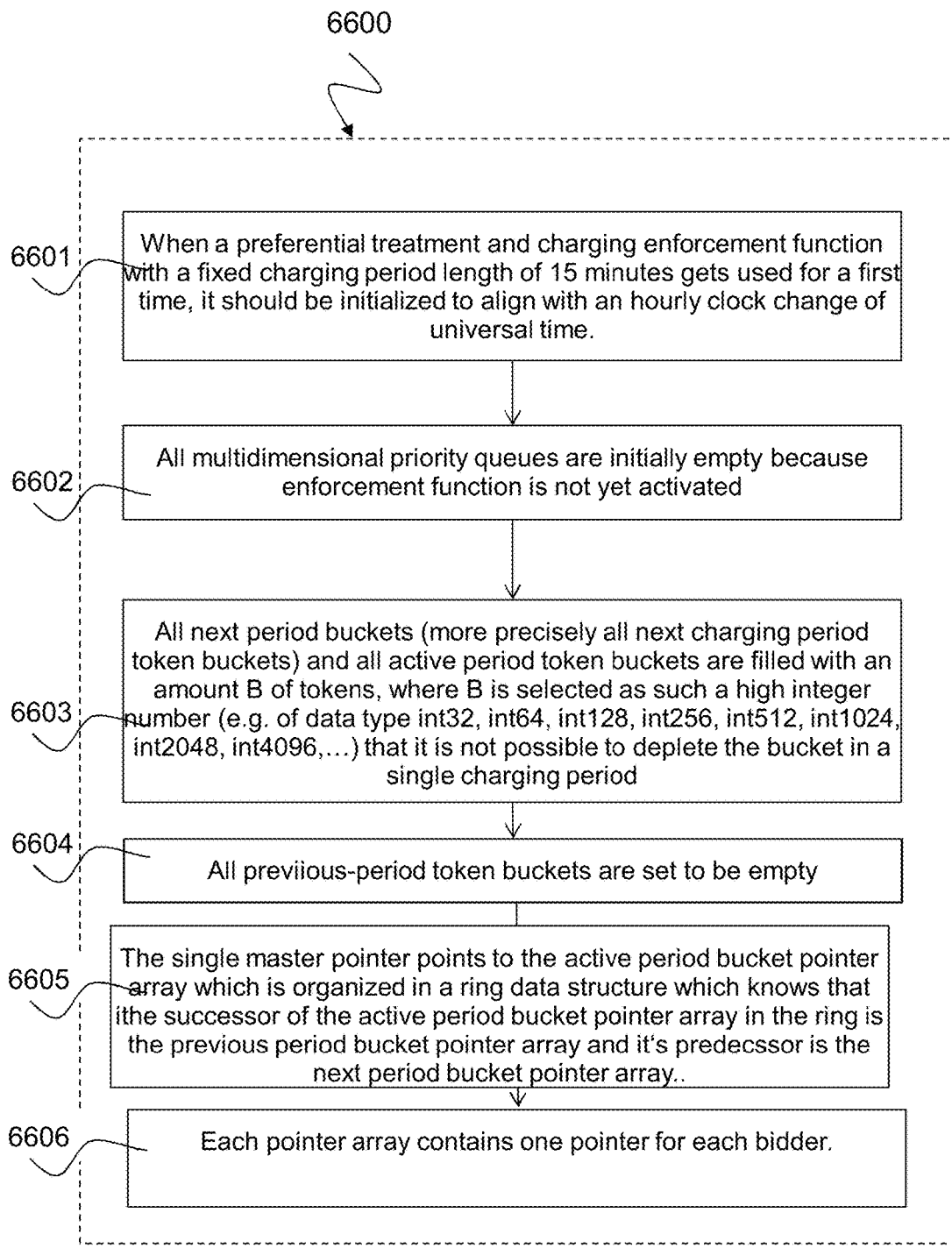
FIG. 31 shows a schematic diagram illustrating a method using a preferential treatment and charging enforcement function in a communication network according to an embodiment.

FIG. 31 shows a schematic diagram illustrating a method 6600 using a preferential treatment and charging enforcement function in a communication network according to an embodiment.

The method 6600 includes a first step 6601: When a preferential treatment and charging enforcement function with a fixed charging period length of 15 minutes gets used for a first time, it should be initialized to align with an hourly clock change of universal time.

The method 6600 includes a second step 6602: All multidimensional priority queues are initially empty because enforcement function is not yet activated.

The method 6600 includes a third step 6603: All next period buckets (more precisely all next charging period token buckets) and all active period token buckets are filled with an amount B of tokens, where B is selected as such a high integer number (e.g. of data type int32, int64, int128, int256, int512, int1024, int2048, int4096, . . . ) that it is not possible to deplete the bucket in a single charging period.

The method 6600 includes a fourth step 6604: All previous-period token buckets are set to be empty.

The method 6600 includes a fifth step 6605: The single master pointer points to the active period bucket pointer array which is organized in a ring data structure which knows that the successor of the active period bucket pointer array in the ring is the previous period bucket pointer array and it's predecessor is the next period bucket pointer array.

The method 6600 includes a sixth step 6606: Each pointer array contains one pointer for each bidder.

Figure 32:
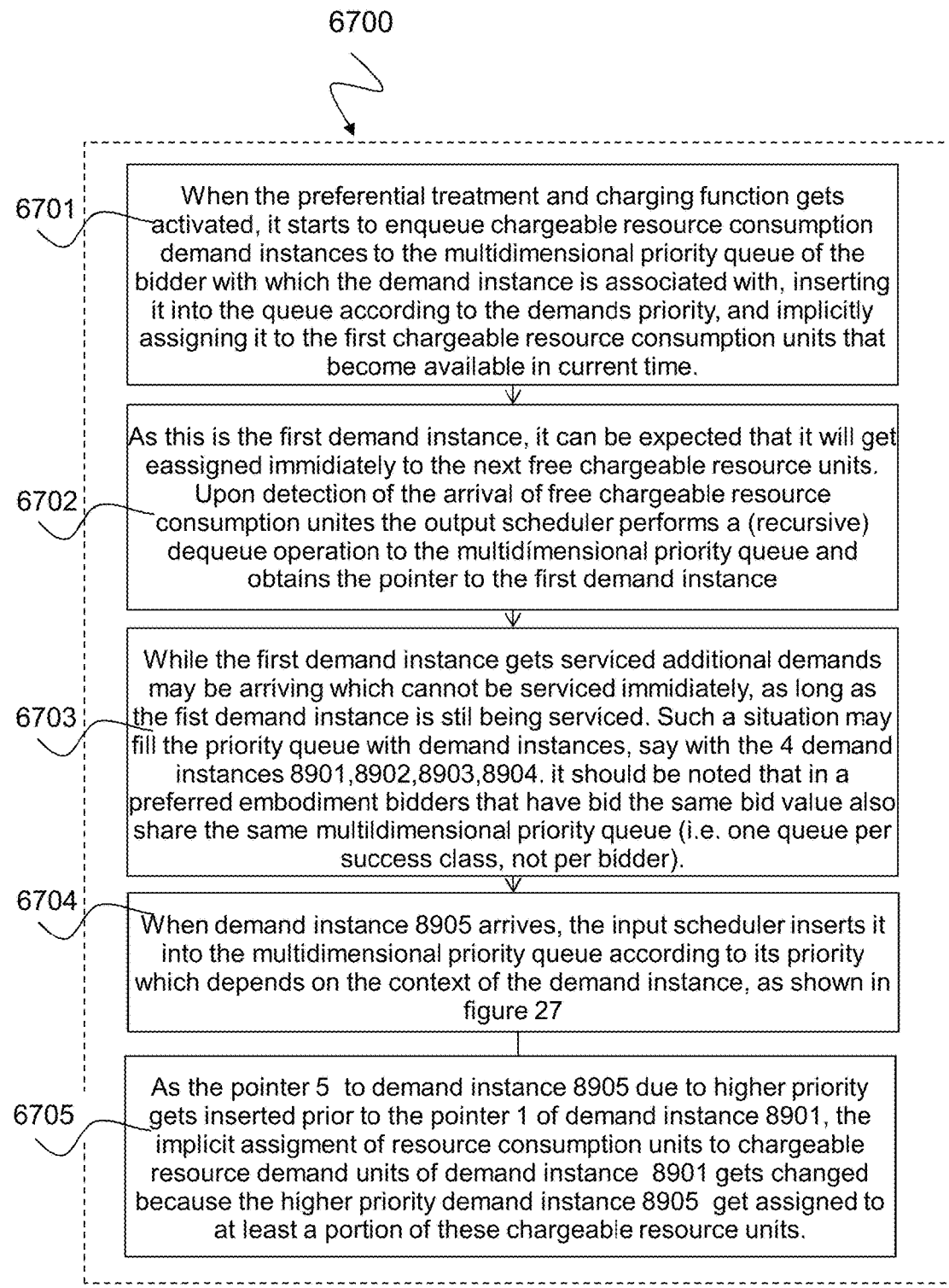
FIG. 32 shows a schematic diagram illustrating a method using a preferential treatment and charging enforcement function in a communication network according to an embodiment.

FIG. 32 shows a schematic diagram illustrating a method 6700 using a preferential treatment and charging enforcement function in a communication network according to an embodiment.

The method 6700 includes a first step 6701: When the preferential treatment and charging function gets activated, it starts to enqueue chargeable resource consumption demand instances to the multidimensional priority queue of the bidder with which the demand instance is associated with, inserting it into the queue according to the demands priority, and implicitly assigning it to the first chargeable resource consumption units that become available in current time.

The method 6700 includes a second step 6702: As this is the first demand instance, it can be expected that it will get assigned immediately to the next free chargeable resource units. Upon detection of the arrival of free chargeable resource consumption unites the output scheduler performs a (recursive) dequeue operation to the multidimensional priority queue and obtains the pointer to the first demand instance.

The method 6700 includes a third step 6703: While the first demand instance gets serviced additional demands may be arriving which cannot be serviced immediately, as long as the first demand instance is still being serviced. Such a situation may fill the priority queue with demand instances, say with the 4 demand instances 8901,8902,8903,8904. It should be noted that in a preferred embodiment bidders that have bid the same bid value also share the same multidimensional priority queue (i.e. one queue per success class, not per bidder).

The method 6700 includes a fourth step 6704: When demand instance 8905 arrives, the input scheduler inserts it into the multidimensional priority queue according to its priority which depends on the context of the demand instance, as shown in FIG. 27.

The method 6700 includes a fifth step 6705: As the pointer 5 to demand instance 8905 due to higher priority gets inserted prior to the pointer 1 of demand instance 8901, the implicit assignment of resource consumption units to chargeable resource demand units of demand instance 8901 gets changed because the higher priority demand instance 8905 get assigned to at least a portion of these chargeable resource units.

Figure 33:
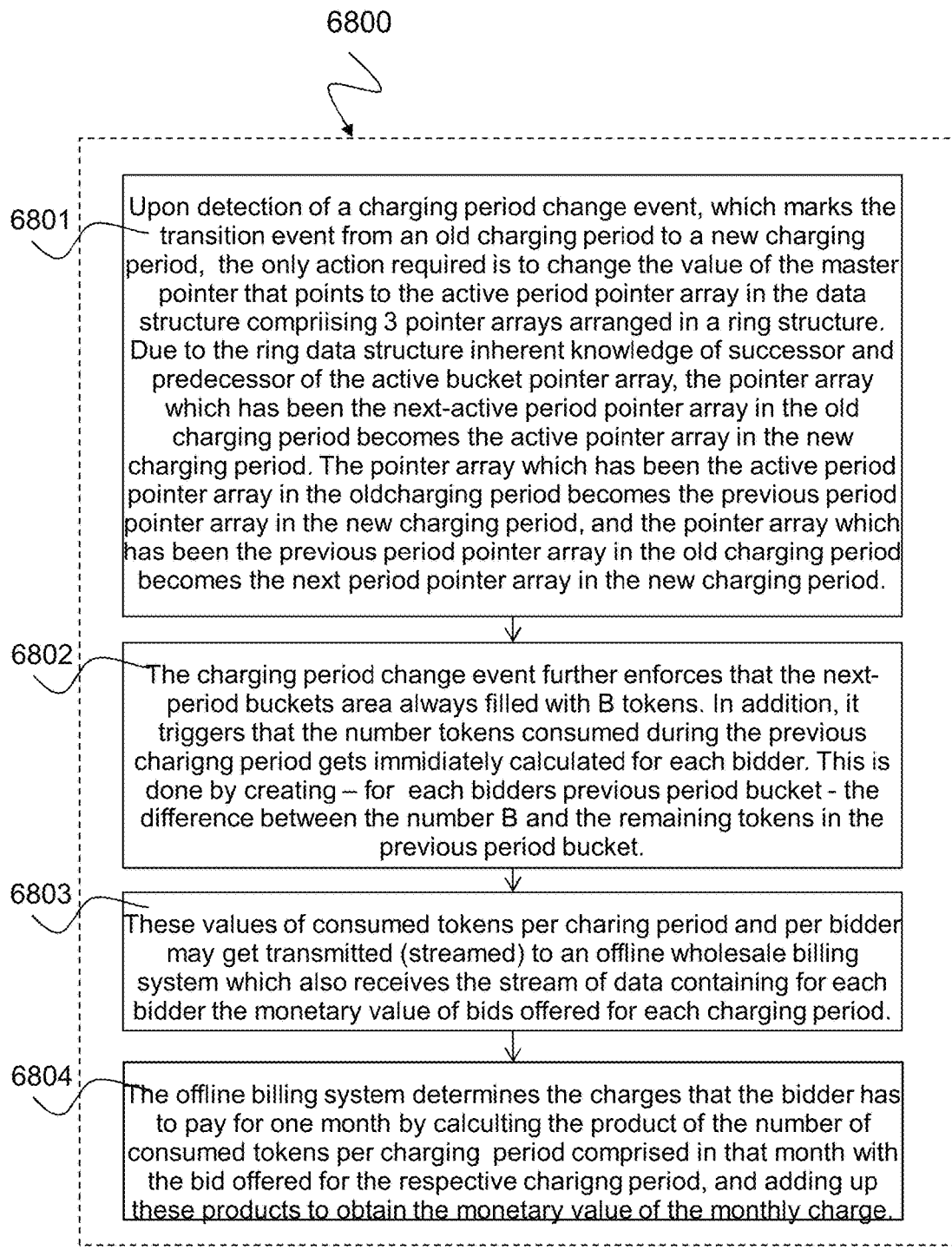
FIG. 33 shows a schematic diagram illustrating a method using a preferential treatment and charging enforcement function in a communication network according to an embodiment.

FIG. 33 shows a schematic diagram illustrating a method 6800 using a preferential treatment and charging enforcement function in a communication network according to an embodiment.

The method 6800 includes a first step 6801: Upon detection of a charging period change event, which marks the transition event from an old charging period to a new charging period, the only action required is to change the value of the master pointer that points to the active period pointer array in the data structure comprising 3 pointer arrays arranged in a ring structure. Due to the ring data structure inherent knowledge of successor and predecessor of the active bucket pointer array, the pointer array which has been the next-active period pointer array in the old charging period becomes the active pointer array in the new charging period. The pointer array which has been the active period pointer array in the old charging period becomes the previous period pointer array in the new charging period, and the pointer array which has been the previous period pointer array in the old charging period becomes the next period pointer array in the new charging period.

The method 6800 includes a second step 6802: The charging period change event further enforces that the next-period buckets area always filled with B tokens. In addition, it triggers that the number tokens consumed during the previous charging period gets immediately calculated for each bidder. This is done by creating—for each bidder's previous period bucket—the difference between the number B and the remaining tokens in the previous period bucket.

The method 6800 includes a third step 6803: These values of consumed tokens per charing period and per bidder may get transmitted (streamed) to an offline wholesale billing system which also receives the stream of data containing for each bidder the monetary value of bids offered for each charging period.

The method 6800 includes a fourth step 6804: The offline billing system determines the charges that the bidder has to pay for one month by calculating the product of the number of consumed tokens per charging period comprised in that month with the bid offered for the respective charging period, and adding up these products to obtain the monetary value of the monthly charge.

Figure 34:
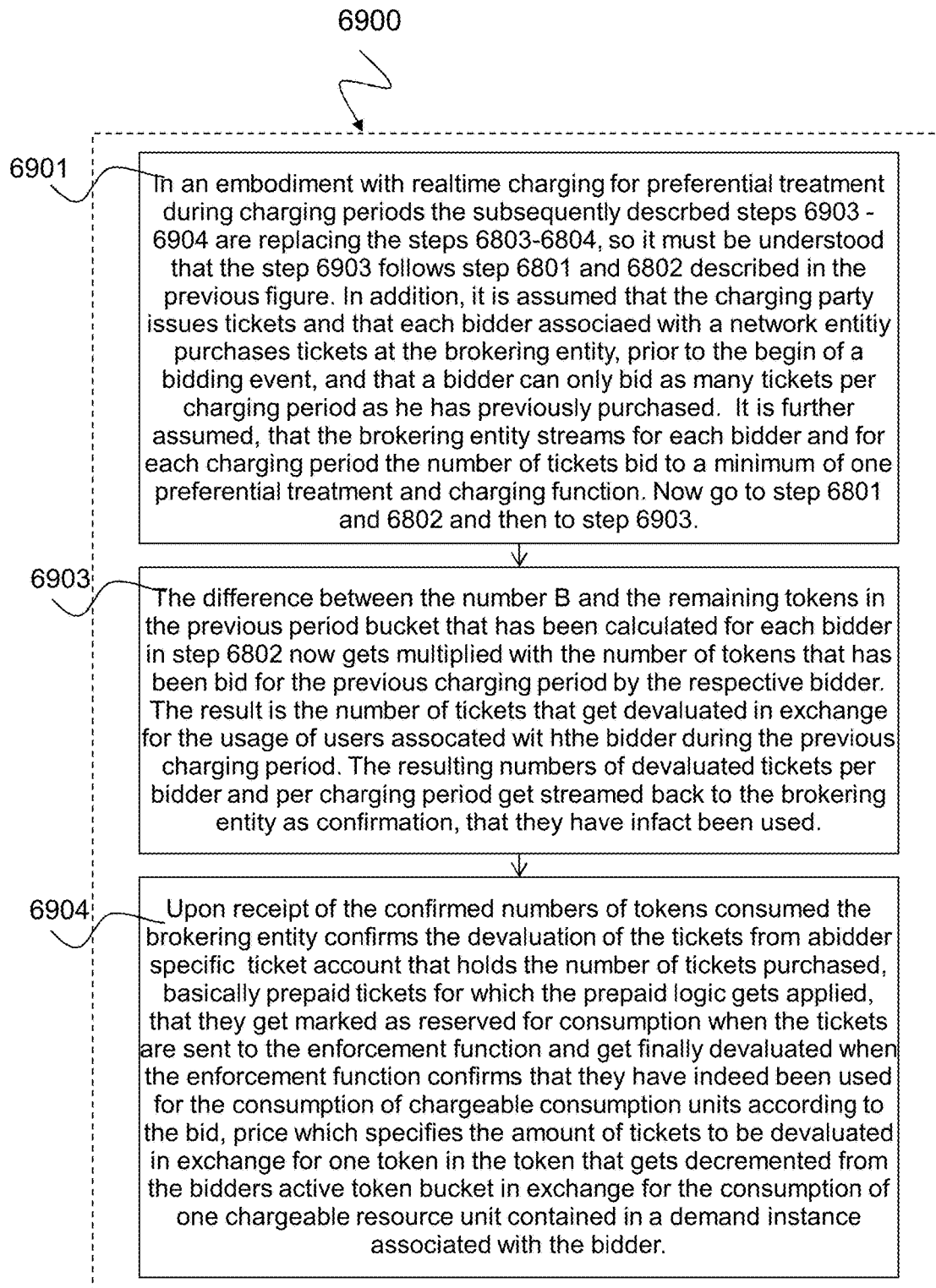
FIG. 34 shows a schematic diagram illustrating a method using a preferential treatment and charging enforcement function in a communication network according to an embodiment.

FIG. 34 shows a schematic diagram illustrating a method 6900 using a preferential treatment and charging enforcement function in a communication network according to an embodiment.

The method 6900 includes a first step 6901: In an embodiment with realtime charging for preferential treatment during charging periods the subsequently described steps 6903-6904 are replacing the steps 6803-6804, so it must be understood that the step 6903 follows step 6801 and 6802 described in the previous figure. In addition, it is assumed that the charging party issues tickets and that each bidder associated with a network entity purchases tickets at the brokering entity, prior to the begin of a bidding event, and that a bidder can only bid as many tickets per charging period as he has previously purchased. It is further assumed, that the brokering entity streams for each bidder and for each charging period the number of tickets bid to a minimum of one preferential treatment and charging function. Now go to step 6801 and 6802 and then to step 6903.

The method 6900 includes a second step 6903: The difference between the number B and the remaining tokens in the previous period bucket that has been calculated for each bidder in step 6802 now gets multiplied with the number of tokens that has been bid for the previous charging period by the respective bidder. The result is the number of tickets that get devaluated in exchange for the usage of users' associated with the bidder during the previous charging period. The resulting numbers of devaluated tickets per bidder and per charging period get streamed back to the brokering entity as confirmation, that they have in fact been used.

The method 6900 includes a third step 6904: Upon receipt of the confirmed numbers of tokens consumed the brokering entity confirms the devaluation of the tickets from a bidder specific ticket account that holds the number of tickets purchased, basically prepaid tickets for which the prepaid logic gets applied, that they get marked as reserved for consumption when the tickets are sent to the enforcement function and get finally devaluated when the enforcement function confirms that they have indeed been used for the consumption of chargeable consumption units according to the bid, price which specifies the amount of tickets to be devaluated in exchange for one token in the token that gets decremented from the bidders active token bucket in exchange for the consumption of one chargeable resource unit contained in a demand instance associated with the bidder.

Figure 35:
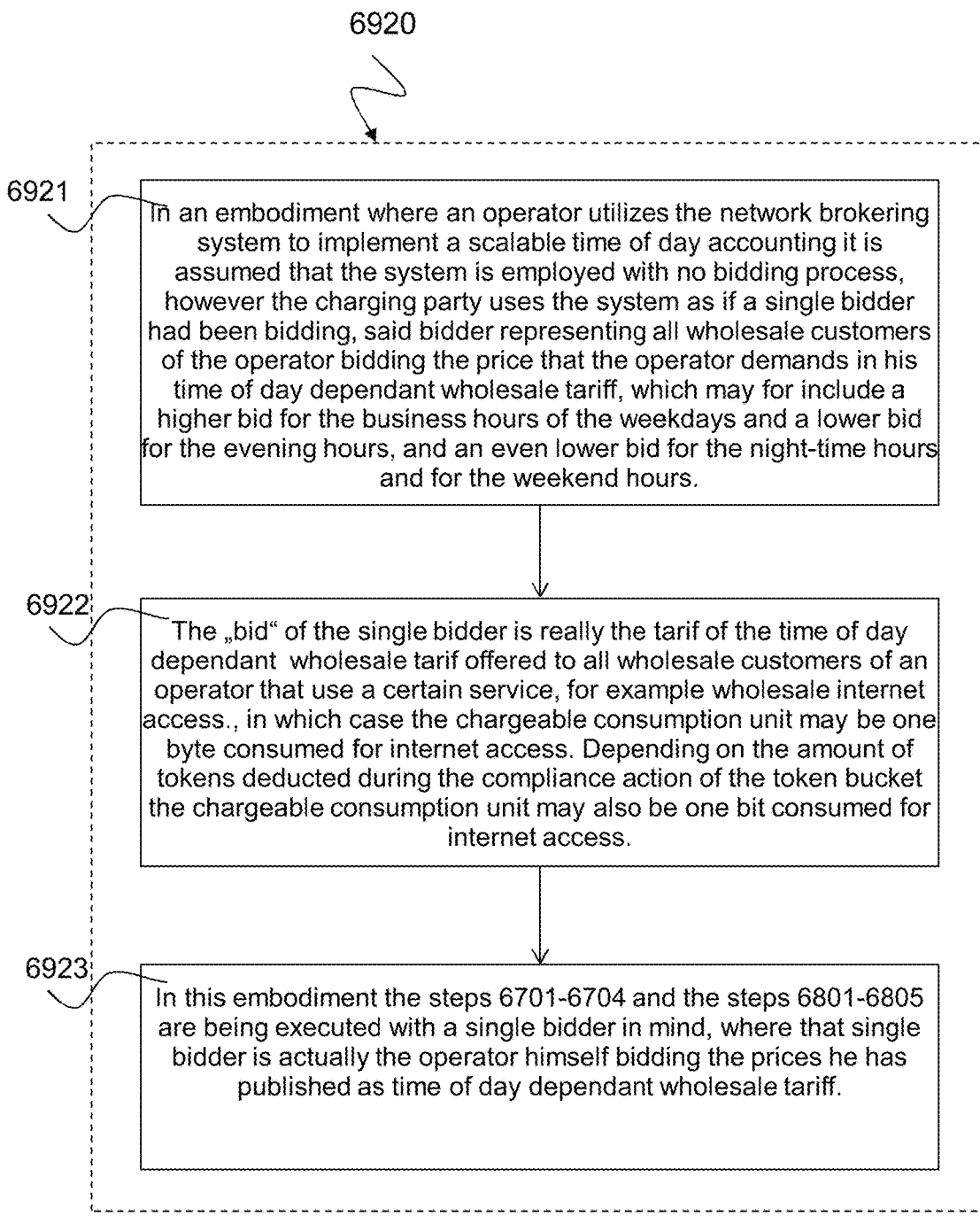
FIG. 35 shows a schematic diagram illustrating a method using a preferential treatment and charging enforcement function in a communication network according to an embodiment.

FIG. 35 shows a schematic diagram illustrating a method 6920 using a preferential treatment and charging enforcement function in a communication network according to an embodiment.

The method 6920 includes a first step 6921: In an embodiment where an operator utilizes the network brokering system to implement a scalable time of day accounting it is assumed that the system is employed with no bidding process, however the charging party uses the system as if a single bidder had been bidding, said bidder representing all wholesale customers of the operator bidding the price that the operator demands in his time of day dependant wholesale tariff, which may for include a higher bid for the business hours of the weekdays and a lower bid for the evening hours, and an even lower bid for the night-time hours and for the weekend hours.

The method 6920 includes a second step 6922: The "bid" of the single bidder is really the tarif of the time of day dependant wholesale tarif offered to all wholesale customers of an operator that use a certain service, for example wholesale internet access, in which case the chargeable consumption unit may be one byte consumed for internet access. Depending on the amount of tokens deducted during the compliance action of the token bucket the chargeable consumption unit may also be one bit consumed for internet access.

The method 6920 includes a third step 6923: In this embodiment the steps 6701-6704 and the steps 6801-6805 are being executed with a single bidder in mind, where that single bidder is actually the operator himself bidding the prices he has published as time of day dependant wholesale tariff.

Figure 36:
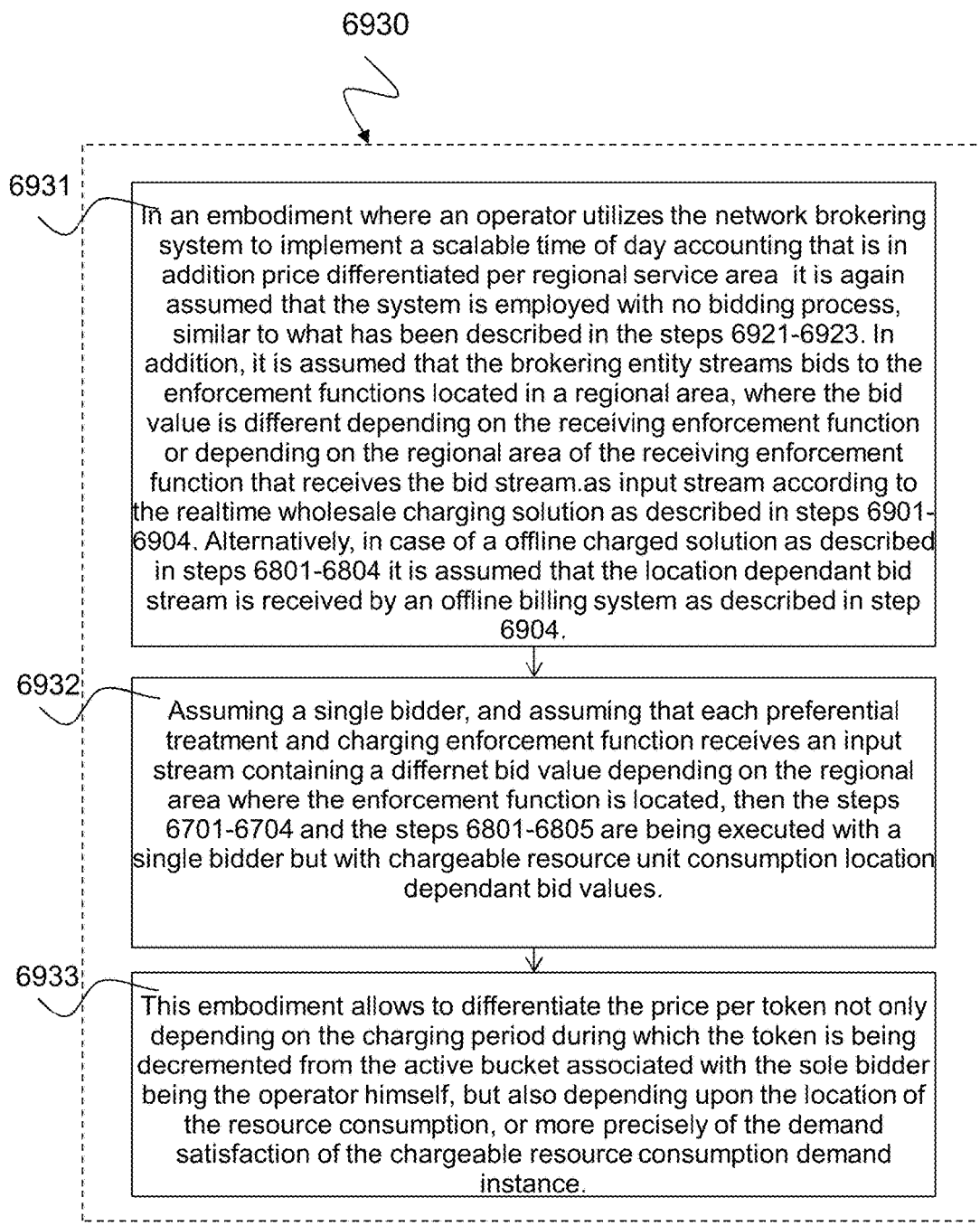
FIG. 36 shows a schematic diagram illustrating a method using a preferential treatment and charging enforcement function in a communication network according to an embodiment.

FIG. 36 shows a schematic diagram illustrating a method 6930 using a preferential treatment and charging enforcement function in a communication network according to an embodiment.

The method 6930 includes a first step 6931: In an embodiment where an operator utilizes the network brokering system to implement a scalable time of day accounting that is in addition price differentiated per regional service area it is again assumed that the system is employed with no bidding process, similar to what has been described in the steps 6921-6923. In addition, it is assumed that the brokering entity streams bids to the enforcement functions located in a regional area, where the bid value is different depending on the receiving enforcement function or depending on the regional area of the receiving enforcement function that receives the bid stream as input stream according to the realtime wholesale charging solution as described in steps 6901-6904. Alternatively, in case of a offline charged solution as described in steps 6801-6804 it is assumed that the location dependant bid stream is received by an offline billing system as described in step 6904.

The method 6930 includes a second step 6932: Assuming a single bidder, and assuming that each preferential treatment and charging enforcement function receives an input stream containing a different bid value depending on the regional area where the enforcement function is located, then the steps 6701-6704 and the steps 6801-6805 are being executed with a single bidder but with chargeable resource unit consumption location dependant bid values.

The method 6930 includes a third step 6933: This embodiment allows to differentiate the price per token not only depending on the charging period during which the token is being decremented from the active bucket associated with the sole bidder being the operator himself, but also depending upon the location of the resource consumption, or more precisely of the demand satisfaction of the chargeable resource consumption demand instance.

Figure 37:
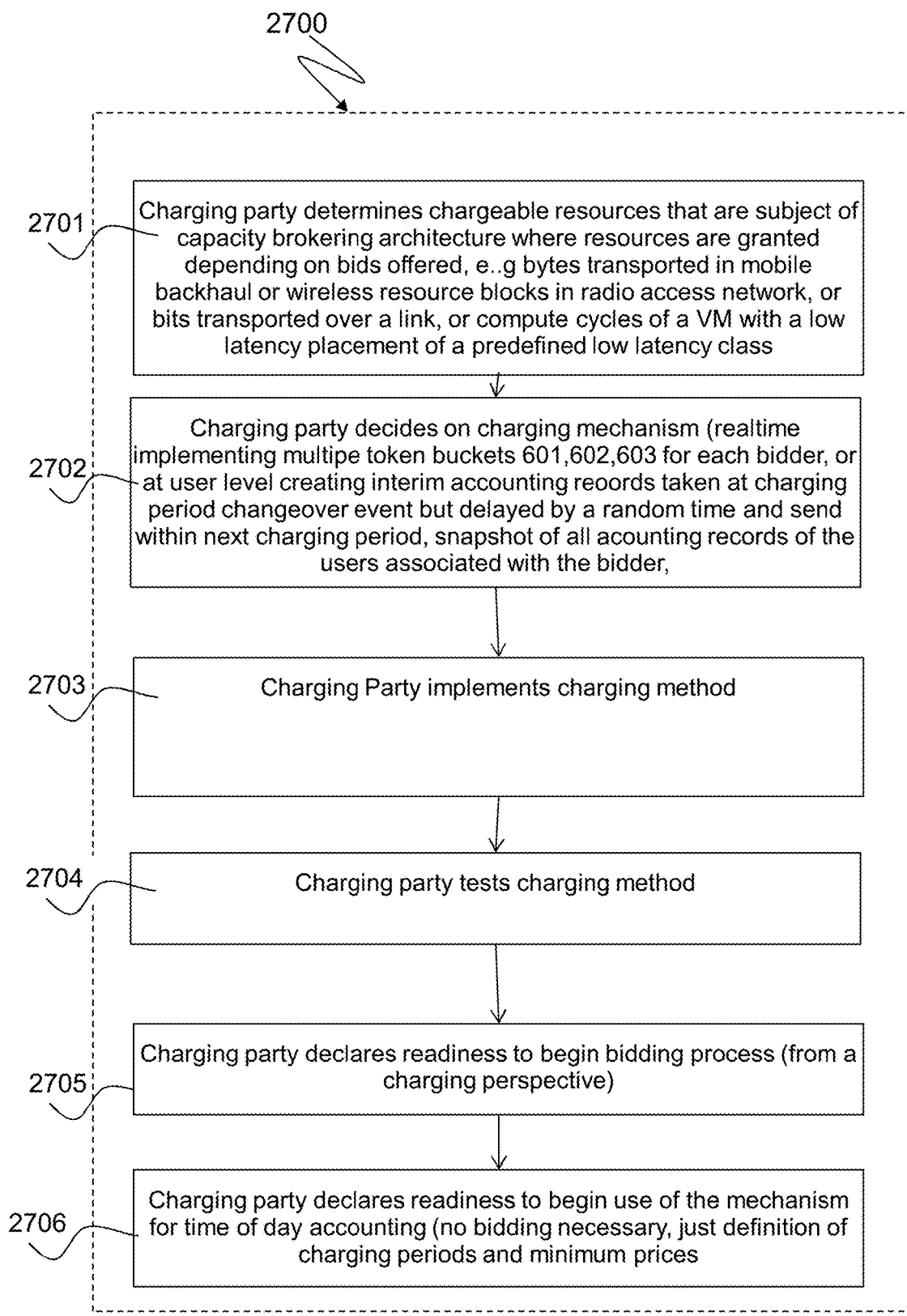
FIG. 37 shows a schematic diagram illustrating a bidding process with preparation steps by charing party network side according to an embodiment.

FIG. 37 shows a schematic diagram illustrating a bidding process 2700 with preparation steps by charing party network side according to an embodiment.

The bidding process 2700 includes a first step 2701: Charging party determines chargeable resources that are subject of capacity brokering architecture where resources are granted depending on bids offered, e.g. bytes transported in mobile backhaul or wireless resource blocks in radio access network.

The bidding process 2700 includes a second step 2702: Charging party decides on charging mechanism (realtime implementing multiple token buckets 601,602,603 for each bidder, or at user level creating interim accounting records taken at charging period changeover event but delayed by a random time and send within next charging period, snapshot of all accounting records of the users associated with the bidder.

The bidding process 2700 includes a third step 2703: Charging Party implements charging method.

The bidding process 2700 includes a fourth step 2704: Charging party tests charging method.

The bidding process 2700 includes a fifth step 2705: Charging party declares readiness to begin bidding process (from a charging perspective).

Figure 38:
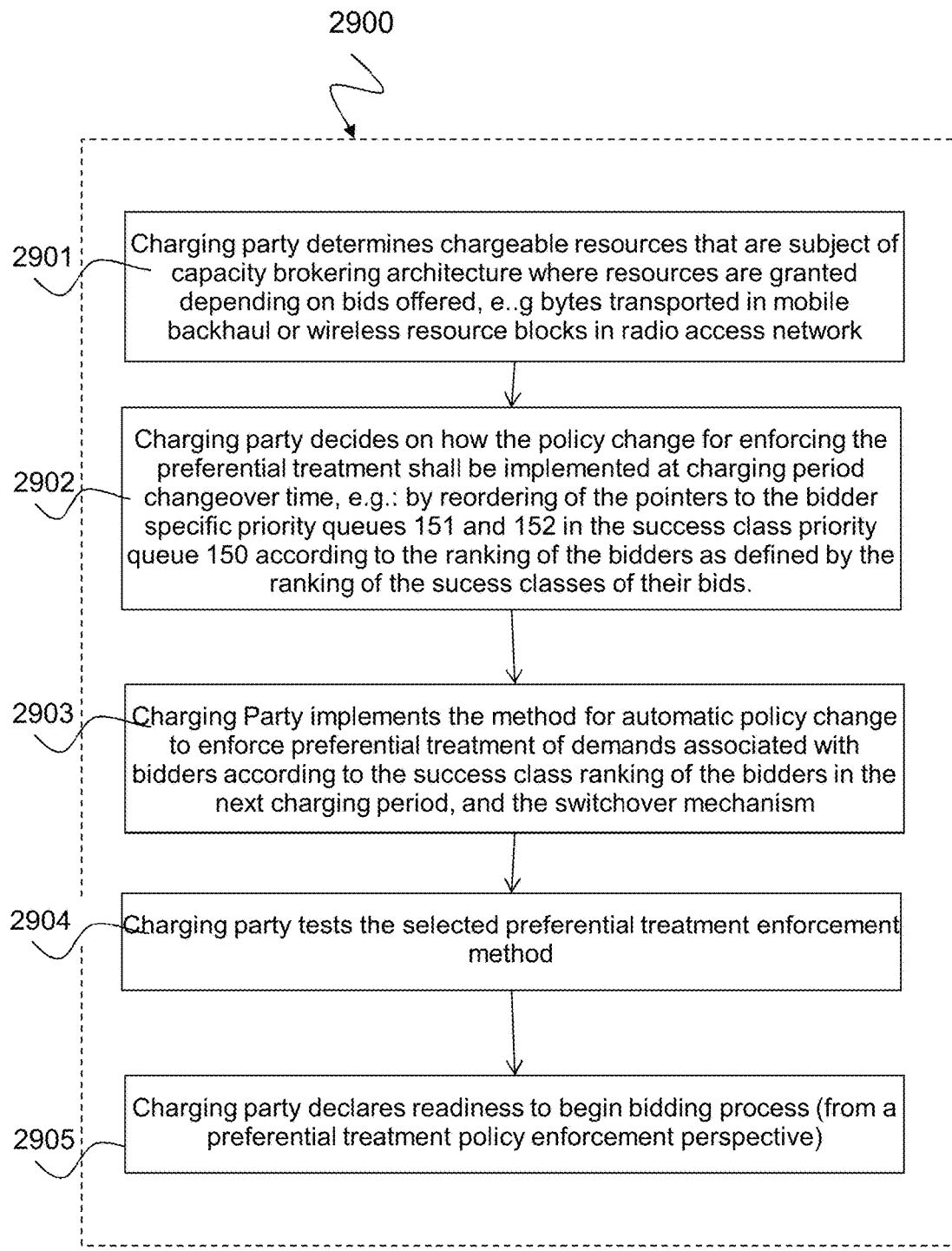
FIG. 38 shows a schematic diagram illustrating a bidding process with preparation steps by charging party network side according to an embodiment.

FIG. 38 shows a schematic diagram illustrating a bidding process 2900 with preparation steps by charing party network side according to an embodiment.

The bidding process 2900 includes a first step 2901: Charging party determines chargeable resources that are subject of capacity brokering architecture where resources are granted depending on bids offered, e.g. bytes transported in mobile backhaul or wireless resource blocks in radio access network.

The bidding process 2900 includes a second step 2902: Charging party decides on how the policy change for enforcing the preferential treatment shall be implemented at charging period changeover time, e.g.: by reordering of the pointers to the bidder specific priority queues 151 and 152 in the success class priority queue 150 according to the ranking of the bidders as defined by the ranking of the success classes of their bids.

The bidding process 2900 includes a third step 2903: Charging Party implements the method for automatic policy change to enforce preferential treatment of demands associated with bidders according to the success class ranking of the bidders in the next charging period, and the switchover mechanism.

The bidding process 2900 includes a fourth step 2904: Charging party tests the selected preferential treatment enforcement method.

The bidding process 2900 includes a fifth step 2905: Charging party declares readiness to begin bidding process (from a preferential treatment policy enforcement perspective).

Figure 39:
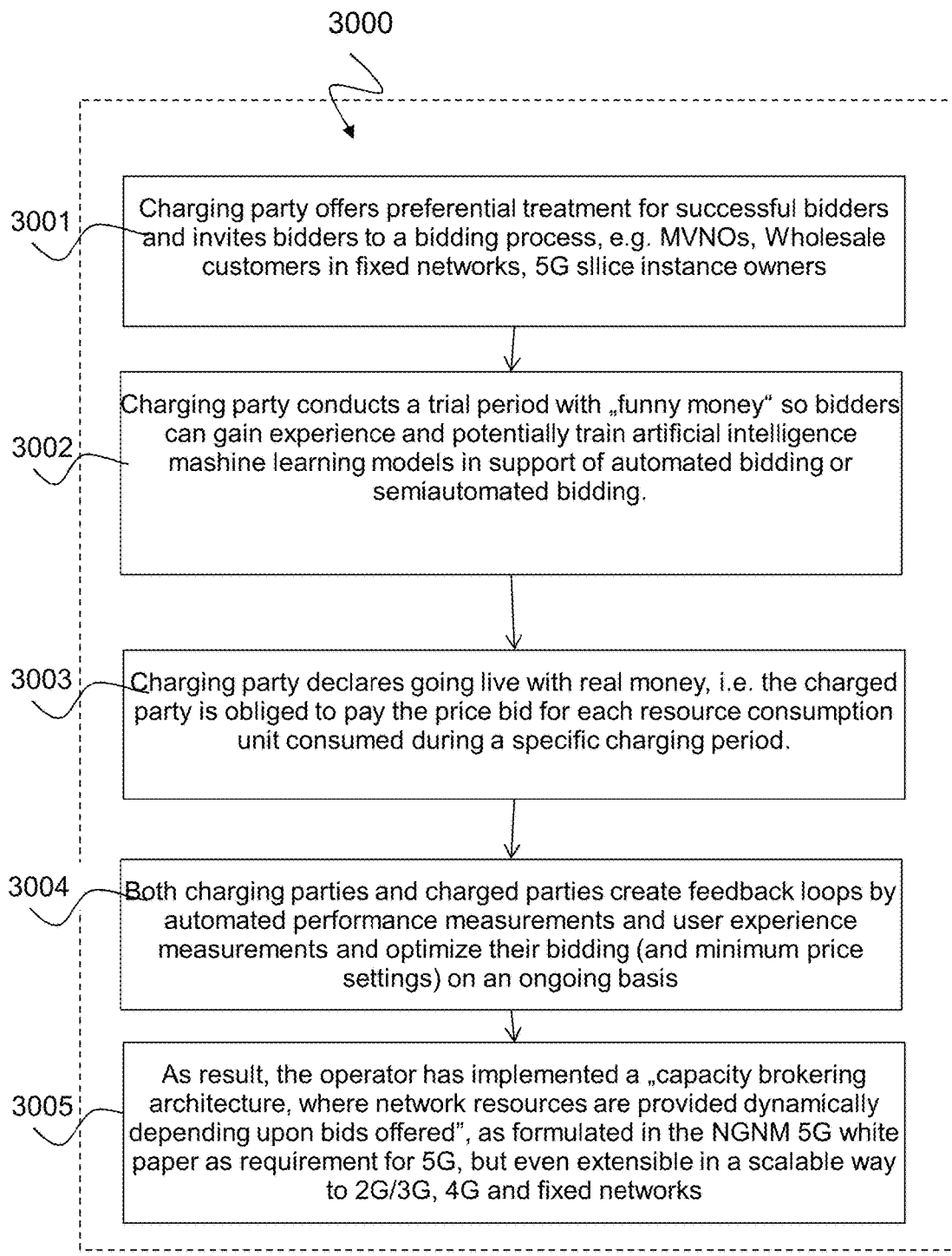
FIG. 39 shows a schematic diagram illustrating a bidding process with preparation steps by charging party network side according to an embodiment.

FIG. 39 shows a schematic diagram illustrating a bidding process 3000 with preparation steps by charing party network side according to an embodiment.

The bidding process 3000 includes a first step 3001: Charging party offers preferential treatment for successful bidders and invites bidders to a bidding process, e.g. MVNOs, Wholesale customers in fixed networks, 5G slice instance owners.

The bidding process 3000 includes a second step 3002: Charging party conducts a trial period with "funny money", so bidders can gain experience and potentially train artificial intelligence mashine learning models in support of automated bidding or semiautomated bidding.

The bidding process 3000 includes a third step 3003: Charging party declares going live with real money, i.e. the charged party is obliged to pay the price bid for each resource consumption unit consumed during a specific charging period.

The bidding process 3000 includes a fourth step 3004: Both charging parties and charged parties create feedback loops by automated performance measurements and user experience measurements and optimize their bidding (and minimum price settings) on an ongoing basis.

The bidding process 3000 includes a fifth step 3005: As result, the operator has implemented a "capacity brokering architecture, where network resources are provided dynamically depending upon bids offered", as formulated in the NGNM 5G white paper as requirement for 5G, but even extensible in a scalable way to 2G/3G, 4G and fixed networks.

Figure 40:
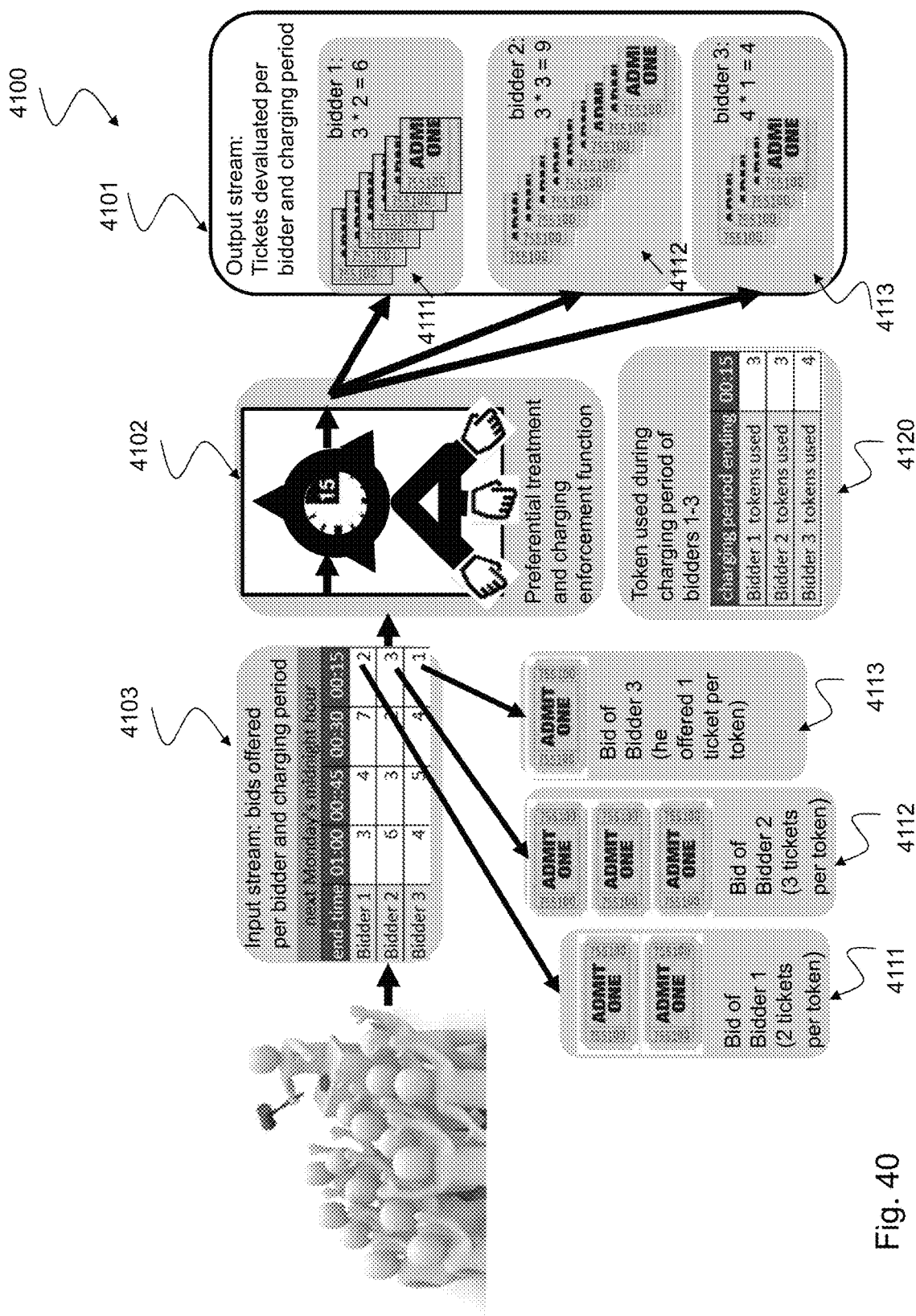
FIG. 40 shows a schematic diagram illustrating a system using a preferential treatment and charging enforcement function in a communication network according to an embodiment.

FIG. 40 shows a schematic diagram illustrating a system 4100 using a preferential treatment and charging enforcement function network entity 4102 in a communication network according to an embodiment. The preferential treatment and charging enforcement function network entity 4102 processes an input stream 4103 including bids offered per bidder and charging period for an exemplary number of three bidders, e.g. a first bidder 4111, a second bidder 4112 and a third bidder 4113. The preferential treatment and charging enforcement function network entity 4102 generates an output stream 4101 with tickets devaluated per bidder and charging period for the three bidders 4111, 4112, 4113. A table 4120 illustrates the number of tokens used during charging period for the three bidders 4111, 4112, 4113.

The enforcement function network entity 4102 includes an enforcement function for providing preferential treatment and charging in a communication network, e.g. as described above.

The enforcement function network entity 4102 includes an input configured to receive a stream of input data 4103 from a plurality of bidder function network entities 4111, 4112, 4113, the stream of input data comprising for each bidder function network entity 4111, 4112, 4113 a bid offer comprising an electronic bid value offered by the respective bidder function network entity.

The enforcement function network entity 4102 includes a processor configured to process an enforcement function for ranking the bid offers of the plurality of bidder function network entity according to a priority ranking, and determining for each bidder function network entity an amount of electronic bid values consumed during a charging period for satisfying the respective bid offer. The processor is configured to create a stream of output data 4101 comprising for each bidder function network entity 4111, 4112 and 4113 the amount of electronic bid values consumed during the charging period. The processor may assign the bidder function network entities to a plurality of success classes. The processor may rank the bid offers of the plurality of bidder function network entity according to the success classes assigned to the bid offers. The bid offers of the plurality of bidder function network entities may include demands for requesting scheduling of chargeable resource units, in particular time-frequency resource units. The chargeable resource unit may include an unused Resource Element 13, e.g. as described above with respect to FIGS. 29(*a*), 29(*b*), 29(*c*), that is usable for a physical downlink shared channel (PDSCH).

The processor may rank the bid offers of the plurality of bidder function network entities according to an energy consumed by the chargeable resource units when satisfying the demands. The processor may rank the bid offers of the plurality of bidder function network entities based on a multi-dimensional priority queue. The processor may include a bid input stream handling entity 1002 for handling the stream of input data and an output stream handling entity 1003 for providing the stream of output data, e.g. as described above with respect to FIGS. 24(*a*), 24(*b*) and 25(*a*), 25(*b*).

The processor may include a control interface handling entity 1004 for controlling processing of the enforcement function; and an event notification handling entity 1005 for providing event notifications informing about a processing of the enforcement function, e.g. as described above with respect to FIGS. 24(*a*), 24(*b*) and 25(*a*), 25(*b*).

The processor may include a control interface handling entity 1004 for controlling processing of the enforcement function; and an event notification handling entity 1005 for providing event notifications informing about a processing of the enforcement function, e.g. as described above with respect to FIGS. 24(*a*), 24(*b*) and 25(*a*), 25(*b*).

The processor may be configured to prefer a bid offer of a first bidder function network entity comprising a higher electronic bid value over a bid offer of a second bidder function network entity comprising a lower electronic bid value.

With 5G, it is possible to provide sufficient flexibility to accommodate the capacity needs of dynamically hosted operators, on a real-time basis (e.g., for capacity brokering architecture, where network resources are provided dynamically depending upon bids offered).Dynamic pricing for 5G, SDN & NFV can be achieved by smart bidders, e.g. machine learning, artificial intelligence. It is not about dynamic pricing for end users rather other parties such as: MVNO, vertical with 5G slice instance, Wholesale Partner, application owners demanding low latency etc., Middleware platforms. The price can be fixed prior to service consumption, thereby providing charging for preferred access to scarce resources. The successful bidder gets preference, e.g.: better QoS, higher bandwidth, low latency 5G slice instance, low latency SDN connectivity, low latency VNF placement, low latency application placement. Feedback loop can be enabled for automatic correlation with user experience. A feedback loop provides: ongoing machine learning, performance measurement data, user experience data, automated test calls, automated latency tests (Ping), etc.

The product may be the wholesale product (not an end user product). The bidding process can be scalable, comprehensible by bidders. The bidding process may have a verifiable bid success. The bidding process is implementable in Software and in Hardware (CPU/FPGA/ASIC). It is compatible with pre-5G (and with fixed networks e.g. for hybrid access/WiFi). It considers the operator's most valuable resources, i.e. Radio Network resources for mobile access, Copper/fiber link resources for fixed access, low latency placement of VNFs and applications in edge cloud.

The bid validity time may be the time period for which the offered bid price applies. For example, a 15 minute charging period may be introduced, e.g. for a 5G slice instance. This provides the following advantages: Enabling feedback loop with operational statistics; preferential treatment during charging period; automated bidding supported by machine learning on side of the bidders and on the side of the operator.

The methods, systems and devices described herein provide the following advantages: Introduce dynamic pricing to 5G, SDN & NFV; Introduce a multiplicity of charging periods such as 96 charging periods per day multiplied by number of traffic classes; Introduce an efficient charging period change mechanism that scales well, in software as well as in hardware (FPGA or ASIC based); Apply the mechanism to different kinds of resources, such as bytes forwarded or satisfied demands for wireless resource blocks; Implement preferential treatment to bidders ranked in accordance with their bids; Leverage 15 minute statistic data for a feedback loop (user experience data, performance measurement data, drive test data); Leverage artificial intelligence and machine learning for automated bidding process, e.g. for next week's 7*96 charging periods; Implement a "capacity brokering architecture, where network resources are provided dynamically depending upon bids offered".

The methods, systems and devices described herein may be implemented as electrical and/or optical circuit within a chip or an integrated circuit or an application specific integrated circuit (ASIC). The invention can be implemented in digital and/or analogue electronic and optical circuitry.

The methods, systems and devices described herein may be implemented as software in a Digital Signal Processor (DSP), in a micro-controller or in any other side-processor or as hardware circuit within an application specific integrated circuit (ASIC) of a Digital Signal Processor (DSP).

The invention can be implemented in digital electronic circuitry, or in computer hardware, firmware, software, or in combinations thereof, e.g. in available hardware of conventional optical transceiver devices or in new hardware dedicated for processing the methods described herein.

The present disclosure also supports a computer program product including computer executable code or computer executable instructions that, when executed, causes at least one computer to execute the performing and computing steps described herein, in particular the method 300 as described above with respect to FIG. 3 and the techniques described above with respect to FIGS. 1 to 5. Such a computer program product may include a readable non-transitory storage medium storing program code thereon for use by a computer. The program code may perform the method 300 as described above with respect to FIG. 3.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. An enforcement function network entity comprising an enforcement function for providing preferential treatment and charging in a communication network, the enforcement function network entity comprising:
   an input configured to receive a stream of input data from a plurality of bidder function network entities, the stream of input data comprising for each bidder function network entity a bid offer comprising an electronic bid value offered by the respective bidder function network entity; and a processor configured to process an enforcement function for ranking the bid offers of the plurality of bidder function network entities according to a priority ranking, and determining for each bidder function network entity an amount of electronic bid values consumed during a charging period for satisfying the respective bid offer, wherein the processor is configured to create a stream of output data comprising for each bidder function network entity the amount of electronic bid values consumed during the charging period.

2. The enforcement function network entity of claim 1, wherein the processor is configured to assign the bidder function network entities to a plurality of success classes.

3. The enforcement function network entity of claim 2, wherein the processor is configured to rank the bid offers of the plurality of bidder function network entities according to the success classes assigned to the bid offers.

4. The enforcement function network entity of claim 1, wherein the bid offers of the plurality of bidder function network entities comprise demands for requesting scheduling of chargeable resource units, in particular time-frequency resource units.

5. The enforcement function network entity of claim 4, wherein the chargeable resource unit comprises an unused Resource Element that is usable for a physical downlink shared channel.

6. The enforcement function network entity of claim 4, wherein the processor is configured to rank the bid offers of the plurality of bidder function network entities according to an energy consumed by the chargeable resource units when satisfying the demands.

7. The enforcement function network entity of claim 1, wherein the processor is configured to rank the bid offers of the plurality of bidder function network entities based on a multi-dimensional priority queue.

8. The enforcement function network entity of claim 1, comprising:
a bid input stream handling entity for handling the stream of input data; and
an output stream handling entity for providing the stream of output data.

9. The enforcement function network entity of claim 1, comprising:
a control interface handling entity for controlling processing of the enforcement function; and
an event notification handling entity for providing event notifications informing about a processing of the enforcement function.

10. The enforcement function network entity of claim 1, comprising:
a scheduler comprising:
a demand instance arrival time scheduler for scheduling arrival times of the bid offers; and
a demand instance satisfaction time scheduler for scheduling satisfaction times of the processed bid offers.

11. The enforcement function network entity of claim 1, wherein the processor is configured to prefer a bid offer of a first bidder function network entity comprising a higher electronic bid value over a bid offer of a second bidder function network entity comprising a lower electronic bid value.

* * * * *